United States Patent
Namie et al.

(10) Patent No.: US 7,551,805 B2
(45) Date of Patent: Jun. 23, 2009

(54) CONVERTING THE RESOLUTION OF AN IMAGE USING INTERPOLATION AND DISPLAYING THE CONVERTED IMAGE

(75) Inventors: Kenji Namie, Kanagawa-ken (JP); Kenji Kameyama, Kanagawa-ken (JP); Toshiharu Murai, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 465 days.

(21) Appl. No.: 11/179,850

(22) Filed: Jul. 13, 2005

(65) Prior Publication Data

US 2006/0013499 A1 Jan. 19, 2006

(30) Foreign Application Priority Data

Jul. 13, 2004 (JP) ............................. 2004-206408
Feb. 16, 2005 (JP) ............................. 2005-039603

(51) Int. Cl.
*G06K 9/32* (2006.01)
(52) U.S. Cl. .................................... 382/300
(58) Field of Classification Search ................ 382/300, 382/299, 298
See application file for complete search history.

(56) References Cited

U.S. PATENT DOCUMENTS

| | | | | |
|---|---|---|---|---|
| 4,578,812 A * | 3/1986 | Yui | ............ | 382/300 |
| 4,789,933 A * | 12/1988 | Chen et al. | ............ | 382/128 |
| 5,054,100 A * | 10/1991 | Tai | ............ | 382/300 |
| 5,644,661 A * | 7/1997 | Smith et al. | ............ | 382/300 |
| 5,930,407 A * | 7/1999 | Jensen | ............ | 382/300 |
| 6,002,812 A * | 12/1999 | Cho et al. | ............ | 382/300 |
| 6,005,989 A * | 12/1999 | Frederic | ............ | 382/300 |
| 6,324,309 B1 * | 11/2001 | Tokuyama et al. | ............ | 382/300 |
| 6,366,694 B1 * | 4/2002 | Acharya | ............ | 382/167 |
| 6,812,935 B1 * | 11/2004 | Joe et al. | ............ | 345/660 |
| 6,832,009 B1 * | 12/2004 | Shezaf et al. | ............ | 382/300 |
| 6,903,749 B2 * | 6/2005 | Soo et al. | ............ | 345/605 |
| 6,961,479 B1 | 11/2005 | Takarada | | |
| 7,054,507 B1 * | 5/2006 | Bradley et al. | ............ | 382/300 |
| 7,286,700 B2 * | 10/2007 | Gondek et al. | ............ | 382/162 |
| 2002/0008881 A1 * | 1/2002 | Riley et al. | ............ | 358/1.9 |
| 2003/0007702 A1 * | 1/2003 | Aoyama et al. | ............ | 382/300 |
| 2003/0053687 A1 * | 3/2003 | Beo et al. | ............ | 382/167 |
| 2003/0098945 A1 | 5/2003 | Sugimoto et al. | | |
| 2003/0222980 A1 | 12/2003 | Miyagaki et al. | | |
| 2004/0086193 A1 * | 5/2004 | Kameyama et al. | ............ | 382/254 |
| 2006/0013499 A1 * | 1/2006 | Namie et al. | ............ | 382/254 |

FOREIGN PATENT DOCUMENTS

| | | |
|---|---|---|
| CN | 1318177 | 10/2001 |
| JP | 9-252401 | 9/1997 |
| JP | 2796900 | 7/1998 |
| JP | 11-32209 | 2/1999 |
| JP | 11-203467 | 7/1999 |

* cited by examiner

*Primary Examiner*—Jingge Wu
*Assistant Examiner*—Max Shikhman
(74) *Attorney, Agent, or Firm*—Dickstein Shapiro LLP

(57) ABSTRACT

An apparatus, method, system, computer program and product, each capable of converting a resolution of an image using an interpolation method. The interpolation method determines a pixel value of an interpolated pixel based on a weighting factor, which is generated based on a pixel value and a distance value of a reference pixel.

42 Claims, 36 Drawing Sheets

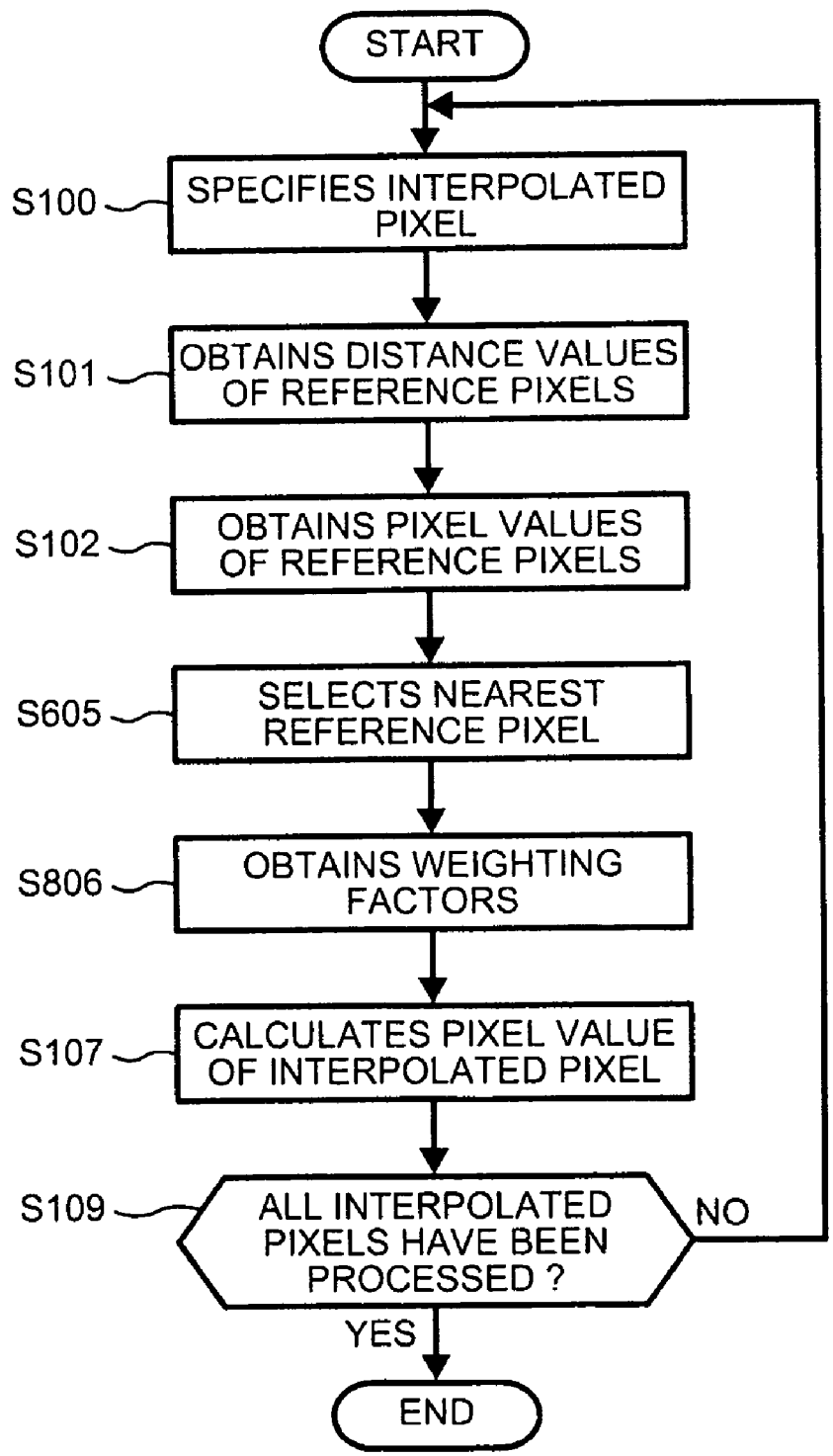

FIG. 31A
FIG. 31B
FIG. 31C
FIG. 31D
FIG. 32A  FIG. 32B  FIG. 32C

CONVERTING THE RESOLUTION OF AN IMAGE USING INTERPOLATION AND DISPLAYING THE CONVERTED IMAGE

CROSS-REFERENCE TO RELATED APPLICATIONS

This patent application claims priority to Japanese patent application Nos. 2004-206408 filed on Jul. 13, 2004, and 2005-039603 filed on Feb. 16, 2005, in the Japanese Patent Office, the entire contents of which are hereby incorporated by reference.

FIELD OF THE INVENTION

The following disclosure relates generally to converting the resolution of an image using interpolation and displaying the converted image.

DESCRIPTION OF THE RELATED ART

The existing display apparatus is usually provided with a function for converting the resolution of an image. For example, if the image has a resolution lower than an output resolution of the display apparatus, the resolution of the image may be increased using any one of the known interpolation methods, including the nearest neighbor method, linear interpolation method, or cubic convolution method, for example. In addition, various interpolation methods have been recently introduced, as described in the Japanese Patent No. 2796900 ("the '900 patent"), patented on Jul. 3, 1998, for example.

The nearest neighbor method can be processed at a high speed, however, it may generate jaggedness in the image. The linear interpolation method may be more effective than the nearest neighbor method for generating a smoother image, however, it may lower the sharpness of the image, thus creating a blurred image. The cubic convolution method can provide higher image quality, as compared with the nearest neighbor method or the linear interpolation method, however, it requires a large reference range, thus making calculation more complicated. Further, the cubic convolution method may enhance a noise component of the image. The method disclosed in the '900 patent can provide higher image quality as compared with the nearest neighbor method with a relatively smaller reference range, however, the image still suffers from jaggedness.

As described above, none of the known methods can generate an image, which is smooth and sharp, without enhancing jaggedness in the image. Further, none of the known methods can generate a high quality image while suppressing a computation amount.

BRIEF SUMMARY OF THE INVENTION

An exemplary embodiment of the present invention includes an apparatus, method, system, computer program and product, each capable of converting the resolution of an image using a first interpolation method, the method comprising the steps of: specifying an interpolated pixel to be added to the image; selecting a plurality of reference pixels from a vicinity of the interpolated pixel; obtaining a distance value for each of the reference pixels; extracting a pixel value for each of the reference pixels; generating a weighting factor for a target reference pixel selected from the plurality of reference pixels using the distance value and the pixel value of the target reference pixel; and adding the interpolated pixel having a pixel value determined by the weighting factor of the target reference pixel.

Another exemplary embodiment of the present invention includes an apparatus, method, system, computer program and product, each capable of converting a resolution of an image using an interpolation method, which is selected from a plurality of interpolation methods including the first interpolation method according to characteristics of the image.

Another exemplary embodiment of the present invention includes an apparatus, method, system, computer program and product, each capable of displaying an image having the resolution converted by using the first interpolation method or the selected interpolating method.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 13 is a flowchart illustrating an operation for determining a pixel value of an interpolated pixel using a tenth method according to an exemplary embodiment of the present invention;

FIG. 31A is an exemplary image generated by interpolating the original image of FIG. 25A using the nearest neighbor method;

FIG. 31B is an exemplary image generated by interpolating the original image of FIG. 25A using the second method of the present invention;

FIG. 31C is an exemplary image generated by interpolating the original image of FIG. 25A using the twenty-second method according to an exemplary embodiment of the present invention;

FIG. 31D is an exemplary image generated by interpolating the original image of FIG. 25A using the twenty-third method according to an exemplary embodiment of the present invention;

FIG. 32A is an exemplary original image having gradation;

FIG. 32B is an exemplary image generated by interpolating the original image of FIG. 32A using the twenty-second method according to an exemplary embodiment of the present invention; and FIG. 32C is an exemplary image generated by interpolating the original image of FIG. 32A using the twenty-third method according to an exemplary embodiment of the present invention.

DETAILED DESCRIPTION OF THE INVENTION

Figure 1:
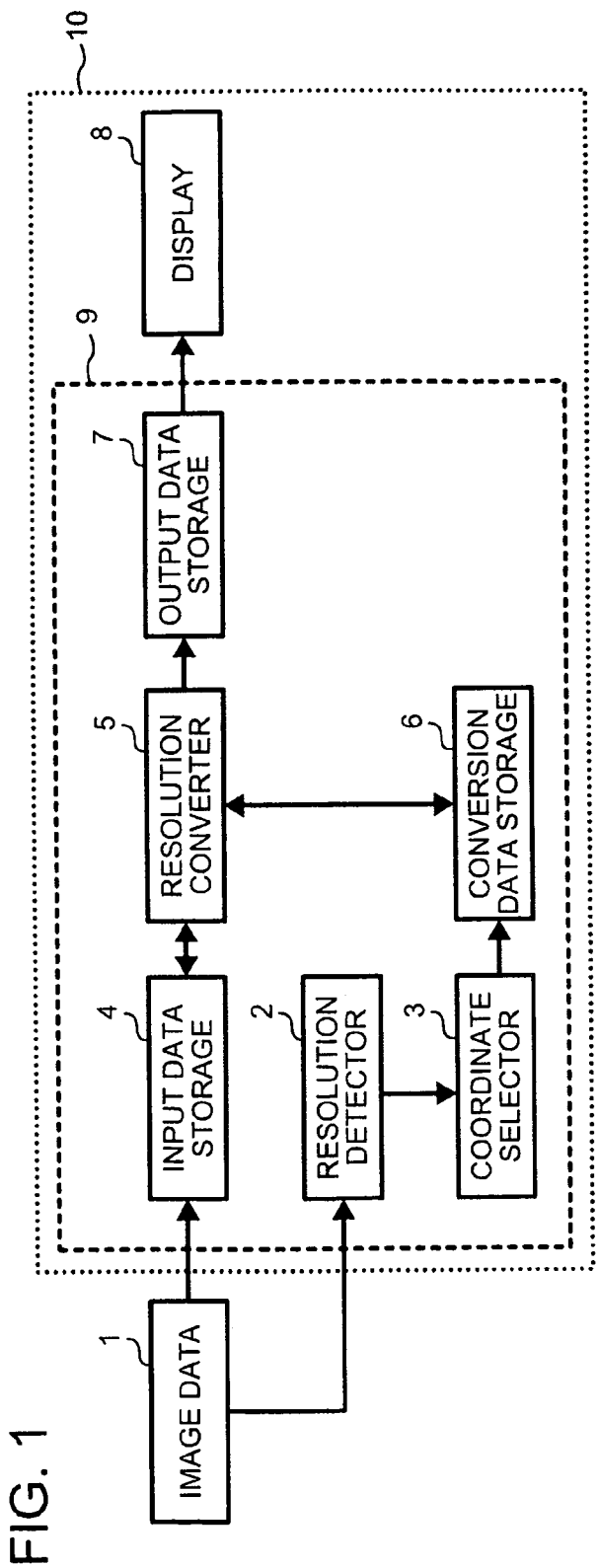
FIG. 1 is a schematic block diagram illustrating a structure of an image display apparatus according to an exemplary embodiment of the present invention.

In describing the preferred embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an image display apparatus 10 according to an exemplary embodiment of the present invention.

The image display apparatus 10 includes any kind of display apparatus capable of displaying an image according to image data 1, such as a CRT (cathode ray tube) display, LCD (liquid crystal display), PDP (plasma display panel), or a projector, for example.

As shown in FIG. 1, the image display apparatus 10 includes an image processing device 9 and a display device 8. Once the image data 1 is input into the image display apparatus 10, the image processing device 9 detects the resolution ("input resolution") of the image data 1, and compares it with the resolution ("output resolution") of the display device 8. Based on the comparison, the image processing device 9 converts the image data 1 from the input resolution to the output resolution. The converted image data 1 is then output to the display device 8 to be displayed on the display device 8.

As shown in FIG. 1, the image processing device 9 includes input data storage 4, resolution detector 2, coordinate selector 3, resolution converter 5, conversion data storage 6, and output data storage 7.

The input data storage 4, which may be optionally provided, stores the image data 1, preferably, in a unit basis. For example, the image data 1 may be stored in a pixel basis, line basis, or frame basis.

The resolution detector 2 detects the input resolution of the image data 1 using a clock signal, a horizontal synchronization signal, or a vertical synchronization signal, for example.

The coordinate selector 3 selects a coordinate for the input resolution ("input coordinate"), and a coordinate for the output resolution ("output coordinate"), respectively. In one example, the coordinate selector 3 may store a plurality of look-up tables (LUTs), each corresponding to a specific resolution. In another example, the coordinate selector 3 may generate a LUT based on the input or output resolution.

The resolution converter 5 converts the image data 1 from the input resolution to the output resolution by changing the density of pixels in the image data 1.

In one example, if the output resolution is lower than the input resolution, the resolution converter 5 may delete a number of pixels ("deleted pixels") throughout the image data 1. The resolution converter 5 selects the deleted pixels from the image data 1 based on the input and output coordinates.

In another example, if the output resolution is higher than the input resolution, the resolution converter 5 may add a number of pixels ("interpolated pixels") throughout the image data 1. The resolution converter 5 determines a portion, in the image data 1, to which each of the interpolated pixels is added based on the input and output coordinates. Further, the resolution converter 5 determines a pixel value of each of the interpolated pixels based on information contained in the image data 1 using various interpolation methods as described below.

The conversion data storage 6 stores various data including data used for resolution conversion.

The output data storage 7, which may be optionally provided, stores the processed image data 1 having the output resolution, and outputs the processed image data 1, preferably, in a unit basis.

Figure 2:
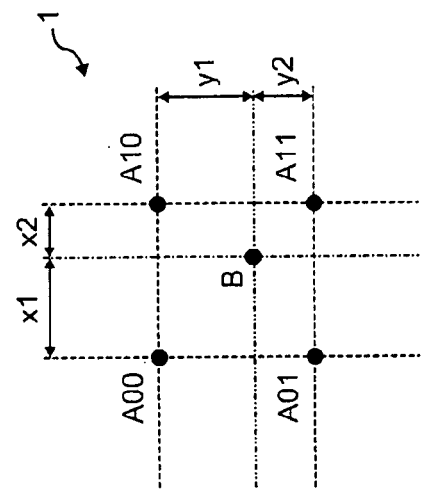
FIG. 2 is an exemplary interpolated pixel to be added to the image data illustrated in FIG. 1 according to an exemplary embodiment of the present invention.
Figure 3:
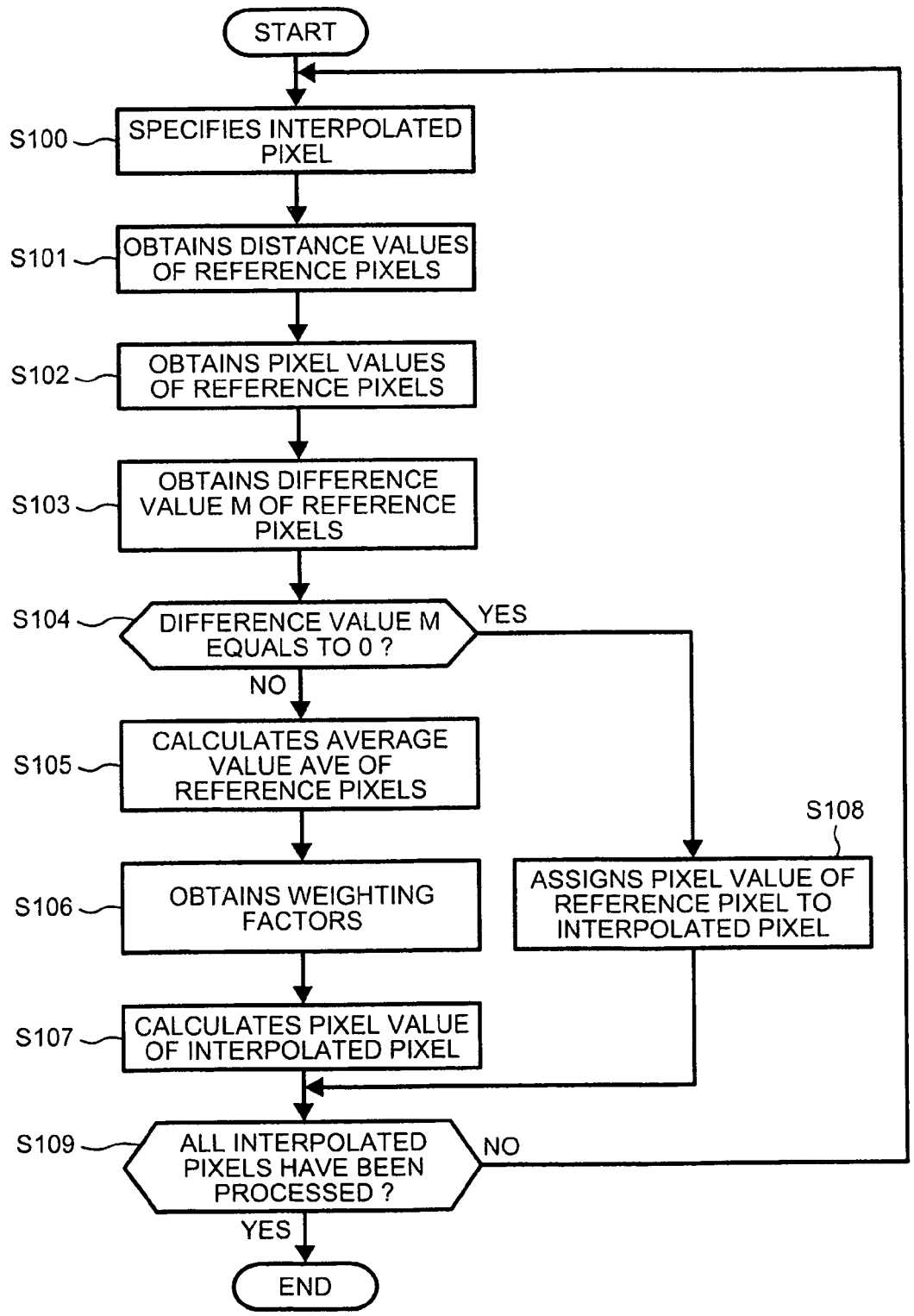
FIG. 3 is a flowchart illustrating an operation for determining a pixel value of an interpolated pixel using a first or second method according to an exemplary embodiment of the present invention.

Referring now to FIGS. 2 and 3, operations for determining a pixel value of an interpolated pixel using first and second methods are explained, respectively, according to an exemplary embodiment of the present invention.

According to the first method, Step S100 specifies one of the interpolated pixels. For example, as shown in FIG. 2, the resolution converter 5 may specify an interpolated pixel B.

Step S101 selects one or more reference pixels, which are originally provided in the image data 1, from a vicinity of the specified interpolated pixel. Step S101 further obtains a distance value for each of the reference pixels.

To select the reference pixels, the resolution converter 5 may calculate, for each of the interpolated pixels, a distance between the interpolated pixel and its neighboring pixel based on the input and output coordinates. The distance may be expressed in X and Y coordinate values. For example, if the interpolated pixel is positioned at the coordinate (X1, Y1), and its neighboring pixel is positioned at the coordinate (X2, Y2), the distance between the interpolated pixel and the neighboring pixel may be expressed in X and Y coordinate values (X1-X2) and (Y1-Y2). The calculated distance values are further stored in the conversion data storage 6 as a LUT. Using this LUT, the resolution converter 5 can select one or more reference pixels for each of the interpolated pixels in the image data 1. Further, the resolution converter 5 can obtain a distance value for each of the selected reference pixels from the LUT.

In the example shown in FIG. 2, the resolution converter 5 selects the first to fourth reference pixels A00, A01, A10, and A11, from a vicinity of the interpolated pixel B. For each of the reference pixels A00 to A11, the resolution converter 5 obtains a distance value expressed in X and Y coordinate values. In this exemplary embodiment, the first reference pixel A00 has a distance value (x1, y1). The second reference pixel A01 has a distance value (x1, y2). The third reference pixel A10 has a distance value (x2, y1). The fourth reference pixel A11 has a distance value (x2, y2). In the example shown in FIG. 2, four reference pixels are selected, however, the resolution converter 5 may select any number of reference pixels.

Step S102 obtains a pixel value for each of the reference pixels obtained in Step S101, for example, from the input data storage 4. In the example shown in FIG. 2, the first reference pixel A00 has a pixel value a00. The second reference pixel A01 has a pixel value a01. The third reference pixel A10 has a pixel value a10. The fourth reference pixel A11 has a pixel value a11.

Step S103 obtains a difference value M, indicating a difference between a maximum value MAX and a minimum value MIN of the reference pixels. The maximum value MAX corresponds to the pixel value having the largest value selected from the pixel values of the reference pixels. The minimum value MIN corresponds to the pixel having the smallest value selected from the pixel values of the reference pixels. The difference value M may be expressed with the equation: M=MAX−MIN.

Alternatively, the difference value M may be obtained by comparing the pixel value of a nearest reference pixel with the pixel value of each of the reference pixels other than the nearest reference pixel. The nearest reference pixel is a reference pixel having the smallest distance value. For example, in the example shown in FIG. 2, if the fourth reference pixel corresponds to the nearest reference pixel, the difference between the pixel value a11 and the pixel value a10(|a11−a10|), the difference between the pixel value a11 and the pixel value a10(|a11−a10|), and the difference between the pixel value a11 and the pixel value a00(|a11−a00|) may be obtained, respectively. The maximum value of the obtained differences is used as the difference value M.

Step S104 determines whether the difference value M is equal to 0. If the difference value M is equal to 0("YES" in Step S104), that is, the pixel values are the same for all the reference pixels, the operation proceeds to Step S108. If the difference value M is not equal to 0("NO" in Step S104), the operation proceeds to Step S105.

Step S108 uses one of the pixel values of the reference pixels as a pixel value of the interpolated pixel. In the example shown in FIG. 2, the pixel value a00 may be used as a pixel value b of the interpolated pixel B. However, any one of the pixel values a00, a01, a10, and a11 may be used, as they have the same values.

Step S105 calculates an average value AVE, which is the average of the pixel values of the reference pixels. In the example shown in FIG. 2, the average value AVE of the reference pixels A00, A10, A01, and A11 can be calculated with the equation:

$$AVE=(a00+a01+a10+a11)/4.$$

Step S106 obtains a weighting factor for each of the reference pixels using the pixel values obtained in Step S102, the distance values obtained in Step S101, the average value AVE obtained in Step S105, and a normalization factor. In this exemplary embodiment, a maximum pixel value of the image data 1, which is 255, is used as the normalization factor.

In the example shown in FIG. 2, weighting factors Z00, Z10, Z01, and Z11 for the reference pixels A00, A10, A01, and A11 are obtained, respectively, as follows:

$$Z00=x2*y2*(1-|a00-AVE|/255);$$

$$Z10=x1*y2*(1-|a10-AVE|/255);$$

$$Z01=x2*y1*(1-|a01-AVE|/255); \text{ and}$$

$$Z11=x1*y1*(1-|a11-AVE|/255).$$

Step S107 calculates a pixel value of the interpolated pixel using the pixel values of the reference pixels. In this exemplary embodiment, each of the pixel values is weighted with the corresponding weighting factor obtained in Step S106.

In the example shown in FIG. 2, the pixel values a00, a10, a01, and a11 are weighted with the weighting factors Z00, Z10, Z01 and Z11, respectively. Thus, the pixel value b of the interpolated pixel B may be obtained as follows:

$$b=a00*Z00/(Z00+Z10+Z01+Z11)+a10*Z10/(Z00+Z10+Z01+Z11)+a01*Z01/(Z00+Z10+Z01+Z11)+a11*Z11/(Z00+Z10+Z01+Z11).$$

The above equation can be simplified as:

$$b=(Z00*a00+Z10*a10+Z01*a01+Z11*a11)/(Z00+Z10+Z01+Z11).$$

Step S109 determines whether all interpolated pixels in the image data 1 have been processed. If all interpolated pixels have been processed ("YES" in Step S109), the operation ends to store the processed image data 1 in the output data storage 7 to be displayed by the display device 10. If all interpolated pixels have not been processed ("NO" in Step S109), the operation returns to Step S100 to specify another interpolated pixel.

Figure 8A:
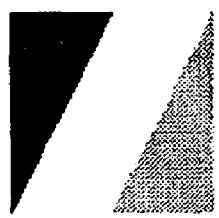
FIG. 8A is an exemplary original image input to the display apparatus of FIG. 1.
Figure 8B:
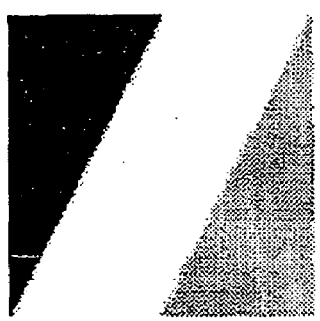
FIG. 8B is an exemplary image generated by interpolating the original image of FIG. 8A using the linear method.
Figure 8C:
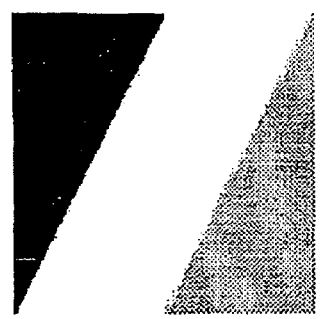
FIG. 8C is an exemplary image generated by interpolating the original image of FIG. 8A using the first method according to an exemplary embodiment of the present invention.

Using the first method, smoothness of an image may be increased as shown in FIG. 8C when compared to the image of FIG. 8B, which is generated using the linear method.

The operation using the second method is substantially similar to the operation using the first method, except for the calculation performed in Step S106.

According to the second method, Step S106 obtains a weighting factor for each of the reference pixels using the pixel values obtained in Step S102, the distance values obtained in Step S101, the average value AVE obtained in Step S105, and a normalization factor. In this exemplary embodiment, the difference value M obtained in Step S103 is used as the normalization factor.

In the example shown in FIG. 2, weighting factors Z00, Z10, Z01, and Z11 for the reference pixels A00, A10, A01, and A11 are obtained, respectively, as follows:

$$Z00=x2*y2*(1-|a00-AVE|/M);$$

$$Z10=x1*y2*(1-|a10-AVE|/M);$$

$$Z01=x2*y1*(1-|a01-AVE|/M); \text{ and}$$

$$Z11=x1*y1*(1-|a11-AVE|/M).$$

Figure 8D:
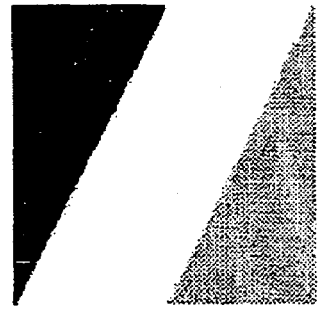
FIG. 8D is an exemplary image generated by interpolating the original image of FIG. 8A using the second method according to an exemplary embodiment of the present invention.
Figure 9A:
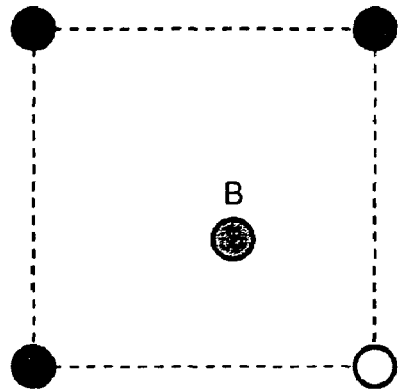
FIG. 9A is an exemplary interpolated pixel to be added to image data according to an exemplary embodiment of the present invention.
Figure 9B:
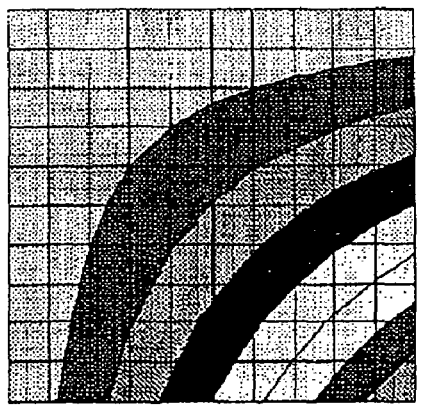
FIG. 9B is an illustration showing the influence of a nearest reference pixel on a pixel value of the interpolated pixel, shown in FIG. 9A, when the pixel value is determined using the linear method.
Figure 9C:
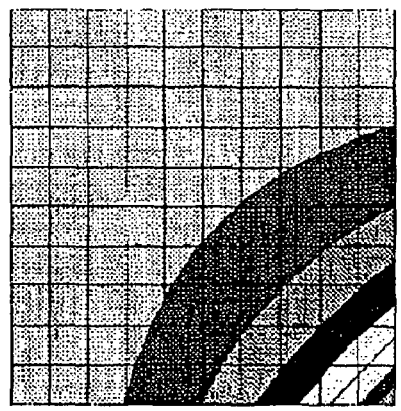
FIG. 9C is an illustration showing an influence of a nearest reference pixel on a pixel value of the interpolated pixel, shown in FIG. 9A, when the pixel value is determined using the second method according to an exemplary embodiment of the present invention.
Figure 10A:
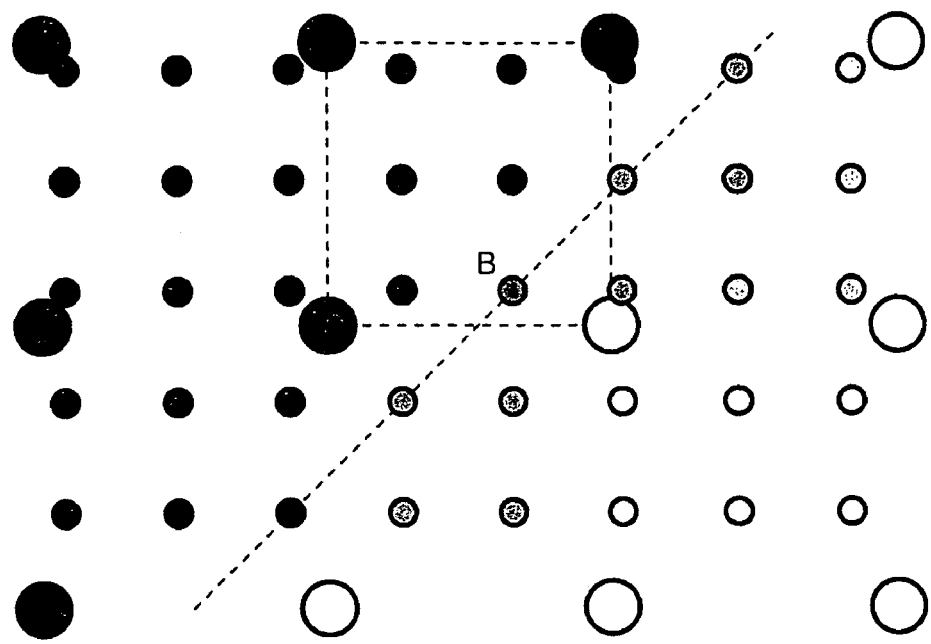
FIG. 10A is an exemplary image generated by interpolating an original image using the second method according to an exemplary embodiment of the present invention.
Figure 10B:
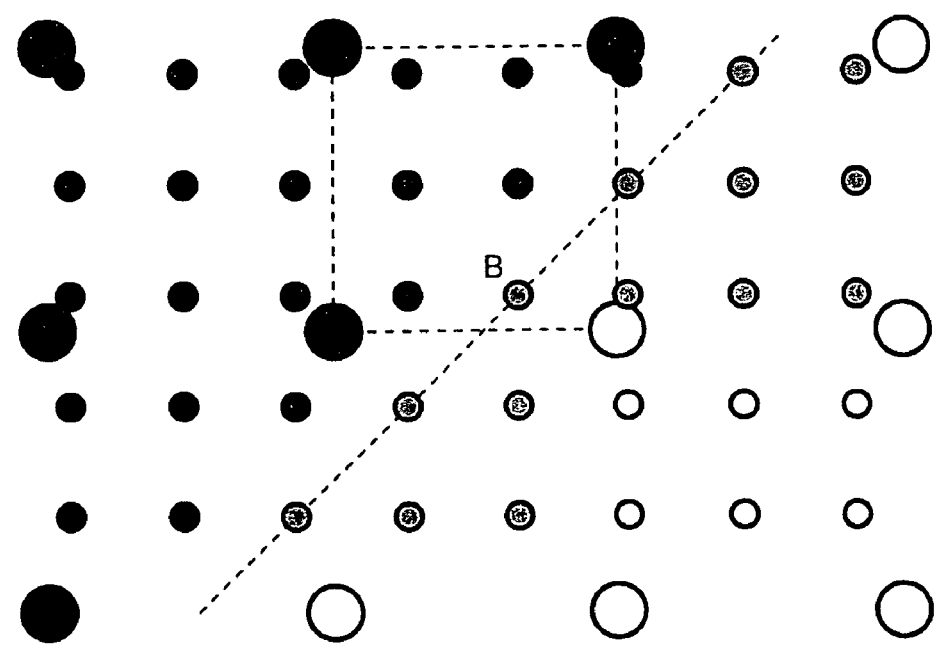
FIG. 10B is an exemplary image generated by interpolating an original image using the linear method.

Using the second method, smoothness of an image may be increased as shown in FIG. 8D when compared to the image of FIG. 8B, which is generated using the linear method. Further, an image generated using the second method tends to keep more information regarding pixel values of an original image as illustrated in FIG. 9C when compared to the linear method. Referring to the image of FIG. 9B, which is generated using the linear method, the pixel value of an interpolated pixel B is influenced by the pixel value of the nearest reference pixel (indicated with a white pixel in FIG. 9A). However, referring to the image of FIG. 9C, which is generated using the second method, the influence of the pixel value of the nearest reference pixel is suppressed. Accordingly, the second method may be more effective than the linear method for suppressing jaggedness of a diagonal line, as it can be seen from the comparison between the image of FIG. 10A generated by using the second method and the image of FIG. 10B generated by using the linear method.

In this exemplary embodiment, the difference value M is used as the normalization factor. However, any value may be used as long as it reflects the pixel values of the reference pixels. For example, a value larger than the value (MAX−AVE), a value larger than the value (AVE−MIN), a value smaller or larger than the difference value M by a predetermined value may be used.

Figure 4:
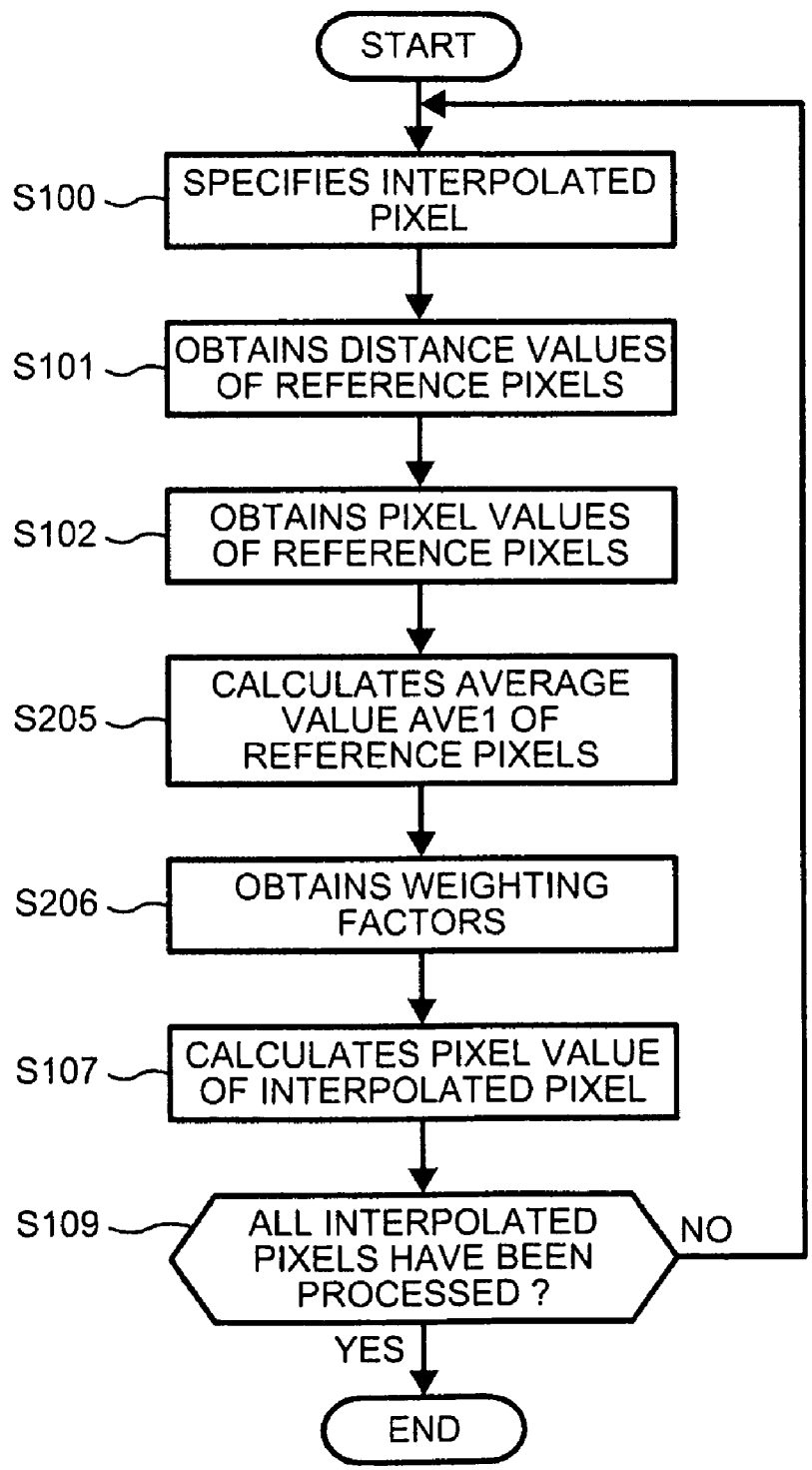
FIG. 4 is a flowchart illustrating an operation for determining a pixel value of an interpolated pixel using a third method according to an exemplary embodiment of the present invention.

Referring now to FIGS. 2 and 4, an operation for determining a pixel value of an interpolated pixel using a third method is explained according to an exemplary embodiment of the present invention.

The operation using the third method shown in FIG. 4 is substantially similar to the operation using the first method shown in FIG. 3. The differences include the deletion of Steps S103, S104, and S108, replacement of Step S105 with Step S205, and replacement of Step S106 with Step S206.

Step S205 calculates an average value AVE1, which is the average of the pixel values of a pair of reference pixels that are diagonally opposite each other.

In the example shown in FIG. 2, the first reference pixel A00 and the fourth reference pixel A11 make a pair of diagonally opposing pixels. Accordingly, the average value AVE11 of the reference pixels A00 and A11 can be calculated as follows: AVE11=(a00+a11)/2.

Similarly, the second reference pixel A01 and the third reference pixel A10 make a pair of diagonally opposing pixels. Accordingly, the average value AVE12 of the reference pixels A01 and A10 can be calculated as follows: AVE12=(a01+a10)/2.

Step S206 obtains a weighting factor for each of the reference pixels using the pixel values obtained in Step S102, the distance values obtained in Step S101, the average values AVE1 obtained in Step S205, and a normalization factor. In this exemplary embodiment, a predetermined value larger than the maximum pixel value of the image data 1, which is 255, is used as the normalization factor.

In the example shown in FIG. 2, weighting factors Z00, Z10, Z01, and Z11 for the reference pixels A00, A10, A01, and A11 are obtained, respectively, as follows:

$$Z00=x2*y2*(1-|a00-AVE12|/256);$$

$$Z10=x1*y2*(1-|a10-AVE11|/256);$$

$$Z01=x2*y1*(1-|a01-AVE11|/256); \text{ and}$$

$$Z11=x1*y1*(1-|a11-AVE12|/256).$$

Figure 8E:
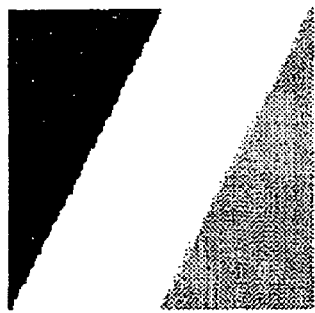
FIG. 8E is an exemplary image generated by interpolating the original image of FIG. 8A using the third method according to an exemplary embodiment of the present invention.

Using the third method, sharpness of an image may be increased as shown in FIG. 8E when compared to the image of FIG. 8B, which is generated using the linear method.

Figure 5:
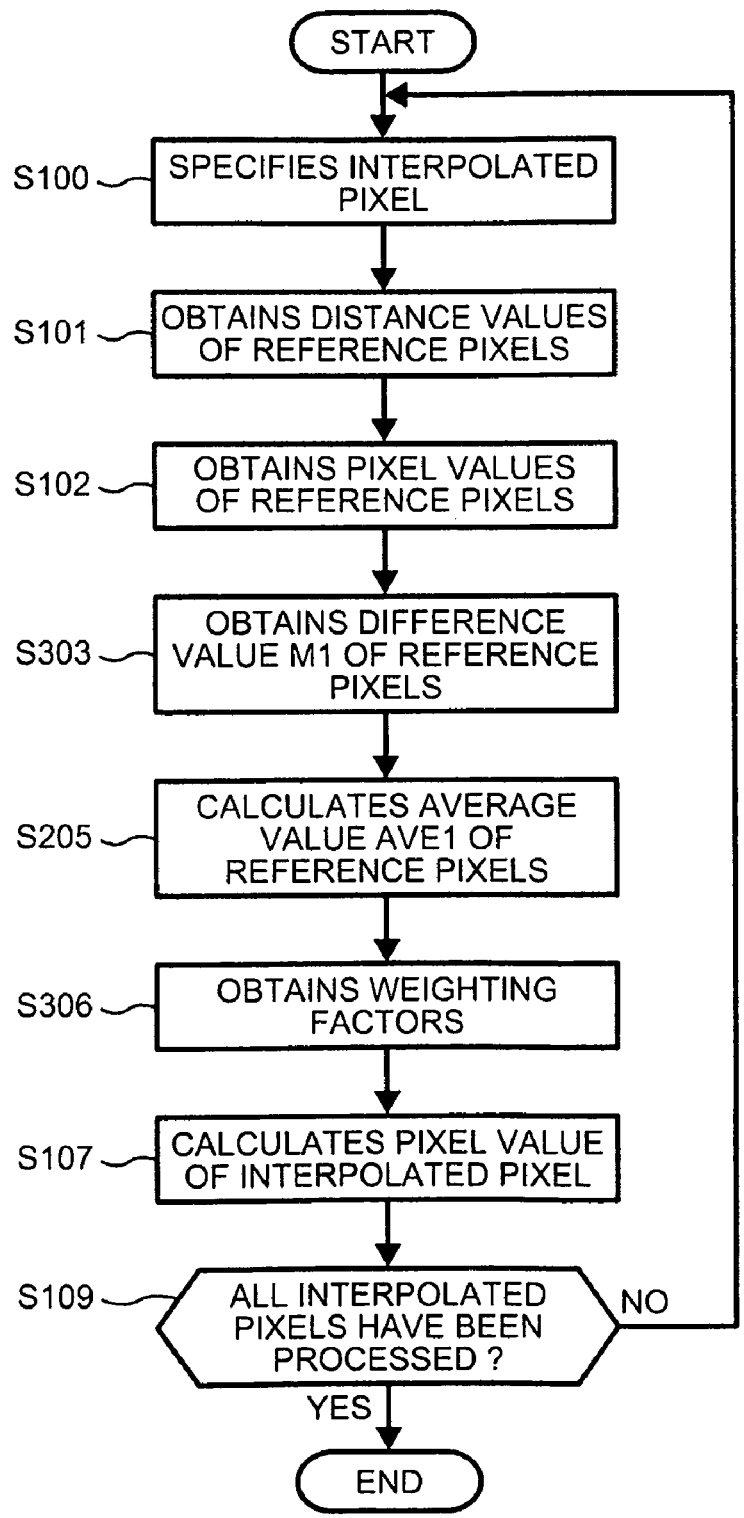
FIG. 5 is a flowchart illustrating an operation for determining a pixel value of an interpolated pixel using a fourth method according to an exemplary embodiment of the present invention.

Referring now to FIGS. 2 and 5, an operation for determining a pixel value of an interpolated pixel using a fourth method is explained according to an exemplary embodiment of the present invention.

The operation using the fourth method shown in FIG. 5 is substantially similar to the operation using the third method shown in FIG. 4. The differences include the addition of Step S303, and replacement of Step S206 with Step S306.

Step S303 obtains a difference value M1 based on the maximum value MAX and the minimum value MIN of the reference pixels. The difference value M1 is any kind of value larger than the difference value M obtained in Step S103 of FIG. 3. For example, the difference value M1 may be expressed with the equation: M1=MAX−MIN+α, with α being any value larger than 0. In this exemplary embodiment, α is set to 1.

Step S306 obtains a weighting factor for each of the reference pixels using the pixel values obtained in Step S102, the distance values obtained in Step S101, the average value AVE1 obtained in Step S205, and a normalization factor. In this exemplary embodiment, the difference value M1 obtained in Step S303 is used as the normalization factor.

In the example shown in FIG. 2, weighting factors Z00, Z10, Z01, and Z11 for the reference pixels A00, A10, A01, and A11 are obtained, respectively, as follows:

$$Z00=x2*y2*(1-|a00-AVE12|/M1);$$

$$Z10=x1*y2*(1-|a10-AVE11|/M1);$$

$$Z01=x2*y1*(1-|a01-AVE11|/M1); \text{ and}$$

$$Z11=x1*y1*(1-|a11-AVE12|/M1).$$

Figure 8F:
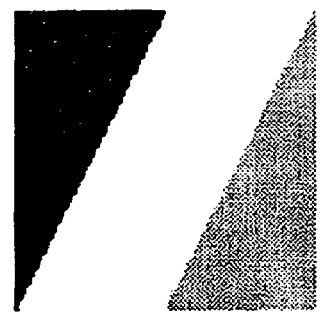
FIG. 8F is an exemplary image generated by interpolating the original image of FIG. 8A using the fourth method according to an exemplary embodiment of the present invention.
Figure 9D:
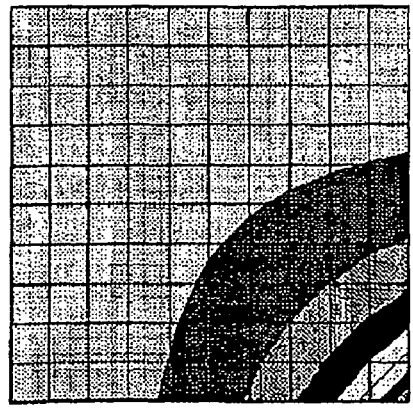
FIG. 9D is an illustration showing an influence of a nearest reference pixel on a pixel value of the interpolated pixel shown in FIG. 9A, when the pixel value is determined using the fourth method according to an exemplary embodiment of the present invention.

Using the fourth method, sharpness of an image may be increased as shown in FIG. 8F when compared to the image of FIG. 8B, which is generated using the linear method. Further, an image generated using the fourth method tends to keep more information regarding pixel values of an original image, as illustrated in FIG. 9D when compared to the linear method. Referring to the image of FIG. 9B, which is generated using the linear method, the interpolated pixel B is influenced by the nearest reference pixel (indicated with a white pixel in FIG. 9A). However, referring to the image of FIG. 9D, which is generated using the fourth method, the influence of the nearest reference pixel is suppressed. Accordingly, the fourth method may be more effective than the linear method for suppressing the jaggedness of a diagonal line.

Figure 8G:
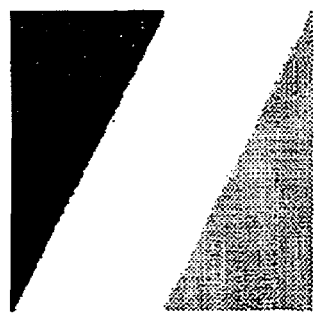
FIG. 8G is an exemplary image generated by interpolating the original image of FIG. 8A using the fourth method according to an exemplary embodiment of the present invention.

In this exemplary embodiment, the difference value M1 is used as the normalization factor. However, any value may be used as long as it reflects the pixel values of the reference pixels. For example, the value of the normalization factor may be increased to improve smoothness of an image, as illustrated in FIG. 8G. The image shown in FIG. 8G, which is generated using the normalization factor of (M1*1.3), tends to be smoother than the image shown in FIG. 8F, which is generated using the normalization factor of M1.

Figure 6:
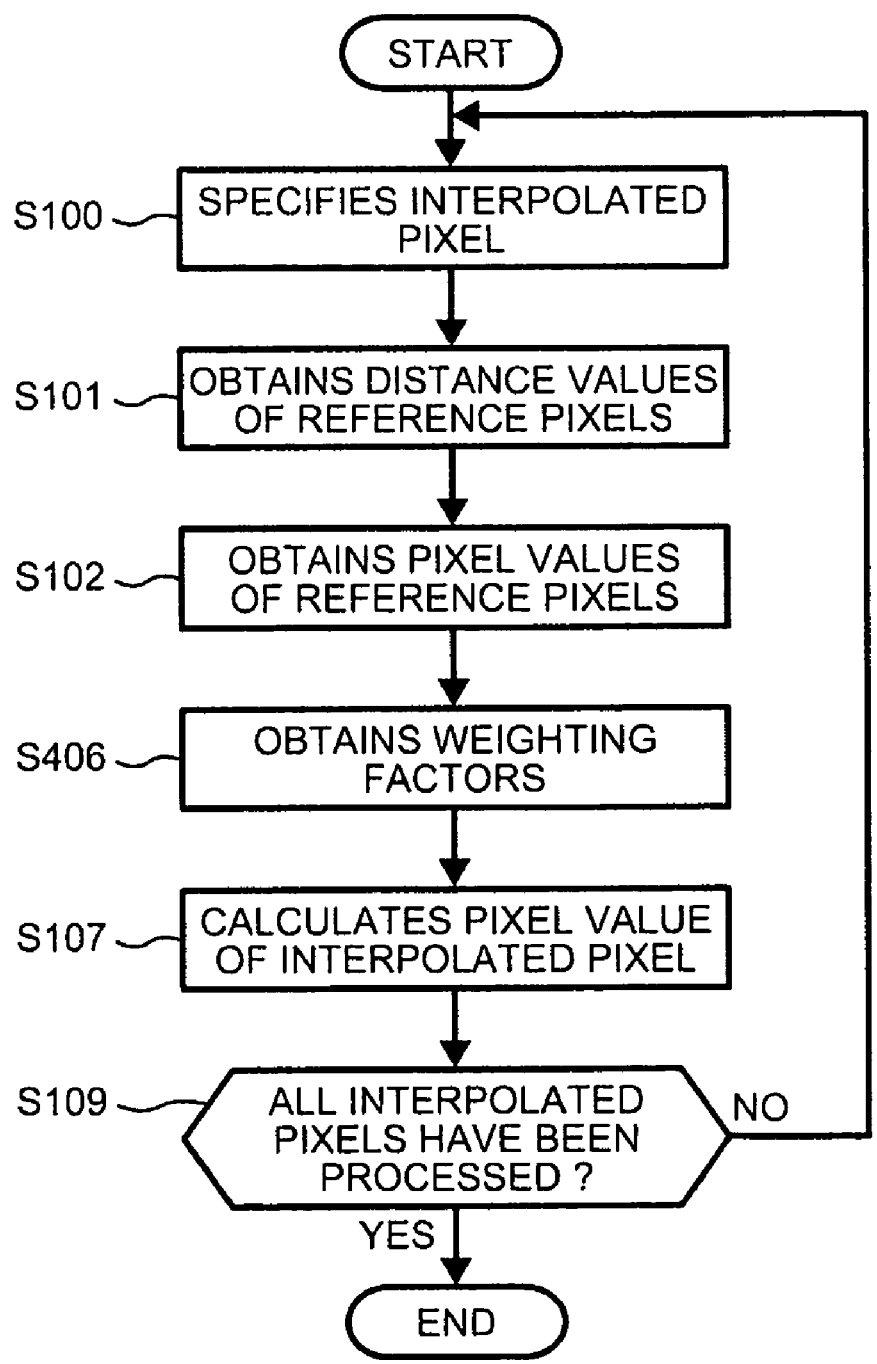
FIG. 6 is a flowchart illustrating an operation for determining a pixel value of an interpolated pixel using a fifth method according to an exemplary embodiment of the present invention.

Referring now to FIGS. 2 and 6, an operation for determining a pixel value of an interpolated pixel using a fifth method is explained according to an exemplary embodiment of the present invention.

The operation using the fifth method shown in FIG. 6 is substantially similar to the operation using the third method shown in FIG. 4. The differences include the deletion of Steps S205 and S303, and replacement of Step S206 with Step S406.

Step S406 obtains a weighting factor for each of the reference pixels using the pixel values obtained in Step S102, the distance values obtained in Step S101, and a normalization factor. In this exemplary embodiment, a predetermined value larger than the maximum pixel value of the image data 1, which is 255, is used as the normalization factor.

In the example shown in FIG. 2, weighting factors Z00, Z10, Z01, and Z11 for the reference pixels A00, A10, A01, and A11 are obtained, respectively, as follows:

$$Z00=x2*y2*(1-|a00-a11|/256);$$

$$Z10=x1*y2*(1-|a10-a01|/256);$$

$$Z01=x2*y1*(1-|a01-a10|/256); \text{ and}$$

$$Z11=x1*y1*(1-|a11-a00|/256).$$

As shown in the above equations, instead of using the average value AVE1 as described with reference to Step S206 of FIG. 4, the third method calculates a weighting factor of a target reference pixel using the pixel value of a reference pixel diagonally opposite to the target reference pixel.

Figure 8H:
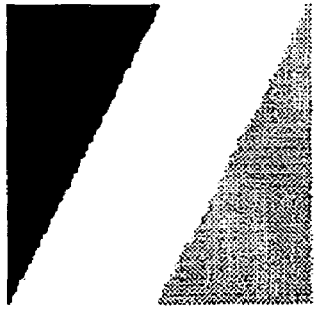
FIG. 8H is an exemplary image generated by interpolating the original image of FIG. 8A using the fifth method according to an exemplary embodiment of the present invention.

Using the fifth method, sharpness of an image may be increased as shown in FIG. 8H when compared to the image of FIG. 8B, which is generated using the linear method.

Figure 7:
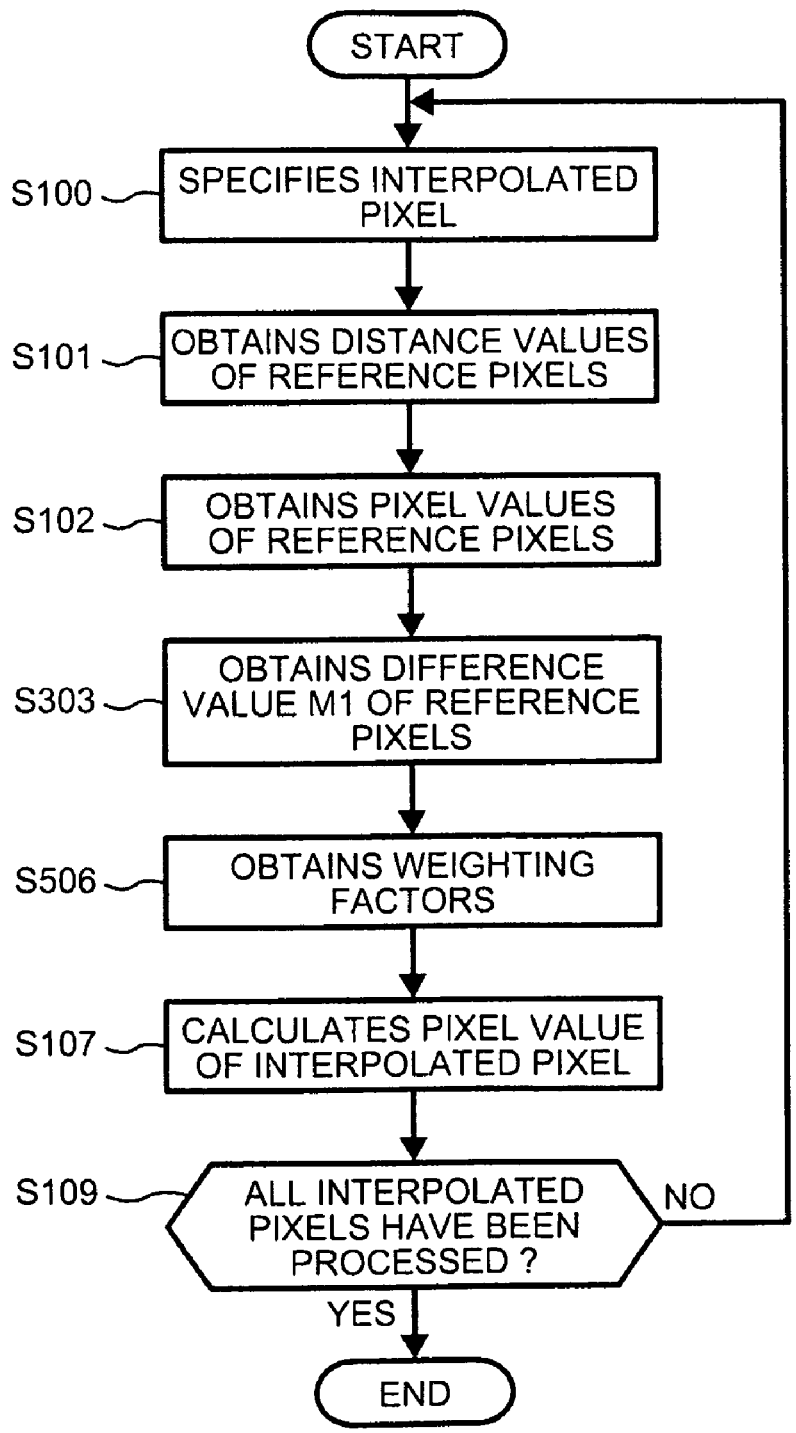
FIG. 7 is a flowchart illustrating an operation for determining a pixel value of an interpolated pixel using a sixth method according to an exemplary embodiment of the present invention.

Referring now to FIGS. 2 and 7, an operation for determining a pixel value of an interpolated pixel using a sixth method is explained according to an exemplary embodiment of the present invention.

The operation using the sixth method shown in FIG. 7 is substantially similar to the operation using the fourth method shown in FIG. 5. The differences include the deletion of Step S205, and replacement of Step S306 with Step S506.

Step S506 obtains a weighting factor for each of the reference pixels using the pixel values obtained in Step S102, the distance values obtained in Step S101, and a normalization factor. In this exemplary embodiment, the difference value M1 obtained in Step S303 is used as the normalization factor.

In the example shown in FIG. 2, weighting factors Z00, Z10, Z01, and Z11 for the reference pixels A00, A10, A01, and A11 are obtained, respectively, as follows:

$$Z00=x2*y2*(1-|a00-a11|/M1);$$

$$Z10=x1*y2*(1-|a10-a01|/M1);$$

$$Z01=x2*y1*(1-|a01-a10|/M1); \text{ and}$$

$$Z11=x1*y1*(1-|a11-a00|/M1).$$

As shown in the above equations, instead of using the average value AVE1 as described referring to Step S306 of FIG. 5, the third example calculates a weighting factor for a target reference pixel using the pixel value of a reference pixel diagonally opposite the target reference pixel.

Figure 8I:
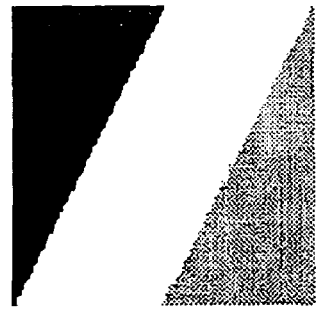
FIG. 8I is an exemplary image generated by interpolating the original image of FIG. 8A using the sixth method according to an exemplary embodiment of the present invention.
Figure 9E:
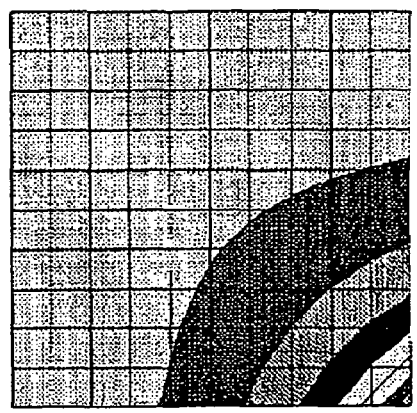
FIG. 9E is an illustration showing an influence of a nearest reference pixel on a pixel value of the interpolated pixel shown in FIG. 9A, when the pixel value is determined using the sixth method according to an exemplary embodiment of the present invention.

Using the sixth method, sharpness of an image may be increased as shown in FIG. 8I when compared to the image of FIG. 8B, which is generated using the linear method. Further, an image generated using the sixth method tends to keep more information regarding pixel values of an original image, as illustrated in FIG. 9E when compared to the linear method. Referring to the image of FIG. 9B, which is generated using the linear method, the interpolated pixel B is influenced by the nearest reference pixel (indicated with a white pixel in FIG. 9A). However, referring to the image of FIG. 9E, which is generated using the sixth method, the influence of the nearest reference pixel is suppressed. Accordingly, the sixth method may be more effective than the linear method for suppressing the jaggedness of a diagonal line.

Figure 8J:
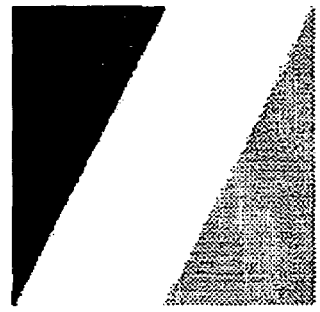
FIG. 8J is an exemplary image generated by interpolating the original image of FIG. 8A using the sixth method according to an exemplary embodiment of the present invention.

In this exemplary embodiment, the difference value M1 is used as the normalization factor. However, any value may be used as long as it reflects the pixel values of the reference pixels. For example, the value of the normalization factor may be increased to improve smoothness of an image, as illustrated in FIG. 8J. The image shown in FIG. 8J, which is generated using the normalization factor of (M1*1.3), tends to be smoother than the image shown in FIG. 8I, which is generated using the normalization factor of M1.

Figure 11:
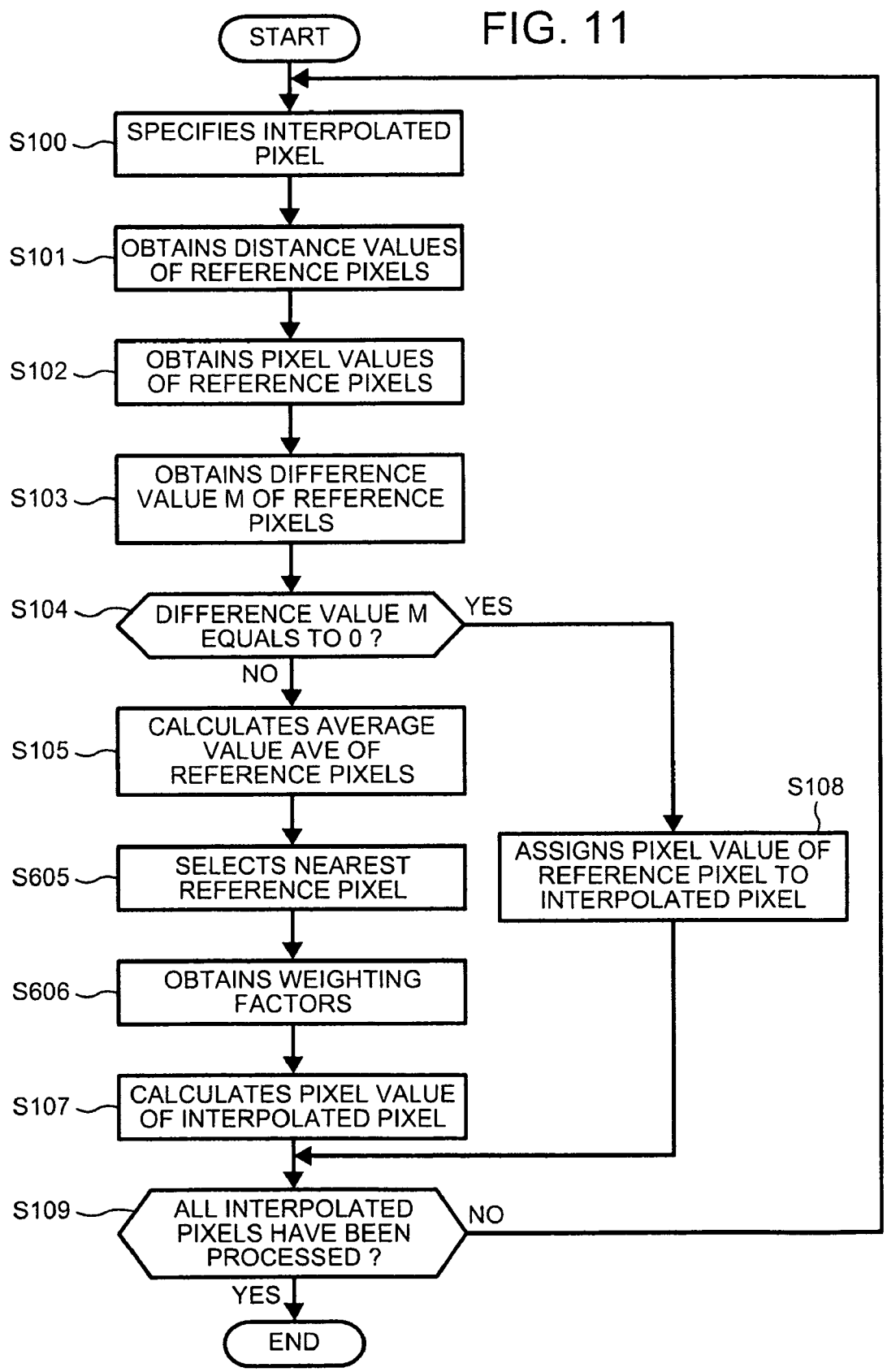
FIG. 11 is a flowchart illustrating an operation for determining a pixel value of an interpolated pixel using a seventh or eighth method according to an exemplary embodiment of the present invention.

Referring now to FIGS. 2 and 11, operations for determining a pixel value of an interpolated pixel using seventh and eighth methods are explained, respectively, according to an exemplary embodiment of the present invention.

The operation using the seventh method shown in FIG. 11 is substantially similar to the operation using the first method shown in FIG. 3. The differences include the addition of Step S605, and replacement of Step S106 with Step S606.

Step S605 selects a nearest reference pixel A, which is the reference pixel having the smallest distance value, from the reference pixels obtained in Step S101. In this exemplary embodiment, a distance value may be expressed in X and Y coordinate values.

According to the seventh method, Step S606 obtains a weighting factor for each of the reference pixels, other than the nearest reference pixel A using the pixel values obtained in Step S102, the distance values obtained in Step S101, the average value AVE obtained in Step S105, and a normalization factor, in a substantially similar manner as described with reference to Step S106 of FIG. 3. In this exemplary embodiment, the maximum pixel value of the image data 1, which is 255, is used as the normalization factor. Further, Step S606 obtains a weighting factor for the nearest reference pixel A using the distance value of the nearest reference pixel A obtained in Step S101.

Figure 14A:
FIG. 14A is an exemplary original image input to the display apparatus of FIG. 1.
Figure 14B:
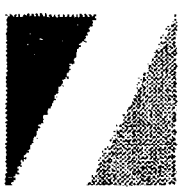
FIG. 14B is an exemplary image generated by interpolating the original image of FIG. 14A using the linear method.
Figure 14C:
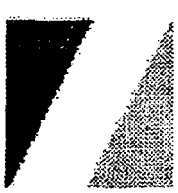
FIG. 14C is an exemplary image generated by interpolating the original image of FIG. 14A using the cubic convolution method.
Figure 14D:
FIG. 14D is an exemplary image generated by interpolating the original image of FIG. 14A using the seventh method according to an exemplary embodiment of the present invention.

In the example shown in FIG. 2, if the reference pixel A00 corresponds to the nearest reference pixel A, weighting factors Z00, Z10, Z01, and Z11 for the reference pixels A00, A10, A01, and A11 are obtained, respectively, as follows:

$Z00=x2*y2;$ $Z10=x1*y2*(1-|a10-AVE|/255);$ $Z01=x2*y1*(1-|a01-AVE|/255);$ and $Z11=x1*y1*(1-|a11-AVE|/255).$ In the example shown in FIG. 2, if the reference pixel A10 corresponds to the nearest reference pixel A, weighting factors Z00, Z10, Z01, and Z11 for the reference pixels A00, A10, A01, and A11 are obtained, respectively, as follows:

$Z00=x2*y2*(1-|a00-AVE|/255);$ $Z10=x1*y2;$ $Z01=x2*y1*(1-|a01-AVE|/255);$ and $Z11=x1*y1*(1-|a11-AVE|/255).$ In the example shown in FIG. 2, if the reference pixel A01 corresponds to the nearest reference pixel A, weighting factors Z00, Z10, Z01, and Z11 for the reference pixels A00, A10, A01, and A11 are obtained, respectively, as follows:

$Z00=x2*y2*(1-|a00-AVE|/255);$ $Z10=x1*y2*(1-|a10-AVE|/255);$ $Z01=x2*y1;$ and $Z11=x1*y1*(1-|a11-AVE|/255).$ In the example shown in FIG. 2, if the reference pixel A11 corresponds to the nearest reference pixel A, weighting factors Z00, Z10, Z01, and Z11 for the reference pixels A00, A10, A01, and A11 are obtained, respectively, as follows:

$Z00=x2*y2*(1-|a00-AVE|/255);$ $Z10=x1*y2*(1-|a10-AVE|/255);$ $Z01=x2*y1*(1-|a01-AVE|/255);$ and $Z11=x1*y1.$ Using the seventh method, sharpness of an image may be increased as shown in FIG. 14D when compared to the image of FIG. 14B, which is generated using the linear method. Further, the seventh method may be more effective than the cubic convolution method for suppressing a noise component of an original image. The image of FIG. 14C, which is generated using the cubic convolution method, keeps more information regarding pixel values of an original image as compared to the linear method. However, the image of FIG. 14C may contain information that is unnecessary for determining a pixel value of an interpolated pixel, thus causing some noises in the image.

The operation using the eighth method is substantially similar to the operation using the seventh method, except for the calculation performed in Step S606.

According to the eighth method, Step S606 obtains a weighting factor for each of the reference pixels other than the nearest reference pixel A using the pixel values obtained in Step S102, the distance values obtained in Step S101, the average value AVE obtained in Step S105, and a normalization factor, in a substantially similar manner as described with reference to Step S106 of FIG. 3. In this exemplary embodiment, the difference value M obtained in Step S103 is used as the normalization factor. Further, Step S606 obtains a weighting factor for the nearest reference pixel A using the distance value of the nearest reference pixel A obtained in Step S101.

Figure 14E:
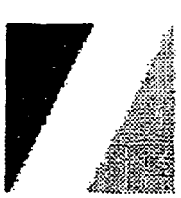
FIG. 14E is an exemplary image generated by interpolating the original image of FIG. 14A using the eighth method according to an exemplary embodiment of the present invention.

In the example shown in FIG. 2, if the reference pixel A00 corresponds to the nearest reference pixel A, weighting factors Z00, Z10, Z01, and Z11 for the reference pixels A00, A10, A01, and A11 are obtained, respectively, as follows:

$Z00=x2*y2;$ $Z10=x1*y2*(1-|a10-AVE|/M);$ $Z01=x2*y1*(1-|a01-AVE|/M);$ and $Z11=x1*y1*(1-|a11-AVE|/M).$ In the example shown in FIG. 2, if the reference pixel A10 corresponds to the nearest reference pixel A, weighting factors Z00, Z10, Z01, and Z11 for the reference pixels A00, A10, A01, and A11 are obtained, respectively, as follows:

$Z00=x2*y2*(1-|a00-AVE|/M);$ $Z10=x1*y2;$ $Z01=x2*y1*(1-|a01-AVE|/M);$ and $Z11=x1*y1*(1-|a11-AVE|/M).$ In the example shown in FIG. 2, if the reference pixel A01 corresponds to the nearest reference pixel A, weighting factors Z00, Z10, Z01, and Z11 for the reference pixels A00, A10, A01, and A11 are obtained, respectively, as follows:

$Z00=x2*y2*(1-|a00-AVE|/M);$ $Z10=x1*y2*(1-|a10-AVE|/M);$ $Z01=x2*y1;$ and $Z11=x1*y1*(1-|a11-AVE|/M).$ In the example shown in FIG. 2, if the reference pixel A11 corresponds to the nearest reference pixel A, weighting factors Z00, Z10, Z01, and Z11 for the reference pixels A00, A10, A01, and A11 are obtained, respectively, as follows:

$Z00=x2*y2*(1-|a00-AVE|/M);$ $Z10=x1*y2*(1-|a10-AVE|/M);$ $Z01=x2*y1*(1-|a01-AVE|/M);$ and $Z11=x1*y1.$ Using the eighth method, sharpness of an image may be increased while keeping information regarding pixel values of an original image as shown in FIG. 14E when compared to the image of FIG. 14B, which is generated using the linear method. Further, the eighth method may be more effective than the cubic convolution method for suppressing a noise component of an original image, as illustrated in FIGS. 14C and 14E.

In this exemplary embodiment, the difference value M is used as the normalization factor. However, any value may be used as long as it reflects the pixel values of the reference pixels. For example, a value larger than the value (MAX−AVE), a value larger than the value (AVE−MIN), or a value smaller or larger than the difference value M may be used.

Figure 12:
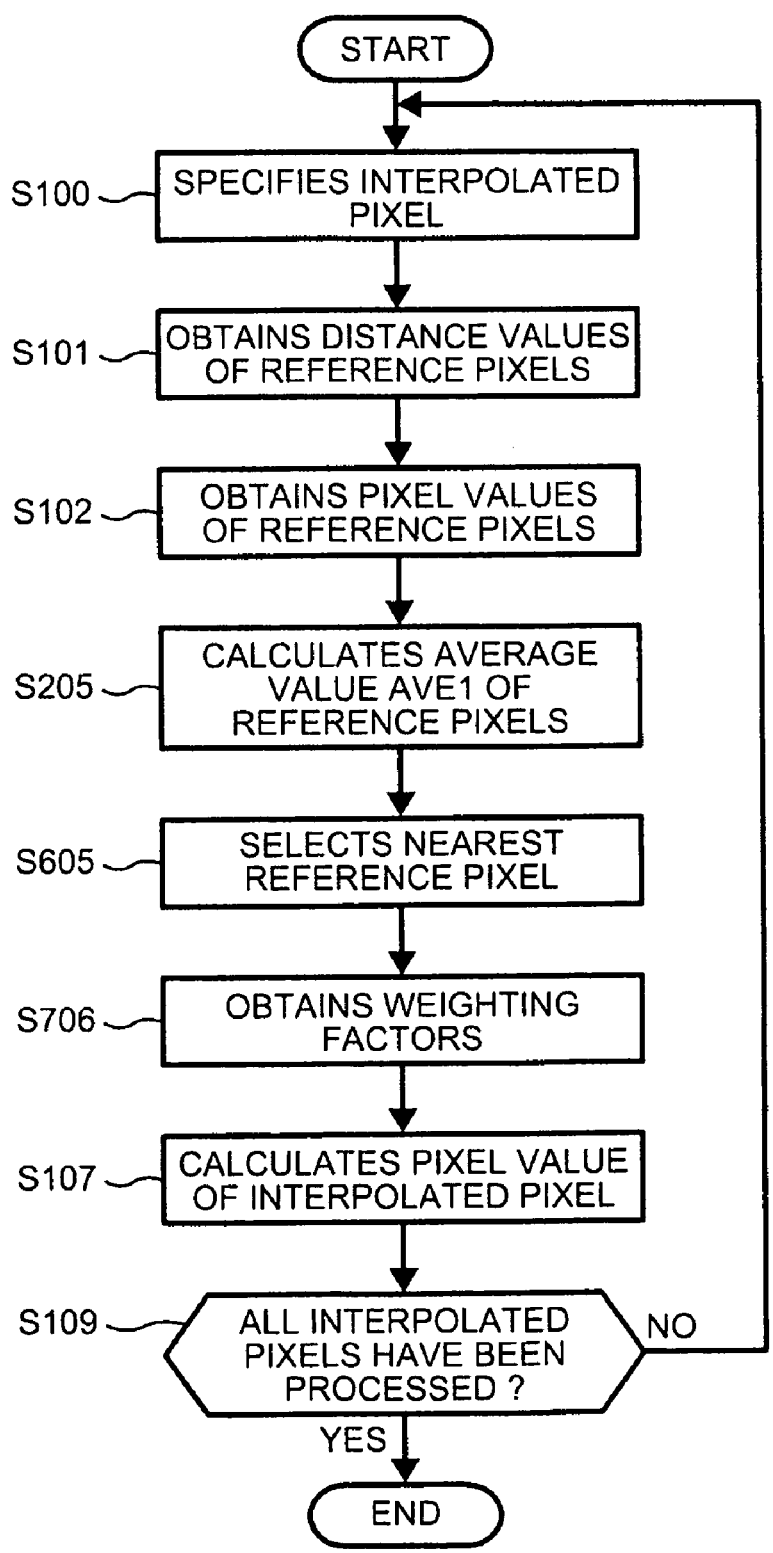
FIG. 12 is a flowchart illustrating an operation for determining a pixel value of an interpolated pixel using a ninth method according to an exemplary embodiment of the present invention.

Referring now to FIGS. 2 and 12, an operation for determining a pixel value of an interpolated pixel using a ninth method is explained according to an exemplary embodiment of the present invention.

The operation using the ninth method shown in FIG. 12 is substantially similar to the operation using the third method shown in FIG. 4. The differences include the addition of Step S605, and replacement of Step S206 with Step S706.

Step S706 obtains a weighting factor for each of the reference pixels other than the nearest reference pixel A using the pixel values obtained in Step S102, the distance values obtained in Step S101, the average values AVE1 obtained in Step S205, and a normalization factor, in a substantially similar manner as described referring to Step S206 of FIG. 4. In this exemplary embodiment, a predetermined value larger than the maximum pixel value of the image data 1, which is 255, is used as the normalization factor. Further, Step S706 obtains a weighting factor for the nearest reference pixel A using the distance value of the nearest reference pixel A obtained in Step S101.

In the example shown in FIG. 2, if the reference pixel A00 corresponds to the nearest reference pixel A, weighting factors Z00, Z10, Z01, and Z11 for the reference pixels A00, A10, A01, and A11 are obtained, respectively, as follows:

$$Z00 = x2*y2;$$

$$Z10 = x1*y2*(1-|a10-AVE11|/256);$$

$$Z01 = x2*y1*(1-|a01-AVE11|/256); \text{ and}$$

$$Z11 = x1*y1*(1-|a11-AVE12|/256).$$

In the example shown in FIG. 2, if the reference pixel A10 corresponds to the nearest reference pixel A, weighting factors Z00, Z10, Z01, and Z11 for the reference pixels A00, A10, A01, and A11 are obtained, respectively, as follows:

$$Z00 = x2*y2*(1-|a00-AVE12|/256);$$

$$Z10 = x1*y2;$$

$$Z01 = x2*y1*(1-|a01-AVE11|/256); \text{ and}$$

$$Z11 = x1*y1*(1-|a11-AVE12|/256).$$

In the example shown in FIG. 2, if the reference pixel A01 corresponds to the nearest reference pixel A, weighting factors Z00, Z10, Z01, and Z11 for the reference pixels A00, A10, A01, and A11 are obtained, respectively, as follows:

$$Z00 = x2*y2*(1-|a00-AVE12|/256);$$

$$Z10 = x1*y2*(1-|a10-AVE11|/256);$$

$$Z01 = x2*y1; \text{ and}$$

$$Z11 = x1*y1*(1-|a11-AVE12|/256).$$

In the example shown in FIG. 2, if the reference pixel A11 corresponds to the nearest reference pixel A, weighting factors Z00, Z10, Z01, and Z11 for the reference pixels A00, A10, A01, and A11 are obtained, respectively, as follows:

$$Z00 = x2*y2*(1-|a00-AVE12|/256);$$

$$Z10 = x1*y2*(1-|a10-AVE11|/256);$$

$$Z01 = x2*y1*(1-|a01-AVE11|/256); \text{ and}$$

$$Z11 = x1*y1.$$

Figure 14F:
FIG. 14F is an exemplary image generated by interpolating the original image of FIG. 14A using the ninth method according to an exemplary embodiment of the present invention.

Using the ninth method, sharpness of an image may be increased as shown in FIG. 14F when compared to the image of FIG. 14B, which is generated using the linear method. Further, the ninth method may be more effective than the cubic convolution method for suppressing a noise component of an original image, as illustrated in FIGS. 14C and 14F.

Referring now to FIGS. 2 and 13, an operation for determining a pixel value of an interpolated pixel using a tenth method is explained according to an exemplary embodiment of the present invention.

The operation using the tenth method shown in FIG. 13 is substantially similar to the operation using the fifth method shown in FIG. 6. The differences include the addition of Step S605, and replacement of Step S406 with Step S806.

According to the tenth method, Step S806 obtains a weighting factor for each of the reference pixels other than the nearest reference pixel A using the pixel values obtained in Step S102, the distance values obtained in Step S101, and a normalization factor, in a substantially similar manner as described referring to Step S406 of FIG. 6. In this exemplary embodiment, a predetermined value larger than the maximum pixel value of the image data 1, which is 255, is used as the normalization factor. Further, Step S806 obtains a weighting factor for the nearest reference pixel A using the distance value of the nearest reference pixel A obtained in Step S101.

In the example shown in FIG. 2, if the reference pixel A00 corresponds to the nearest reference pixel A, weighting factors Z00, Z10, Z01, and Z11 for the reference pixels A00, A10, A01, and A11 are obtained, respectively, as follows:

$$Z00 = x2*y2;$$

$$Z10 = x1*y2*(1-|a10-a01|/256);$$

$$Z01 = x2*y1*(1-|a01-a10|/256); \text{ and}$$

$$Z11 = x1*y1*(1-|a11-a00|/256).$$

In the example shown in FIG. 2, if the reference pixel A10 corresponds to the nearest reference pixel A, weighting factors Z00, Z10, Z01, and Z11 for the reference pixels A00, A10, A01, and A11 are obtained, respectively, as follows:

$$Z00 = x2*y2*(1-|a00-a11|/256);$$

$$Z10 = x1*y2;$$

$$Z01 = x2*y1*(1-|a01-a10|/256); \text{ and}$$

$$Z11 = x1*y1*(1-|a11-a00|/256).$$

In the example shown in FIG. 2, if the reference pixel A01 corresponds to the nearest reference pixel A, weighting factors Z00, Z10, Z01, and Z11 for the reference pixels A00, A10, A01, and A11 are obtained, respectively, as follows:

$$Z00 = x2*y2*(1-|a00-a11|/256);$$

$$Z10 = x1*y2*(1-|a10-a01|/256);$$

$$Z01 = x2*y1; \text{ and}$$

$Z11=x1*y1*(1-|a11-a00|/256)$.

In the example shown in FIG. 2, if the reference pixel A11 corresponds to the nearest reference pixel A, weighting factors Z00, Z10, Z01, and Z11 for the reference pixels A00, A10, A01, and A11 are obtained, respectively, as follows:

$Z00=x2*y2*(1-|a00-a11|/256)$;

$Z10=x1*y2*(1-|a10-a01|/256)$;

$Z01=x2*y1*(1-|a01-a10|/256)$; and $Z11=x1*y1$.

Figure 14G:
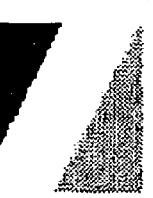
FIG. 14G is an exemplary image generated by interpolating the original image of FIG. 14A using the tenth method according to an exemplary embodiment of the present invention.

Using the tenth method, sharpness of an image may be increased as shown in FIG. 14G when compared to the image of FIG. 14B, which is generated using the linear method. Further, the tenth method may be more effective than the cubic convolution method for suppressing a noise component of an original image, as illustrated in FIGS. 14C and 14G.

Figure 15:
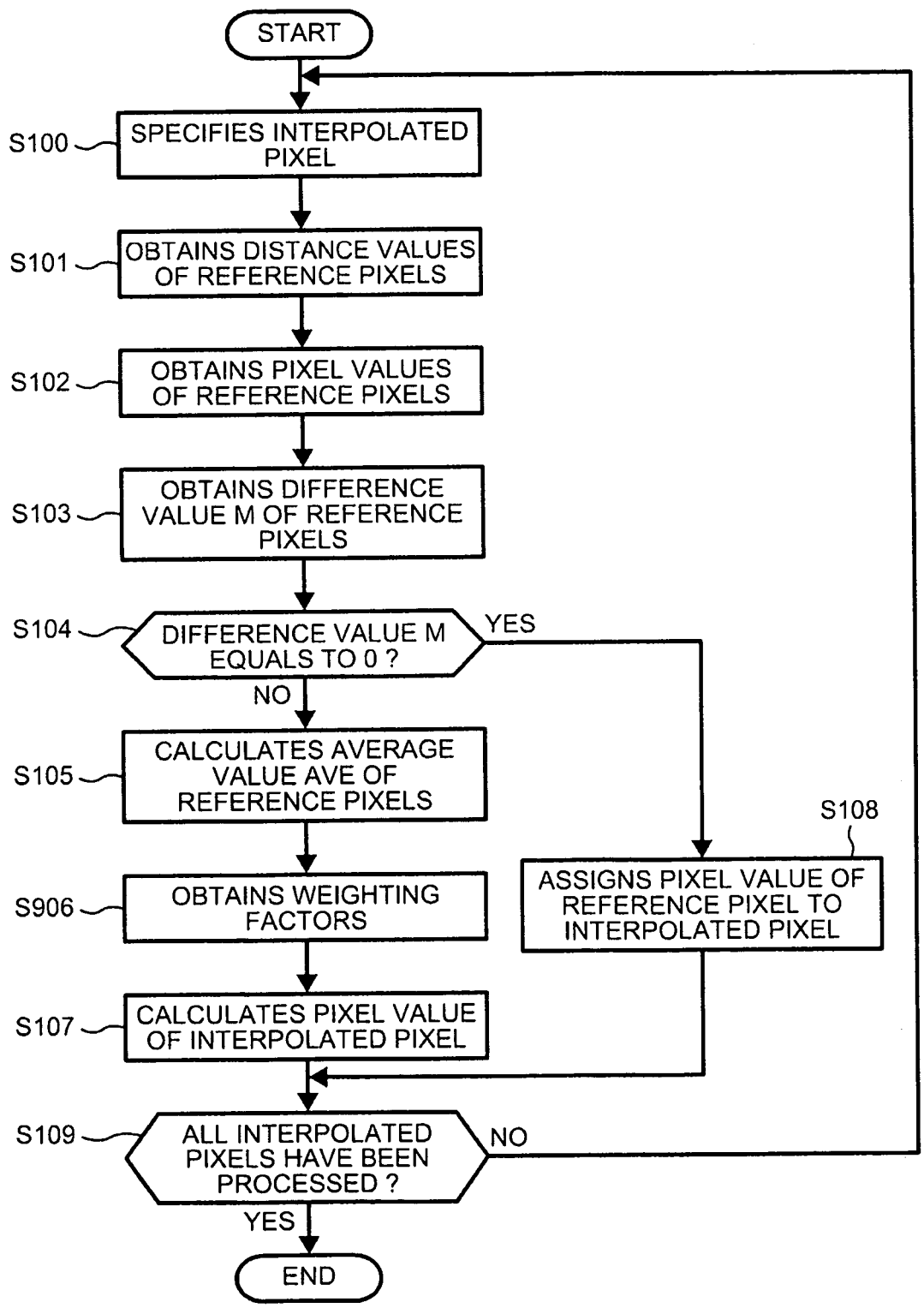
FIG. 15 is a flowchart illustrating an operation for determining a pixel value of an interpolated pixel using an eleventh, twelfth, or thirteenth method according to an exemplary embodiment of the present invention.

Referring now to FIGS. 2 and 15, operations for determining a pixel value of an interpolated pixel using eleventh, twelfth and thirteenth methods are explained, respectively, according to an exemplary embodiment of the present invention.

The operation using any one of the eleventh to thirteenth methods shown in FIG. 15 is substantially similar to the operation using the second method shown in FIG. 3. The differences include the replacement of Step S106 with Step S906.

According to the eleventh method, Step S906 obtains a weighting factor for each of the reference pixels using the pixel values obtained in Step S102, the distance values obtained in Step S101, the average value AVE obtained in Step S105, and a normalization factor. In this exemplary embodiment, the difference value M obtained in Step S103 is used as the normalization factor. Further, in this exemplary embodiment, the distance value is raised to the power of a multiplication value n. The multiplication value n is an arbitrary number larger than 1, preferably larger than 2.

In the example shown in FIG. 2, weighting factors Z00, Z10, Z01, and Z11 for the reference pixels A00, A10, A01, and A11 are obtained, respectively, as follows:

$Z00=(x2*y2)^{n}*(1-|a00-AVE|/M)$;

$Z10=(x1*y2)^{n}*(1-|a10-AVE|/M)$;

$Z01=(x2*y1)^{n}*(1-|a01-AVE|/M)$; and $Z11=(x1*y1)^{n}*(1-|a11-AVE|/M)$.

Figure 16A:
FIG. 16A is an exemplary original image input to the display apparatus of FIG. 1.
Figure 16B:
FIG. 16B is an exemplary image generated by interpolating the original image of FIG. 16A using any one of the first to tenth methods according to an exemplary embodiment of the present invention.
Figure 16C:
FIG. 16C is an exemplary image generated by interpolating the original image of FIG. 16A using the eleventh method according to an exemplary embodiment of the present invention.

Using the eleventh method, sharpness of an image may be increased as shown in FIG. 16C, when compared to the image of FIG. 16B, which is generated using one of the first to tenth methods of the present invention. Further, the eleventh method may be more effective than the known methods for improving sharpness and smoothness of an original image. The known methods includes, for example, the linear method (FIG. 16F), the cubic convolution method (FIG. 16G), or the method disclosed in the '900 patent (FIG. 16H).

The operation using the twelfth method is substantially similar to the operation using the eleventh method, except for the calculation performed in Step S906.

According to the twelfth method, Step S906 obtains a weighting factor for each of the reference pixels using the pixel values obtained in Step S102, the distance values obtained in Step S101, the average value AVE obtained in Step S105, and a normalization factor. In this exemplary embodiment, the difference value M obtained in Step S103 is used as the normalization factor. Further, in this exemplary embodiment, the pixel value is raise to the power of a multiplication value n. The multiplication value n is an arbitrary number larger than 1, preferably larger than 2.

In the example shown in FIG. 2, weighting factors Z00, Z10, Z01, and Z11 for the reference pixels A00, A10, A01, and A11 are obtained, respectively, as follows:

$Z00=(x2*y2)*(1-|a00-AVE|/M)^{n}$;

$Z10=(x1*y2)*(1-|a10-AVE|/M)^{n}$;

$Z01=(x2*y1)*(1-|a01-AVE|/M)^{n}$; and $Z11=(x1*y1)*(1-|a11-AVE|/M)^{n}$.

Figure 16D:
FIG. 16D is an exemplary image generated by interpolating the original image of FIG. 16A using the twelfth method according to an exemplary embodiment of the present invention.

Using the twelfth method, sharpness of an image may be increased while keeping smoothness of the image, as shown in FIG. 16D, when compared to the image of FIG. 16B, which is generated using one of the first to tenth methods of the present invention. Further, the twelfth method may be more effective than the known methods for improving sharpness and smoothness of an original image. The known methods includes, for example, the linear method (FIG. 16F), the cubic convolution method (FIG. 16G), or the method disclosed in the '900 patent (FIG. 16H).

The operation using the thirteenth method is substantially similar to the operation using the eleventh method, except for the calculation performed in Step S906.

According to the thirteenth method, Step S906 obtains a weighting factor for each of the reference pixels using the pixel values obtained in Step S102, the distance values obtained in Step S101, the average value AVE obtained in Step S105, and a normalization factor. In this exemplary embodiment, the difference value M obtained in Step S103 is used as the normalization factor. Further, in this exemplary embodiment, the distance value and the pixel values are raised to the power of multiplication values n and p, respectively. Any one of the multiplication values n and the value p is an arbitrary number larger than 1, preferably, larger than 2.

In the example shown in FIG. 2, weighting factors Z00, Z10, Z01, and Z11 for the reference pixels A00, A10, A01, and A11 are obtained, respectively, as follows:

$Z00=(x2*y2)^{n}*(1-|a00-AVE|/M)^{p}$;

$Z10=(x1*y2)^{n}*(1-|a10-AVE|/M)^{p}$;

$Z01=(x2*y1)^{n}*(1-|a01-AVE|/M)^{p}$;

and $Z11=(x1*y1)^{n}*(1-|a11-AVE|/M)^{p}$.

If the factor n is equal to the factor p, the above equations can be simplified as follows:

$Z00=((x2*y2)*(1-|a00-AVE|/M))^{n}$;

$Z10=((x1*y2)*(1-|a10-AVE|/M))^{n}$;

$Z01=((x2*y1)*(1-|a01-AVE|/M))^{n}$; and $Z11=((x1*y1)*(1-|a11-AVE|/M))^{n}$.

Figure 16E:
FIG. 16E is an exemplary image generated by interpolating the original image of FIG. 16A using the thirteenth method according to an exemplary embodiment of the present invention.
Figure 16F:
FIG. 16F is an exemplary image generated by interpolating the original image of FIG. 16A using the linear method.
Figure 16G:
FIG. 16G is an exemplary image generated by interpolating the original image of FIG. 16A using the cubic convolution method.
Figure 16H:
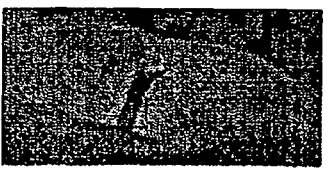
FIG. 16H is an exemplary image generated by interpolating the original image of FIG. 16A using the method disclosed in the '900 patent.

Using the thirteenth method, sharpness of an image may be increased while keeping smoothness of the image, as shown in FIG. 16E, when compared to the image of FIG. 16B, which is generated using one of the first to tenth methods of the present invention. Further, the thirteenth method may be more effective than the known methods for improving sharpness and smoothness of an original image. The known methods includes, for example, the linear method (FIG. 16F), the cubic convolution method (FIG. 16G), or the method disclosed in the '900 patent (FIG. 16H).

In this exemplary embodiment, sharpness and smoothness of an image may be adjusted, by changing the multiplication value of n or p. For example, with the increased value n, a pixel value of an interpolated pixel may be influenced more by a pixel value of its nearest reference pixel. Accordingly, sharpness of the image may be increased. With the increased value p, a pixel value of an interpolated pixel may be influenced more by an average pixel value of the entire image. Accordingly, smoothness of the image may be increased.

According to any one of the above-described and other methods of the present invention, the resolution converter 5 may store calculation results in the conversion data storage 6. Alternatively, the image processing device 9 of FIG. 1 may be additionally provided with a data storage capable of storing various data including the calculation results generated by the resolution converter 5. The additional data storage may increase the processing speed of the image processing device 9, especially when multiplication of the pixel values or the distance values are performed as described above with reference to any one of the eleventh to thirteenth methods.

Figure 17:
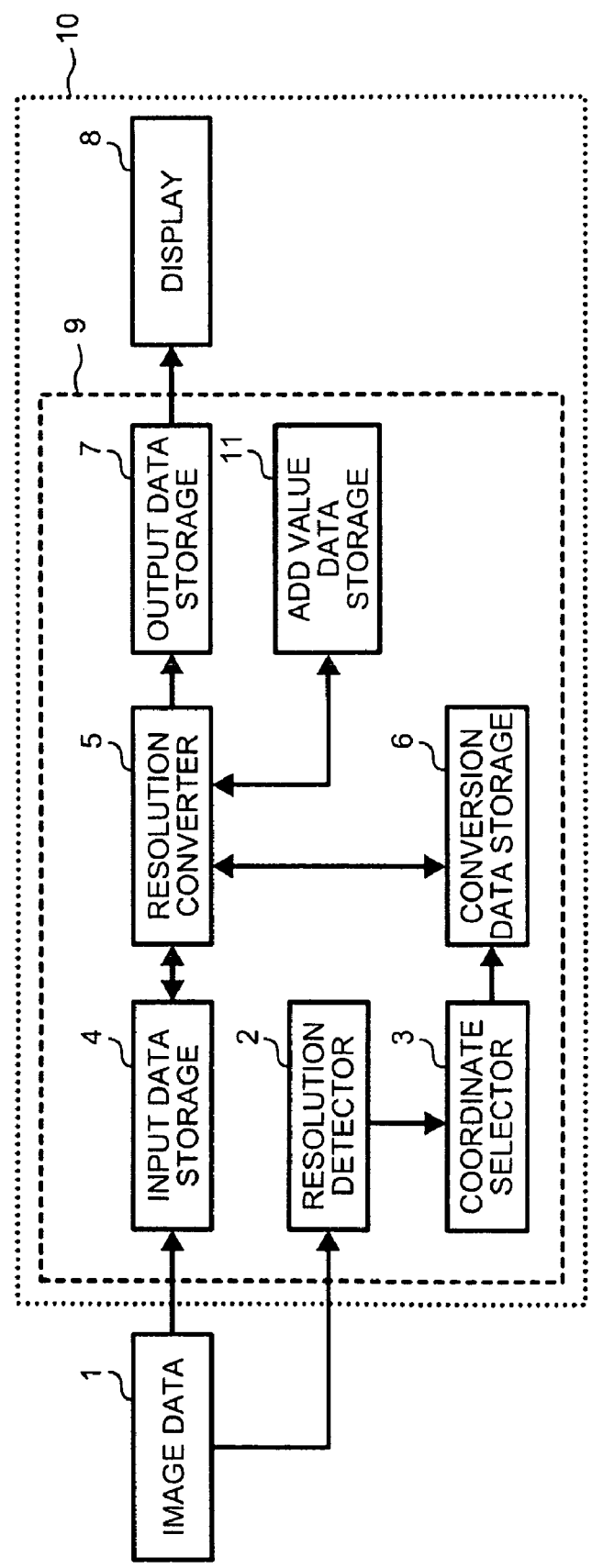
FIG. 17 is a schematic block diagram illustrating a structure of an image display apparatus according to an exemplary embodiment of the present invention.

For example, an add value data storage 11 may be additionally provided to the image processing device 9, as shown in FIG. 17. The add value data storage 11 stores a plurality of weighting factors before multiplication and a plurality of add values in a corresponding manner as a LUT. The resolution converter 5 may multiply the weighting factors using the add values obtained from the add value data storage 11.

Figure 18:
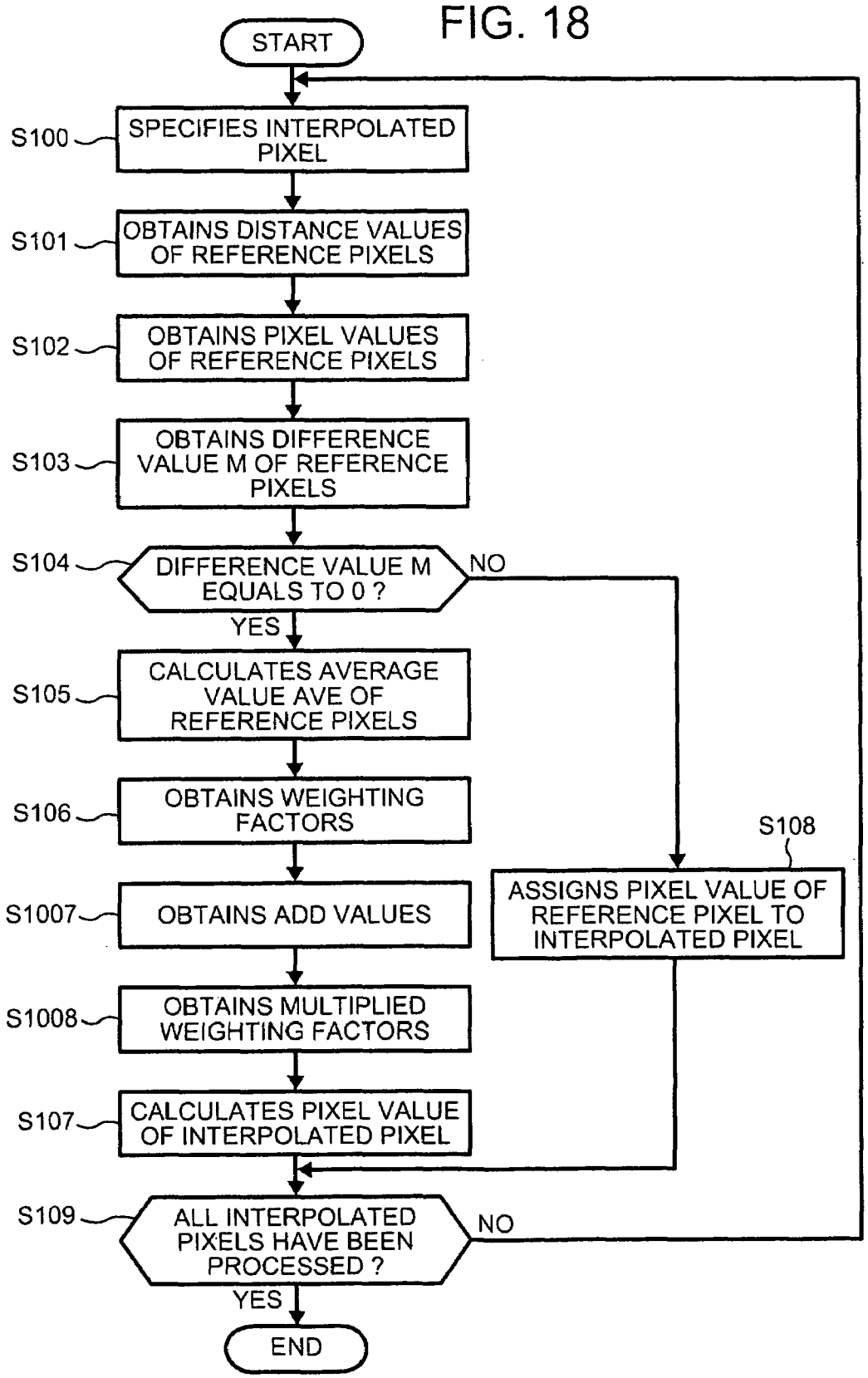
FIG. 18 is a flowchart illustrating an operation for determining a pixel value of an interpolated pixel using the fourteenth or fifteenth method according to an exemplary embodiment of the present invention.

Referring now to FIGS. 2 and 18, operations for determining a pixel value of an interpolated pixel using the fourteenth and fifteenth methods are explained, respectively, according to an exemplary embodiment of the present invention.

The operation using the fourteenth method shown in FIG. 18 is substantially similar to the operation using the first method shown in FIG. 3. The differences include the addition of Steps S1007 and S1008.

According to the fourteenth method, Step S1007 obtains an add value for each of the weighting factors obtained in Step S106 from the LUT stored in the add value data storage 11.

Step S1008 multiplies the weighting factor by the corresponding add value to obtain a multiplied weighting factor.

The operation using the fifteenth method is substantially similar to the operation using the fourteenth method, except for the calculation performed in Step S1008.

Step S1008 adds the add value to the weighting factor to obtain a multiplied weighting factor.

Using any one of the fourteenth and fifteenth methods, the processing speed of the resolution converter 5 may be increased.

In addition to the above-described methods including the first to fifteenth methods, the resolution converter 5 may perform any interpolation method according to the scope of this disclosure and appended claims. For example, elements, features, or functions of the above-described methods may be combined with each other and/or substituted for each other within the scope of this disclosure and appended claims. In operation, the resolution converter 5 may select at least one of the above-described and other methods of the present invention according to a user's preference, for example. Alternatively, the resolution converter 5 may select at least one of the above-described and other methods of the present invention according to entire or local image characteristics. To make a selection, the image processing device 9 may be additionally provided with a selector capable of selecting at least one of the above-described and other methods of the present invention according to a user's preference or characteristics of an image.

Further, in addition to any one of the above-described and other methods of the present invention, the resolution converter 5 may perform any one of the known interpolation methods, including the linear method, cubic convolution method, or the nearest neighbor method, for example. In operation, the resolution converter 5 may select at least one of the above-described and other methods of the present invention, and the known interpolation methods according to a user's preference. Alternatively, the resolution converter 5 may select at least one of the above-described and other methods of the present invention, and the known interpolation methods according to entire or local image characteristics. To make a selection, the image processing device 9 may be additionally provided with a selector capable of selecting at least one of the above-described and other methods of the present invention, and the known interpolation methods according to a user's preference or characteristics of an image.

Figure 19:
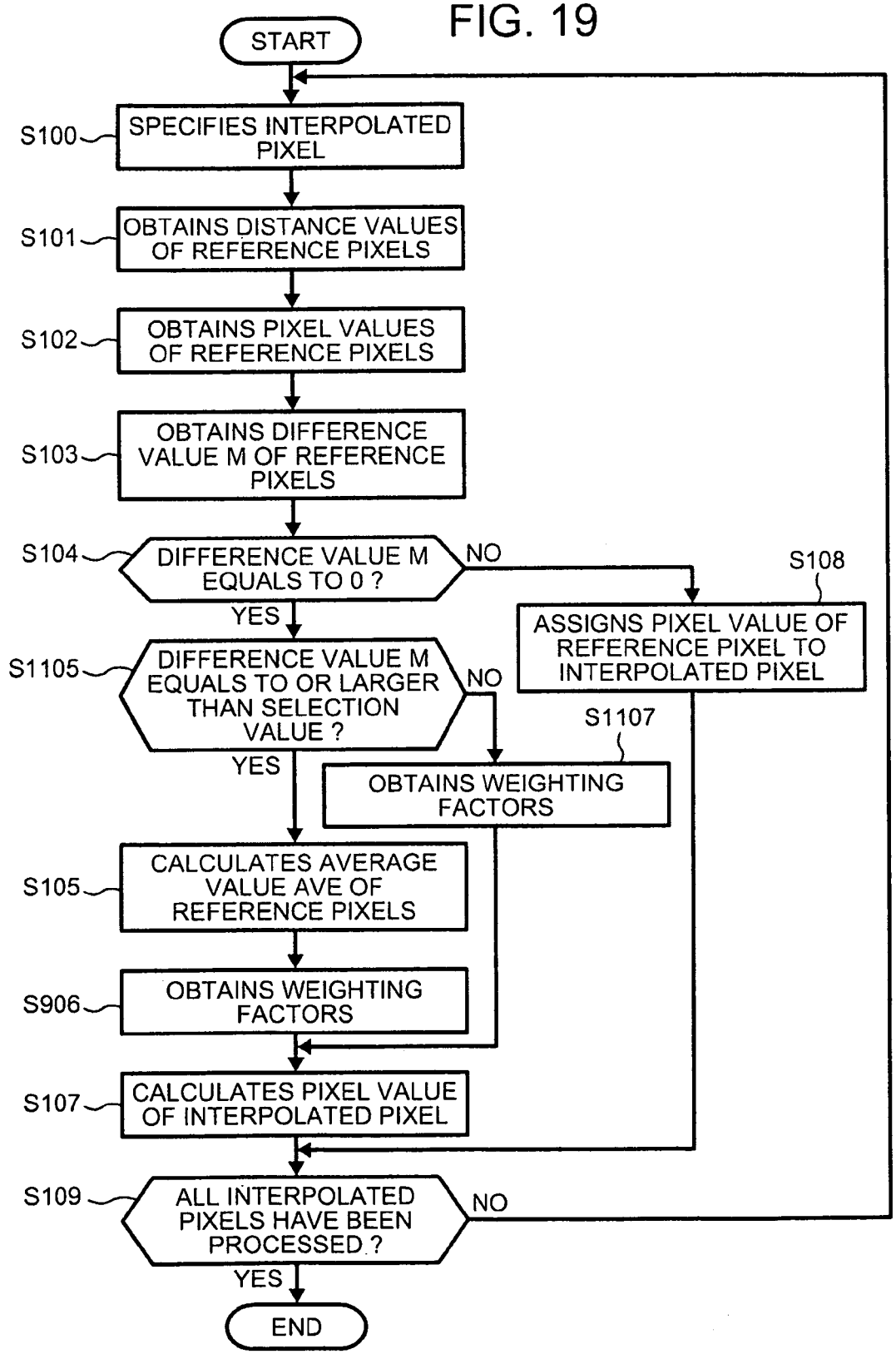
FIG. 19 is a flowchart illustrating an operation for determining a pixel value of an interpolated pixel using a sixteenth method according to an exemplary embodiment of the present invention.

Referring now to FIGS. 2 and 19, an operation for determining a pixel value of an interpolated pixel using a sixteenth method is explained according to an exemplary embodiment of the present invention.

The operation using the sixteenth method shown in FIG. 19 is substantially similar to the operation using the first method shown in FIG. 3. The differences include the addition of Steps S1105 and S1107, and replacement of Step S106 with S906.

Step S1105 determines whether the difference value M obtained in Step S103 is equal to or larger than a predetermined selection value. If the difference value M is smaller than the selection value ("NO" in Step S1105), the operation proceeds to Step S1107. If the difference value M is equal to or larger than the selection value ("YES" in Step S1105), the operation proceeds to Step S105.

As described with reference to FIG. 3, the difference value M indicates a difference between a maximum value MAX and a minimum value MIN of the reference pixels. In this exemplary embodiment, the selection value corresponds to any pixel value between 0 and 255, which may be used for selecting an interpolation method suitable for processing the specified interpolated pixel. For example, the selection value may be set to the pixel value of 128. Further, in this exemplary embodiment, the resolution converter 5 is assumed to select either one of the interpolation methods including the twelfth method of the present invention and the linear method. However, the resolution converter 5 is capable of selecting at least one of the interpolation methods, including any one of the methods of the present invention and the known methods.

As described above, if the difference value M of the reference pixels is smaller than the selection value, the resolution converter 5 assumes that variations in pixel values of the reference pixels are relatively small. Based on this characteristic, the linear method is selected, which is suitable for enhancing smoothness of the image. Examples of an image having small variations in pixel values include an image having a character or a line.

If the difference value M of the reference pixels is equal to or larger than the selection value, the resolution converter 5 assumes that variations in pixel values of the reference pixels are relatively large. Based on this characteristic, the twelfth method is selected, which is suitable for enhancing sharpness of the image. Examples of an image having large variations in pixel values include an image having a picture image.

Step S1107 obtains a weighting factor for each of the reference pixels using the linear method. In the example shown in FIG. 2, weighting factors Z00, Z10, Z01, and Z11 for the reference pixels A00, A10, A01, and A11 are obtained, respectively, as follows:

$$Z00=x2*y2;$$

$$Z10=x1*y2;$$

$$Z01=x2*y1; \text{ and}$$

$$Z11=x1*y1.$$

Step S906 obtains a weighting factor for each of the reference pixels using the twelfth method of the present invention. In the example shown in FIG. 2, weighting factors Z00, Z10, Z01, and Z11 for the reference pixels A00, A10, A01, and A11 are obtained, respectively, as follows:

$$Z00=(x2*y2)*(1-|a00-AVE|/M)^n;$$

$$Z10=(x1*y2)*(1-|a10-AVE|/M)^n;$$

$$Z01=(x2*y1)*(1-|a01-AVE|/M)^n; \text{ and}$$

$$Z11=(x1*y1)*(1-|a11-AVE|/M)^n.$$

In this exemplary embodiment, the multiplication value n is set to 3, however, any number larger than 1, preferably larger than 2, may be used.

Step S107 calculates a pixel value of the interpolated pixel using the pixel values of the reference pixels. In this exemplary embodiment, each of the pixel values is weighted with the corresponding weighting factor obtained in Step S906 or S1107.

In the example shown in FIG. 2, if the linear method is selected, the pixel values a00, a10, a01, and a11 are weighted with the weighting factors Z00, Z10, Z01 and Z11, respectively. Thus, the pixel value b of the interpolated pixel B may be obtained as follows:

$$b=(Z00*a00+Z10*a10+Z01*a01+Z11*a11)/(Z00+Z10+Z01+Z11).$$

Since the sum of the pixel values of the reference pixels (Z00+Z10+Z01+Z11) is 1, the above equation can be further simplified to:

$$b=Z00*a00+Z10*a10+Z01*a01+Z11*a11.$$

In the example shown in FIG. 2, if the twelfth method is selected, the pixel values a00, a10, a01, and a11 are weighted with the weighting factors Z00, Z10, Z01 and Z11, respectively. Thus, the pixel value b of the interpolated pixel B may be obtained as follows:

$$b=(Z00*a00+Z10*a10+Z01*a01+Z11*a11)/(Z00+Z10+Z01+Z11).$$

Figure 25A:
FIG. 25A is an exemplary original image to be input to the display apparatus of FIG. 1 according to an exemplary embodiment of the present invention.
Figure 25B:
FIG. 25B is an exemplary image generated by interpolating the original image of FIG. 25A using the linear method.
Figure 25C:
FIG. 25C is an exemplary image generated by interpolating the original image of FIG. 25A using the twelfth method according to an exemplary embodiment of the present invention.
Figure 25D:
FIG. 25D is an exemplary image generated by interpolating the original image of FIG. 25A using the sixteenth method according to an exemplary embodiment of the present invention.

Using the sixteenth method, smoothness and sharpness of an image may be controlled according to local image characteristics, as shown in FIGS. 25A to 25D. The original image shown in FIG. 25A has an upper portion having a picture image, and a bottom portion having diagonal lines and characters. If the original image of FIG. 25A is interpolated using the linear method as illustrated in FIG. 25B, the bottom portion of the image suffers from blurring and jaggedness. If the original image of FIG. 25A is interpolated using the twelfth method as illustrated in FIG. 25C, the upper portion of the image suffers from jaggedness. By combining the linear method and the twelfth method, the sixteenth method can generate the image having an upper portion that is smooth, and a bottom portion that is sharp, as illustrated in FIG. 25D.

Further, in this exemplary embodiment, most of the steps illustrated in FIG. 19 are shared by the linear method and the twelfth method, thus increasing the overall processing speed.

Figure 20:
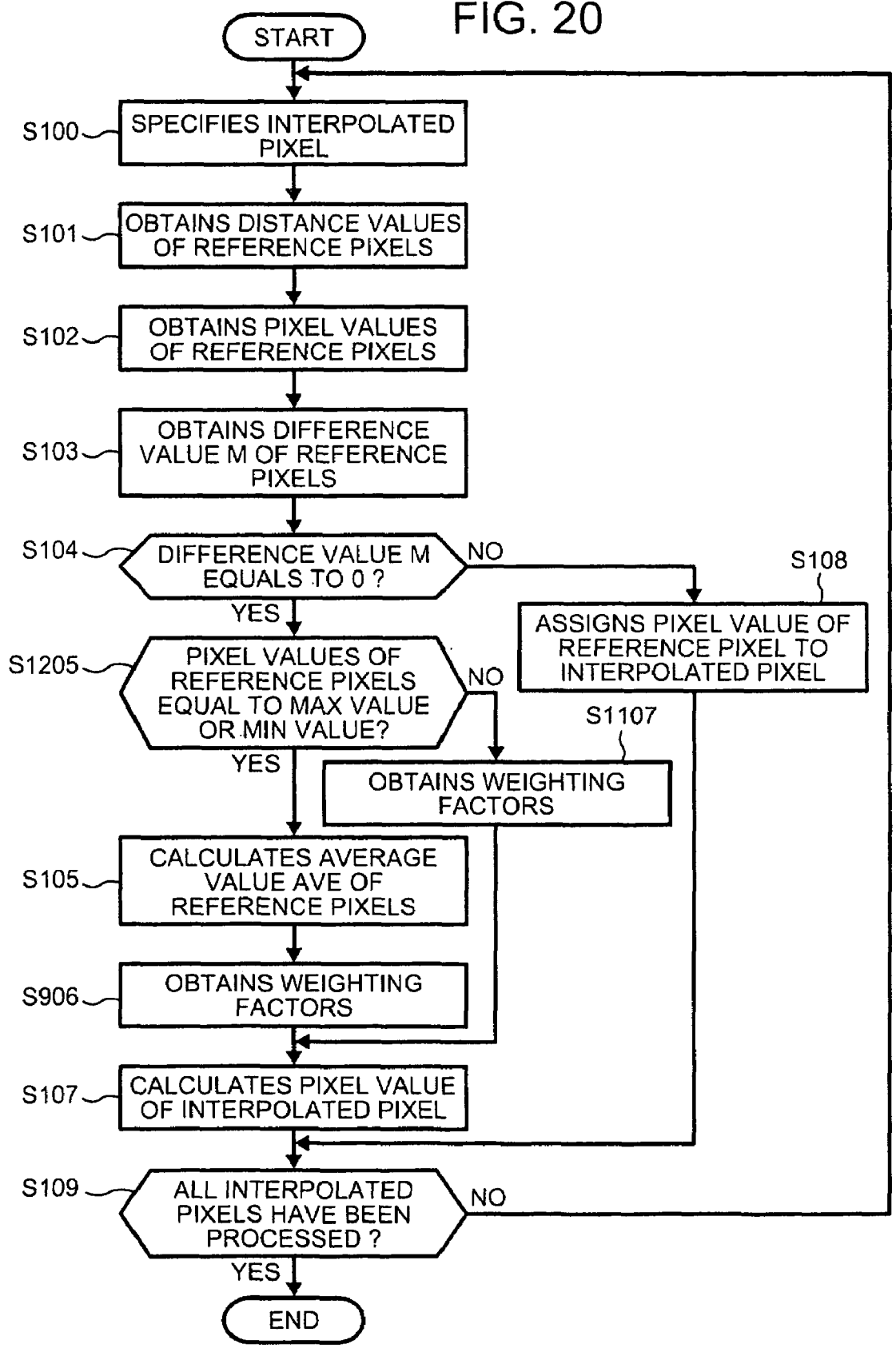
FIG. 20 is a flowchart illustrating an operation for determining a pixel value of an interpolated pixel using a seventeenth method according to an exemplary embodiment of the present invention.

Referring now to FIGS. 2 and 20, an operation for determining a pixel value of an interpolated pixel using a seventeenth method is explained according to an exemplary embodiment of the present invention.

The operation using the seventeenth method shown in FIG. 20 is substantially similar to the operation using the seventeenth method shown in FIG. 19. The differences include replacement of Step S1105 with Step S1205.

Step S1205 determines whether the pixel value of each of the reference pixels is equal to either the maximum value MAX and the minimum value MIN of the reference pixels. If the pixel value of the reference pixel is equal to the maximum value MAX or the minimum value MIN ("YES" in Step S1205), the operation proceeds to Step S105. Otherwise ("NO" in Step S1205), the operation proceeds to Step S1107.

In this exemplary embodiment, if the pixel value of each of the reference pixels is equal to either the maximum value MAX and the minimum value MIN, the resolution converter 5 assumes that the original image, or at least the portion having the reference pixels, is a binary image. Based on this characteristic, the twelfth method is selected, which is suitable for enhancing sharpness of the image.

In this exemplary embodiment, if the pixel value of each of the reference pixels is not equal to either one of the maximum value MAX and the minimum value MIN, the resolution converter 5 assumes that the original image, or at least the portion having the reference pixels, is a multivalue image. Based on this characteristic, the linear method is selected, which is suitable for enhancing smoothness of the image.

Figure 25E:
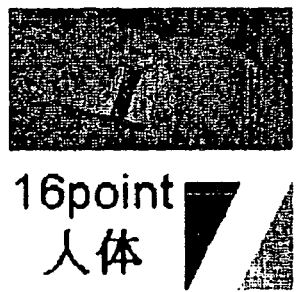
FIG. 25E is an exemplary image generated by interpolating the original image of FIG. 25A using the seventeenth method according to an exemplary embodiment of the present invention.

Using the seventeenth method, smoothness and sharpness of an image may be controlled according to local image characteristics, as shown in FIGS. 25A, 25B, 25C, and 25E. By combining the linear method (FIG. 25B) and the twelfth method (FIG. 25C), the seventeenth method can generate the image having an upper portion that is smooth, and a bottom portion that is sharp, as illustrated in FIG. 25E.

Further, in this exemplary embodiment, most of the steps illustrated in FIG. 20 are shared by the linear method and the twelfth method, thus increasing an overall processing speed.

Figure 21A:
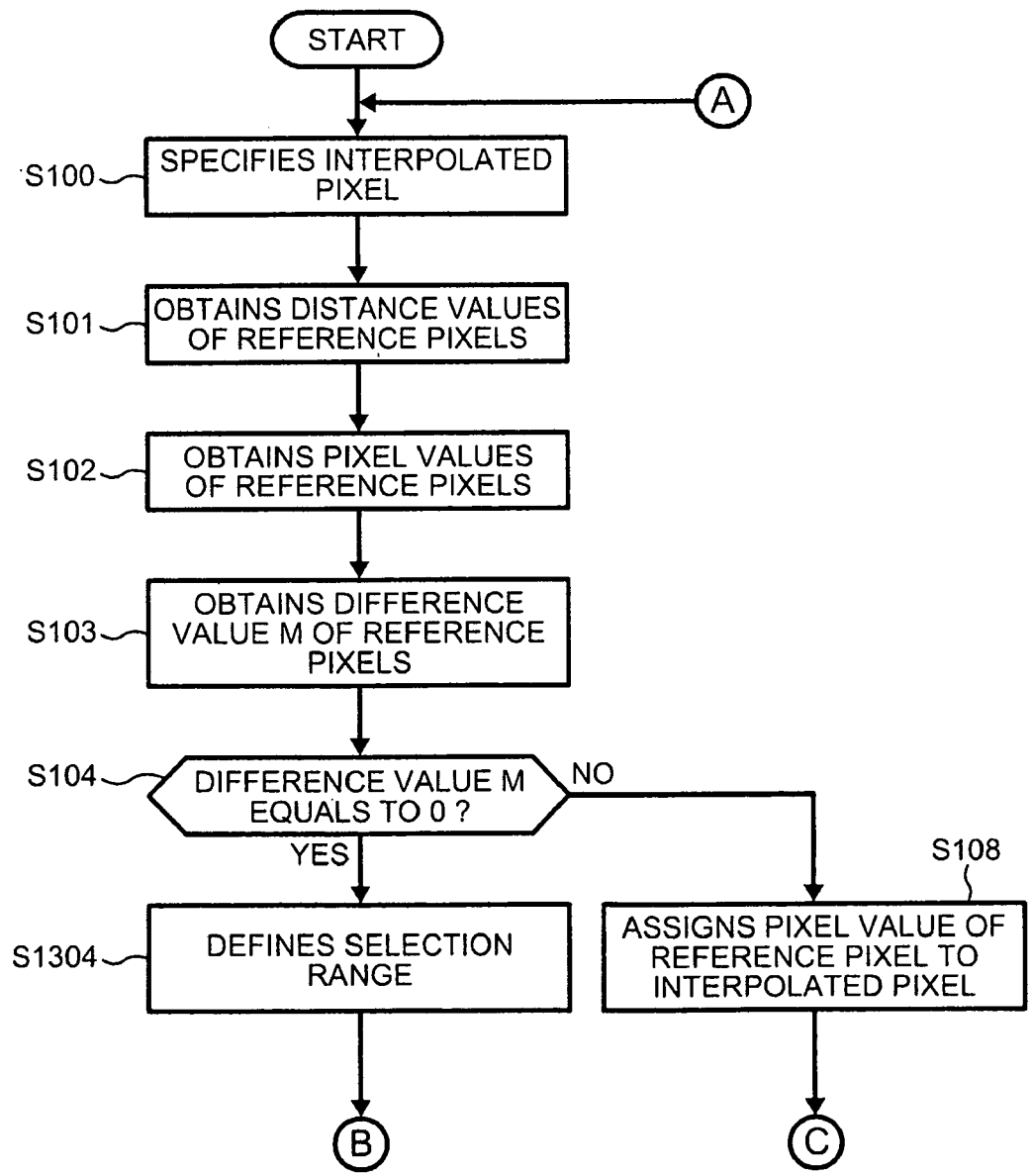
FIG. 21 is a flowchart illustrating an operation for determining a pixel value of an interpolated pixel using an eighteenth method according to an exemplary embodiment of the present invention.
Figure 21B:
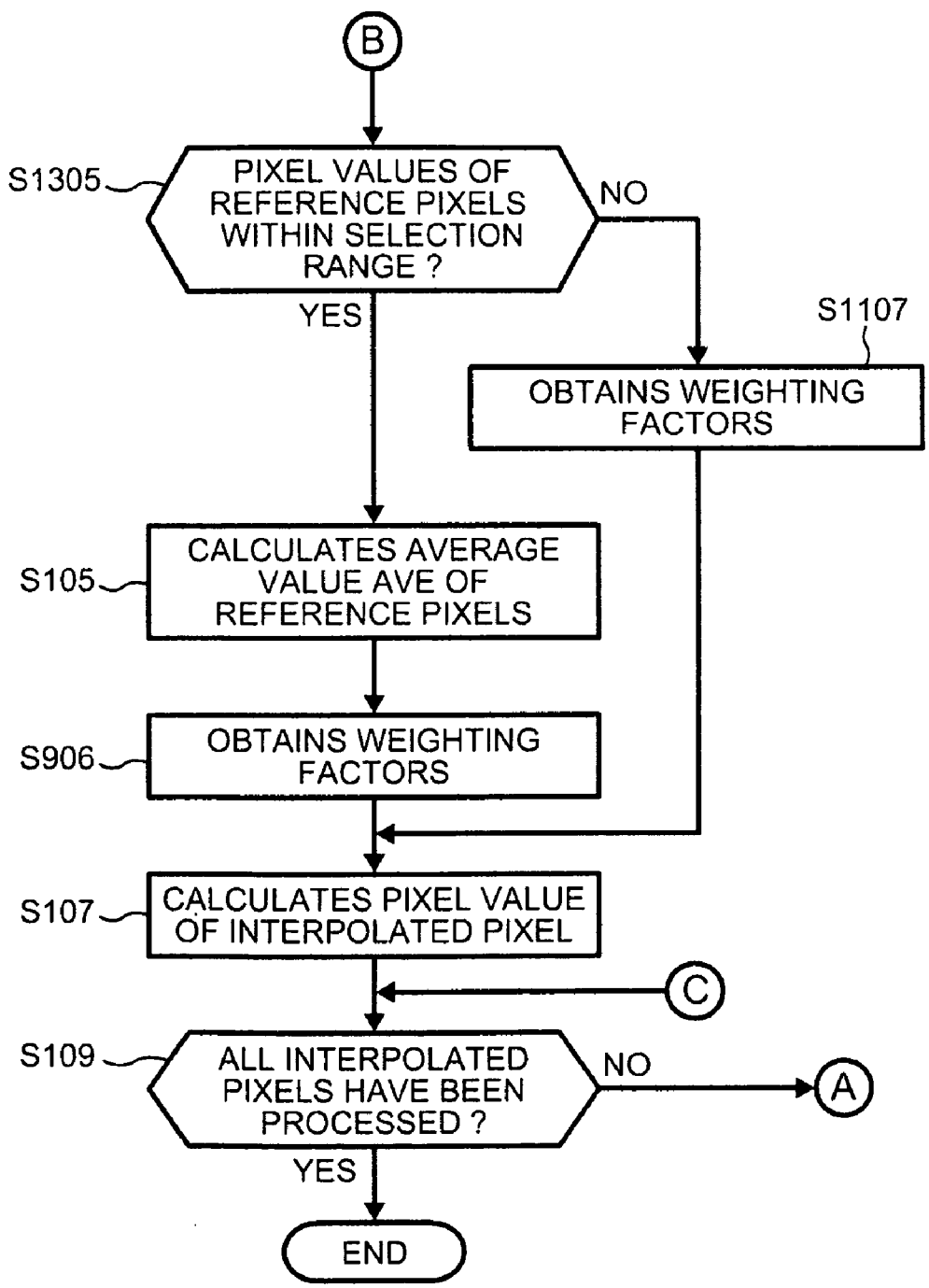

Referring now to FIGS. 2 and 21, an operation for determining a pixel value of an interpolated pixel using a eighteenth method is explained according to an exemplary embodiment of the present invention.

The operation using the eighteenth method shown in FIG. 21 is substantially similar to the operation using the sixteenth method shown in FIG. 19. The differences include the addition of Step S1304, and replacement of Step S1105 with Step S1305.

Step S1304 defines a selection range, which may be used for selecting an interpolation method suitable for processing the specified interpolated pixel. The selection range may be defined based on a predetermined constant M2. The predetermined constant M2 may be any value, however, in this exemplary embodiment, the predetermined constant M2 is defined based on the difference value M as illustrated in the following equation: M2=M/S, wherein S is any value larger than 2. Based on the predetermined constant M2, the selection range may be defined as a range that is larger than (MAX−M2) or smaller than (MIN+M2). The value MAX and the value MIN correspond to the maximum value and the minimum value of the reference pixels.

Step S1305 determines whether the pixel value of each of the reference pixels is within the selection range defined in Step S1304. If the pixel value of the reference pixel is within the selection range ("YES" in Step S1305), the operation proceeds to Step S105. If the pixel value of the reference pixel is out of the selection range ("NO" in Step S1305), the operation proceeds to Step S1107.

In this exemplary embodiment, if the pixel value of each of the reference pixels is within the selection range, the resolution converter 5 assumes that the original image, or at least the portion having the reference pixels, is an image having small variations in pixel values such as a gradation image. Based on this characteristic, the twelfth method is selected, which is suitable for enhancing sharpness of the image.

In this exemplary embodiment, if the pixel value of each of the reference pixels is out of the selection range, the resolution converter 5 assumes that the original image, or at least the portion having the reference pixels, is a multivalue image, or an image having large variations in pixel values. Based on these characteristics, the linear method is selected, which is suitable for enhancing smoothness of the image.

Figure 25F:
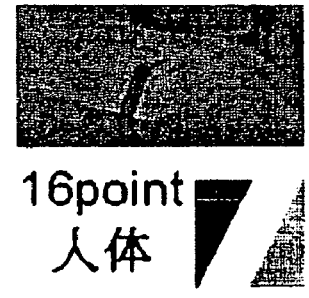
FIG. 25F is an exemplary image generated by interpolating the original image of FIG. 25A using the eighteenth method according to an exemplary embodiment of the present invention.

Using the eighteenth method, smoothness and sharpness of an image may be controlled according to local image characteristics, as shown in FIGS. 25A, 25B, 25C and 25F. By combining the linear method (FIG. 25B) and the twelfth method (FIG. 25C), the eighteenth method can generate the image having the upper portion that is smooth, and the bottom portion that is sharp, as illustrated in FIG. 25F. To generate the image shown in FIG. 25F, the value S is set to 8, and the value n is set to 3, respectively.

Further, in this exemplary embodiment, most of the steps illustrated in FIG. 21 are shared by the linear method and the twelfth method, thus increasing an overall processing speed.

Figure 22:
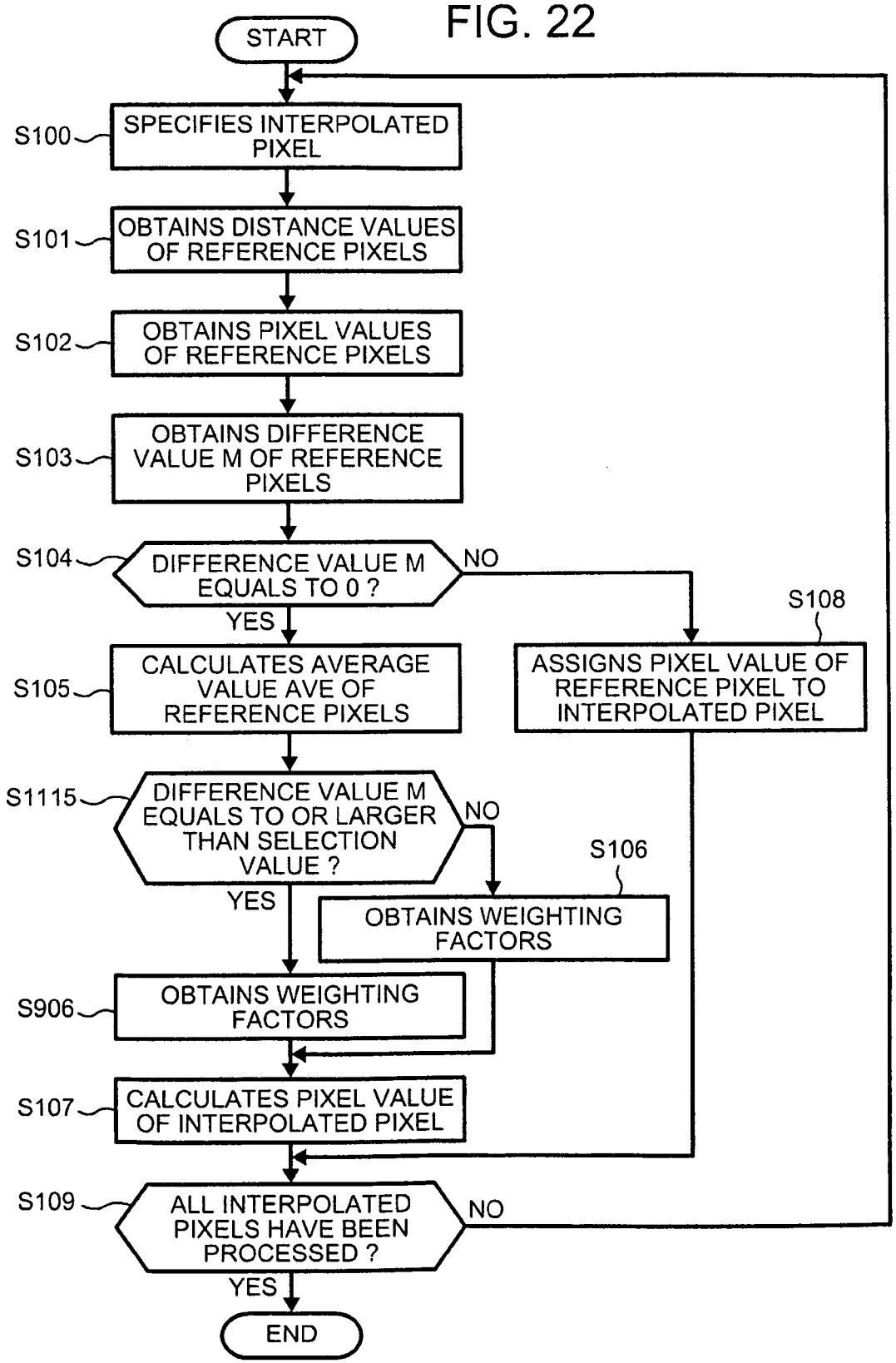
FIG. 22 is a flowchart illustrating an operation for determining a pixel value of an interpolated pixel using a nineteenth method according to an exemplary embodiment of the present invention.

Referring now to FIGS. 2 and 22, an operation for determining a pixel value of an interpolated pixel using a nineteenth method is explained according to an exemplary embodiment of the present invention.

The operation using the nineteenth method shown in FIG. 22 is substantially similar to the operation using the seventeenth method in FIG. 19. The differences include the replacement of Step S1105 with Step S1115, and replacement of Step S1107 with Step S106. Further, the order of the steps illustrated in FIG. 22 differs from the order of the steps illustrated in FIG. 19.

Step S1115 determines whether the difference value M obtained in Step S103 is equal to or larger than a predetermined selection value. If the difference value M is smaller than the selection value ("NO" in Step S1115), the operation proceeds to Step S106. If the difference value M is equal to or larger than the predetermined selection value ("YES" in Step S1115), the operation proceeds to Step S906.

As described with reference to FIG. 3, the difference value M indicates a difference between a maximum value MAX and a minimum value MIN of the reference pixels. In this exemplary embodiment, the selection value corresponds to any pixel value between 0 and 255, which may be used for selecting an interpolation method suitable for processing the specified interpolated pixel. For example, the selection value may be set to the pixel value of 128. Further, in this exemplary embodiment, the resolution converter 5 is assumed to select either one of the interpolation methods including the twelfth method and the second method of the present invention. However, the resolution converter 5 is capable of selecting at least one of the interpolation methods, including any one of the methods of the present invention and the known methods.

As described above, if the difference value M of the reference pixels is smaller than the selection value, the resolution converter 5 assumes that variations in pixel values of the reference pixels are relatively small. Based on this characteristic, the second method is selected, which is suitable for enhancing smoothness of the image.

If the difference value M of the reference pixels is equal to or larger than the selection value, the resolution converter 5 assumes that variations in pixel values of the reference pixels are relatively large. Based on this characteristic, the twelfth method is selected, which is suitable for enhancing sharpness of the image.

Step S106 obtains a weighting factor for each of the reference pixels using the second method. In the example shown in FIG. 2, weighting factors Z00, Z10, Z01, and Z11 for the reference pixels A00, A10, A01, and A11 are obtained, respectively, as follows:

$Z00 = x2*y2*(1-|a00-AVE|/M);$ $Z10 = x1*y2*(1-|a10-AVE|/M);$ $Z01 = x2*y1*(1-|a01-AVE|/M);$ and $Z11 = x1*y1*(1-|a11-AVE|/M).$ Step S107 calculates a pixel value of the interpolated pixel using the pixel values of the reference pixels. In this exemplary embodiment, each of the pixel values is weighted with the corresponding weighting factor obtained in Step S906 or S106.

In the example shown in FIG. 2, the pixel values a00, a10, a01, and a11 are weighted with the weighting factors Z00, Z10, Z01 and Z11, respectively. Thus, the pixel value b of the interpolated pixel B may be obtained as follows:

$b = (Z00*a00+Z10*a10+Z01*a01+Z11*a11)/(Z00+Z10+Z01+Z11).$

Figure 25G:
FIG. 25G is an exemplary image generated by interpolating the original image of FIG. 25A using the second method according to an exemplary embodiment of the present invention.
Figure 25H:
FIG. 25H is an exemplary image generated by interpolating the original image of FIG. 25A using the nineteenth method according to an exemplary embodiment of the present invention.

Using the nineteenth method, smoothness and sharpness of an image may be controlled according to local image characteristics, as shown in FIGS. 25A, 25C, 25G, 25H, 25K and 25L. The original image shown in FIG. 25A has an upper portion having a picture image, and a bottom portion having diagonal lines and characters. If the original image of FIG. 25A is interpolated using the second method as illustrated in FIG. 25G, smoothness and sharpness of the image may be enhanced as compared to the image generated using the method disclosed in the '900 patent shown in FIG. 25K or the image generated using the cubic convolution method shown in FIG. 25L. However, the image of FIG. 25G may still suffer from blurring and jaggedness in the bottom portion. If the original image of FIG. 25A is interpolated using the twelfth method as illustrated in FIG. 25C, the upper portion of the image suffers from jaggedness. By combining the second method (FIG. 25G) and the twelfth method (FIG. 25C), the nineteenth method can generate the image having an upper portion that is smooth, and a bottom portion that is sharp, as illustrated in FIG. 25H.

Further, in this exemplary embodiment, most of the steps illustrated in FIG. 22 are shared by the second method and the twelfth method, thus increasing an overall processing speed.

Figure 23:
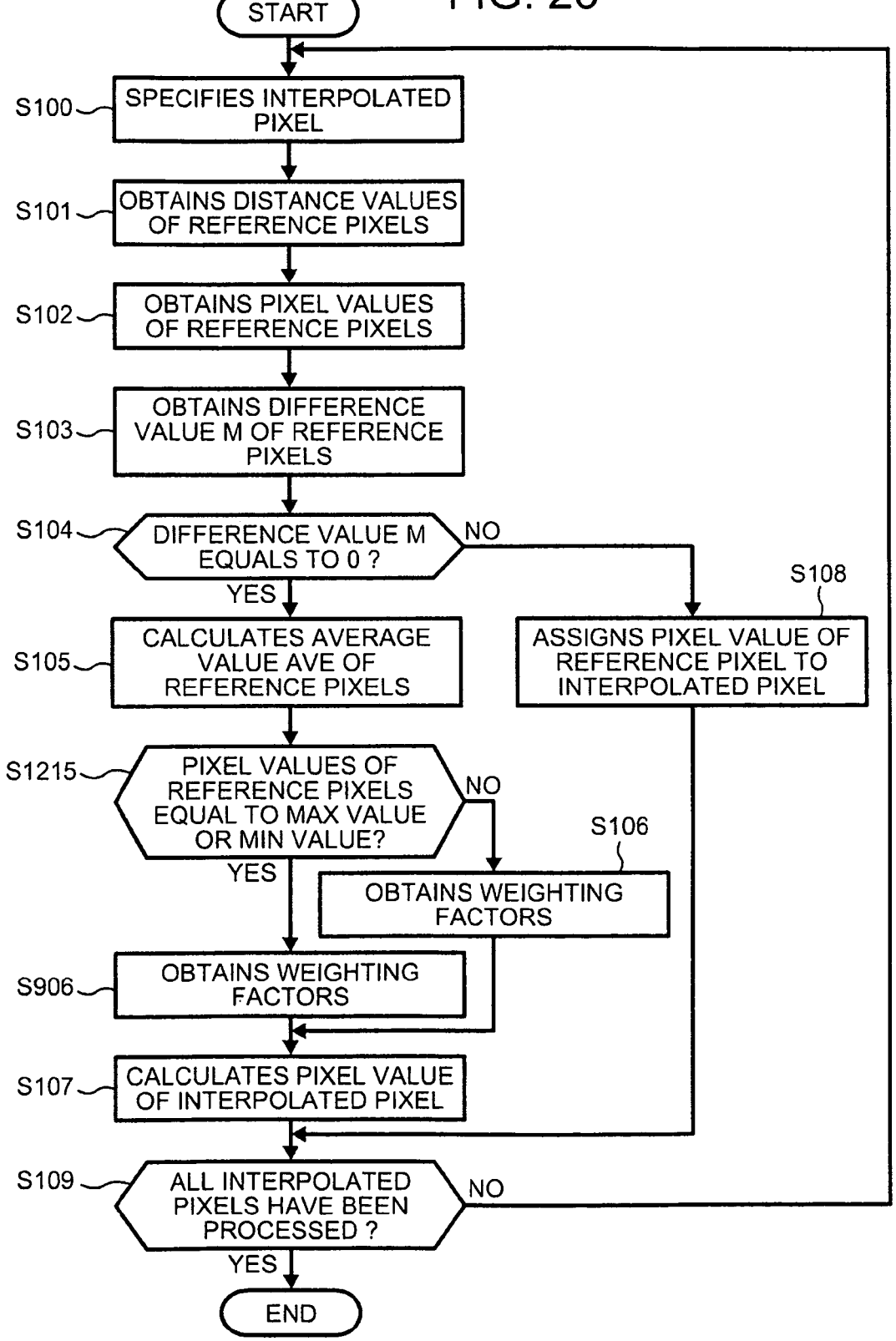
FIG. 23 is a flowchart illustrating an operation for determining a pixel value of an interpolated pixel using a twentieth method according to an exemplary embodiment of the present invention.

Referring now to FIGS. 2 and 23, an operation for determining a pixel value of an interpolated pixel using a twentieth method is explained according to an exemplary embodiment of the present invention.

The operation using the twentieth method shown in FIG. 23 is substantially similar to the operation using the seventeenth method shown in FIG. 20. The differences include replacement of Step S1205 with Step S1215, and replacement of Step S1107 with Step S106. Further, the order of the steps illustrated in FIG. 23 differs from the order of the steps illustrated in FIG. 20.

Step S1215 determines whether the pixel value of each of the reference pixels is equal to either the maximum value MAX and the minimum value MIN of the reference pixels. If the pixel value of the reference pixel is equal to the maximum value MAX or the minimum value MIN ("YES" in Step S1215), the operation proceeds to Step S906. Otherwise ("NO" in Step S1215), the operation proceeds to Step S106.

In this exemplary embodiment, if the pixel value of each of the reference pixels is equal to either the maximum value MAX and the minimum value MIN, the resolution converter 5 assumes that the original image, or at least the portion having the reference pixels, is a binary image. Based on this characteristic, the twelfth method is selected, which is suitable for enhancing sharpness of the image.

In this exemplary embodiment, if the pixel value of each of the reference pixels is not equal to either the maximum value MAX and the minimum value MIN, the resolution converter 5 assumes that the original image, or at least the portion having the reference pixels, is a multivalue image. Based on this characteristic, the second method is selected, which is suitable for enhancing smoothness of the image.

Figure 25I:
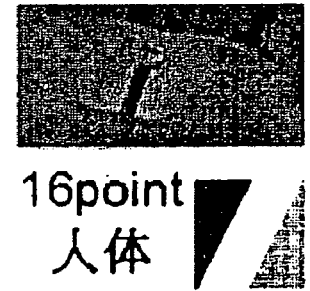
FIG. 25I is an exemplary image generated by interpolating the original image of FIG. 25A using the twentieth method according to an exemplary embodiment of the present invention.

Using the twentieth method, smoothness and sharpness of an image may be controlled according to local image characteristics, as shown in FIGS. 25A, 25C, 25G, and 25I. By combining the second method (FIG. 25G) and the twelfth method (FIG. 25C), the twentieth method can generate the image having an upper portion that is smooth, and a bottom portion that is sharp, as illustrated in FIG. 25I.

Further, in this exemplary embodiment, most of the steps illustrated in FIG. 23 are shared by the second method and the twelfth method, thus increasing the overall processing speed.

Figure 24A:
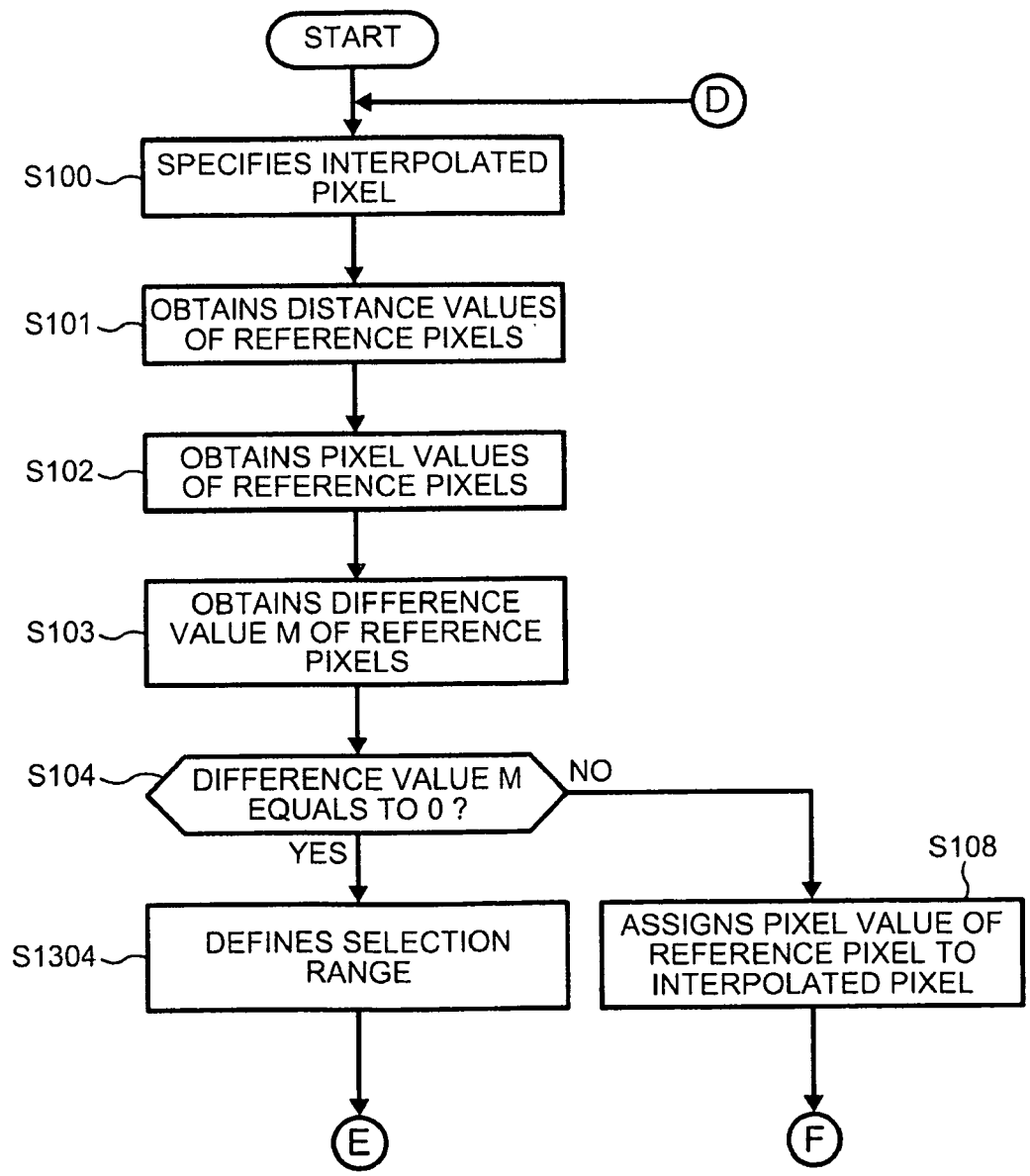
FIG. 24 is a flowchart illustrating an operation for determining a pixel value of an interpolated pixel using a twenty-first method according to an exemplary embodiment of the present invention.
Figure 24B:
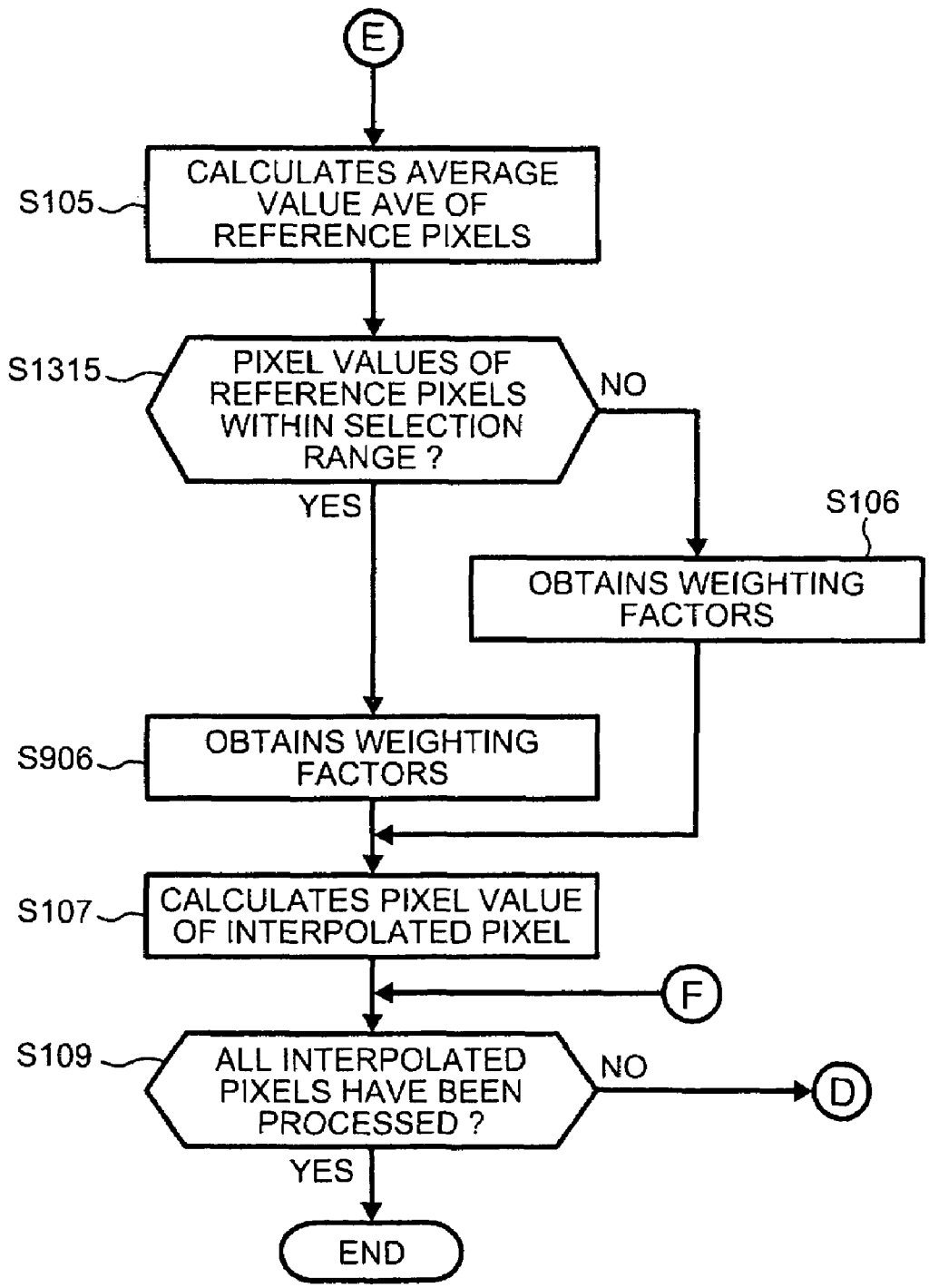

Referring now to FIGS. 2 and 24, an operation for determining a pixel value of an interpolated pixel using a twenty-first method is explained according to an exemplary embodiment of the present invention.

The operation using the twenty-first method shown in FIG. 24 is substantially similar to the operation using the eighteenth method shown in FIG. 21. The differences include replacement of Step S1305 with Step S1315, and replacement of S1107 with Step S106. Further, the order of the steps illustrated in FIG. 24 differs from the order of the steps illustrated in FIG. 21.

Step S1315 determines whether the pixel value of each of the reference pixels is within the selection range defined in Step S1304. If the pixel value of the reference pixel is within the selection range ("YES" in Step S1315), the operation proceeds to Step S906. If the pixel value of the reference pixel is out of the selection range ("NO" in Step S1315), the operation proceeds to Step S106.

In this exemplary embodiment, if the pixel value of each of the reference pixels is within the selection range, the resolution converter 5 assumes that the original image, or at least the portion having the reference pixels, is an image having small variations in pixel values, such as a gradation image. Based on this characteristic, the twelfth method is selected, which is suitable for enhancing sharpness of the image.

In this exemplary embodiment, if the pixel value of each of the reference pixels is out of the selection range, the resolution converter 5 assumes that the original image, or at least the portion having the reference pixels, is a multivalue image, or an image having large variations in pixel values. Based on this characteristic, the second method is selected, which is suitable for enhancing smoothness of the image.

Figure 25J:
FIG. 25J is an exemplary image generated by interpolating the original image of FIG. 25A using the twenty-first method according to an exemplary embodiment of the present invention.
Figure 25K:
FIG. 25K is an exemplary image generated by interpolating the original image of FIG. 25A using the method disclosed in the '900 patent.
Figure 25L:
FIG. 25L is an exemplary image generated by interpolating the original image of FIG. 25A using the cubic convolution method.

Using the twenty-first method, smoothness and sharpness of an image may be controlled according to local image characteristics, as shown in FIGS. 25A, 25C, 25G, and 25J. By combining the second method (FIG. 25G) and the twelfth method (FIG. 25C), the twenty-first method can generate the image having an upper portion that is smooth, and a bottom portion that is sharp, as illustrated in FIG. 25J. To generate the image shown in FIG. 25J, the value S is set to 8, and the value n is set to 3.

Further, in this exemplary embodiment, most of the steps illustrated in FIG. 23 are shared by the second method and the twelfth method, thus increasing an overall processing speed.

As described above referring to any one of the sixteenth to twenty-first methods, the resolution converter 5 is capable of controlling sharpness and smoothness of an image. In another example, the resolution converter 5 may control information regarding pixel values of an original image, which may be used for determining a pixel value of an interpolated pixel.

Figure 27A:
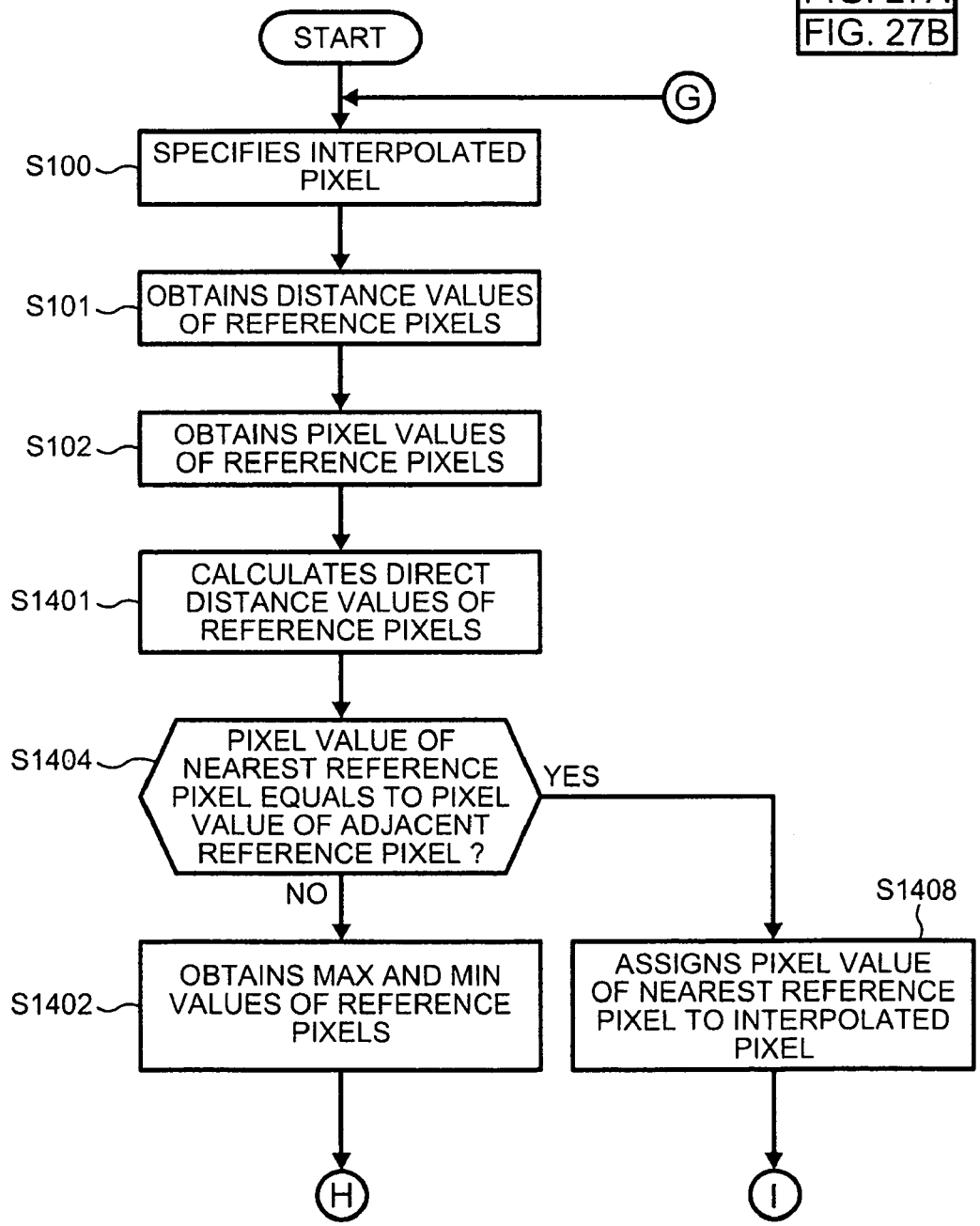
FIG. 27 is a flowchart illustrating an operation for determining a pixel value of an interpolated pixel using a twenty-second method according to an exemplary embodiment of the present invention.
Figure 27B:
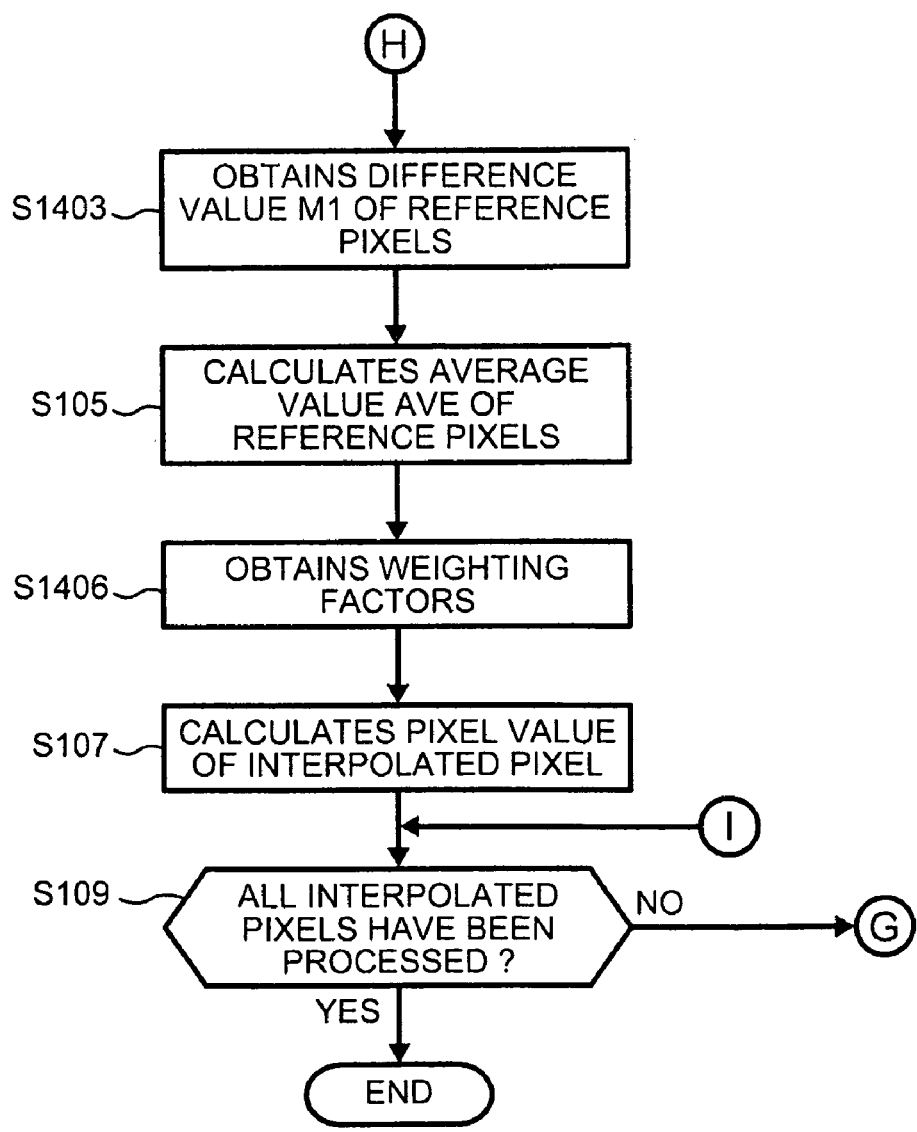

Referring now to FIGS. 2 and 27, an operation for determining a pixel value of an interpolated pixel using a twenty-second method is explained according to an exemplary embodiment of the present invention.

Step S100 specifies one of the interpolated pixels. For example, as shown in FIG. 2, the resolution converter 5 specifies an interpolated pixel B.

Step S101 selects one or more reference pixels, which are originally provided in the image data 1, from a vicinity of the specified interpolated pixel. Step S101 further obtains a distance value for each of the reference pixels. Thus, in the example shown in FIG. 2, the resolution converter 5 selects first to fourth reference pixels A00, A01, A10, and A11, from a vicinity of the interpolated pixel B. For the reference pixels A00 to A11, the resolution converter 5 obtains distance values expressed in X and Y coordinate values, (x1, y1), (x1, y2), (x2, y1), and (x2, y2). In the example shown in FIG. 2, four reference pixels are selected, however, any number of reference pixels may be selected.

Step S102 obtains a pixel value for each of the reference pixels obtained in Step S101. In the example shown in FIG. 2, the first reference pixel A00 has a pixel value a00. The second reference pixel A01 has a pixel value a01. The third reference pixel A10 has a pixel value a10. The fourth reference pixel A11 has a pixel value a11.

Figure 26:
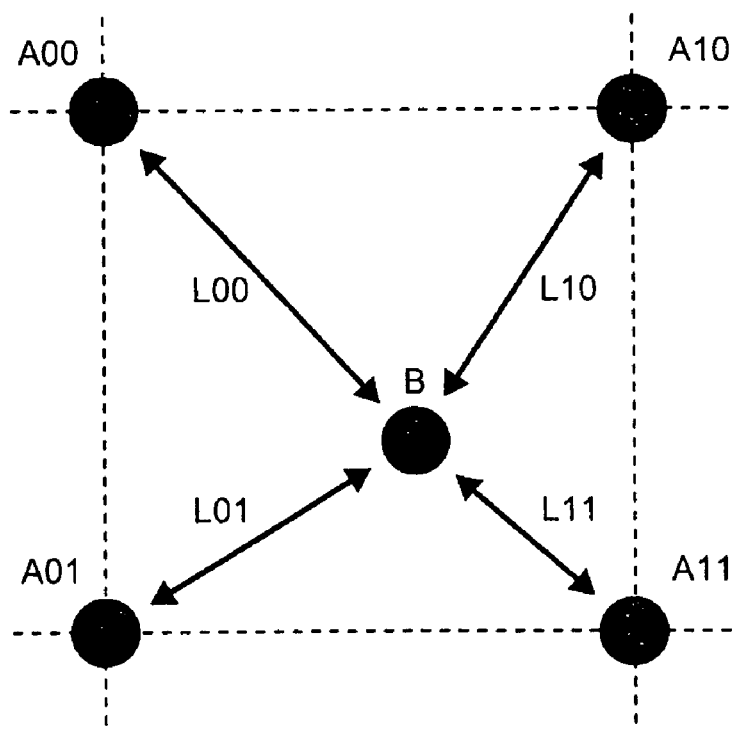
FIG. 26 is an illustration of a direct distance of a reference pixel from the interpolated pixel of FIG. 2 according to an exemplary embodiment of the present invention.

Step S1401 obtains a distance value for each of the reference pixels, which is different from the distance value obtained in Step S101. In this exemplary embodiment, the resolution converter 5 calculates a direct distance value L, which is a direct distance between the interpolated pixel and each of the reference pixels, based on the distance values expressed in X and Y coordinates. As shown in FIG. 26, the first reference pixel A00 has a direct distance value L00=(x1*y1). The second reference pixel A01 has a direct distance value L01=(x2*y1). The third reference pixel A10 has a direct distance value L10=(x1*y2). The fourth reference pixel A11 has a direct distance value L11=(x2*y2).

Step S1404 determines whether a pixel value of a nearest reference pixel is equal to a pixel value of at least one of adjacent reference pixels. If the pixel value of the nearest reference pixel is equal to the pixel value of any one of the adjacent reference pixels ("YES" in Step S1404), the operation proceeds to Step S1408. Otherwise ("NO" in Step S1404), the operation proceeds to Step S1402.

In this exemplary embodiment, the nearest reference pixel corresponds to one of the reference pixels having the smallest direct distance value L. The adjacent reference pixel corresponds to one of the reference pixels adjacent to the specified interpolated pixel in the direction of the X or Y axis.

If the pixel value of the nearest reference pixel is equal to the pixel value of any one of the adjacent reference pixels, the resolution converter 5 assumes that the reference pixels have the same or closer values, and further assumes that a portion having the reference pixels corresponds to a portion of a character or a symbol in the image data 1, for example. Based on these characteristics, the nearest neighbor method is selected, which is suitable for keeping pixel information of the original image.

If the pixel value of the nearest reference pixel is not equal to the pixel value of any one of the adjacent reference pixels, the resolution converter 5 assumes that the reference pixels have different pixel values, and further assumes that a portion having the reference pixels corresponds to a portion of a picture image or a diagonal line, for example. Based on these characteristics, the second method or any other method of the present invention is selected, which is suitable for enhancing smoothness of the image.

Step S1408 uses the pixel value of the nearest reference pixel as a pixel value of the interpolated pixel. In the example shown in FIG. 2, the pixel value $a11$ of the fourth reference pixel A11 may be used, if the pixel value $a11$ is not equal to any one of the pixel values $a01$ and $a10$ of the adjacent reference pixels A01 and A10.

Step S1402 obtains a maximum value MAX and a minimum value MIN of the reference pixels. The maximum value MAX corresponds to a pixel value of the reference pixel having the largest pixel value. The minimum value MIN corresponds to a pixel value of the reference pixel having the smallest pixel value.

Step S1403 obtains a difference value M1 of the reference pixels based on the maximum value MAX and the minimum value MIN. In this exemplary embodiment, the difference value M1 may be expressed by the equation: M1=MAX−MIN+α, with α is any value larger than 0.

Step S105 calculates an average value AVE, which is the average of the pixel values of the reference pixels. In the example shown in FIG. 2, the average value AVE of the reference pixels A00, A10, A01, and A11 can be calculated as follows:

$$AVE=(a00+a01+a10+a11)/4.$$

Step S1406 obtains a weighting factor for each of the reference pixels using the pixel values obtained in Step S102, the direct distance values L obtained in Step S1401, the average value AVE obtained in Step S105, and a normalization factor. In this exemplary embodiment, the difference value M1 obtained in Step S1403 is used as the normalization factor.

In the example shown in FIG. 2, weighting factors Z00, Z10, Z01, and Z11 for the reference pixels A00, A10, A01, and A11 are obtained, respectively, as follows:

$$Z00=L11*(1-|a00-AVE|/M1);$$

$$Z10=L01*(1-|a10-AVE|/M1);$$

$$Z01=L10*(1-|a01-AVE|/M1); \text{ and}$$

$$Z11=L00*(1-|a11-AVE|/M1).$$

As shown in the above equations, in this exemplary embodiment, Step S1406 uses the second method described referring to FIG. 3. However, any one of the above-described and other methods of the present invention may be used, as long as it is suitable for enhancing smoothness of an image.

Step S107 calculates a pixel value of the interpolated pixel using the pixel values of the reference pixels. In this exemplary embodiment, each of the pixel values is weighted with the corresponding weighting factor obtained in Step S1406.

In the example shown in FIG. 2, the pixel values $a00$, $a10$, $a01$, and $a11$ are weighted with the weighting factors Z00, Z10, Z01 and Z11, respectively. Thus, the pixel value b of the interpolated pixel B may be obtained as follows:

$$b=a00*Z00/(Z00+Z10+Z01+Z11)+a10*Z10/(Z00+Z10+Z01+Z11)+a01*Z01/(Z00+Z10+Z01+Z11)+a11*Z11/(Z00+Z10+Z01+Z11).$$

The above equation can be simplified to:

$$b=(Z00*a00+Z10*a10+Z01*a01+Z11*a11)/(Z00+Z10+Z01+Z11).$$

Step S109 determines whether all interpolated pixels in the image data 1 have been processed. If all interpolated pixels have been processed ("YES" in Step S109), the operation ends to store the processed image data 1 in the output data storage 7 to be displayed by the display device 10. If all interpolated pixels have not been processed ("NO" in Step S109), the operation returns to Step S100 to specify another interpolated pixel.

Using the twenty-second method, smoothness and information regarding pixel values of an original image may be controlled according to local image characteristics, as shown in FIGS. 31A, 31B, and 31C. Any one of the images shown in FIGS. 31A, 31B, and 31C is generated based on the original image of FIG. 25A. The image shown in FIG. 31A, which is generated using the nearest neighbor method, is effective for keeping information regarding pixel values of the original image. However, the image of FIG. 31A suffers from jaggedness, due to the enhanced noise component. The image shown in FIG. 31B, which is generated using the second method of the present invention is effective for enhancing smoothness of the image. However, the image of FIG. 31B suffers from the blurred image. By combining the nearest neighbor method (FIG. 31A) and the second method (FIG. 31B), the twenty-second method can generate the image having an upper portion that is smooth, and a bottom portion that is sharp, as illustrated in FIG. 31C.

In this exemplary embodiment, Step S1404 determines whether the nearest reference pixel has a pixel value equal to a pixel value of any one of the adjacent reference pixels. Alternatively, Step S1404 may determine whether a reference pixel diagonally opposite to the nearest reference pixel has a pixel value equal to a pixel value of any one of the adjacent reference pixels.

Further, in this exemplary embodiment, most of the steps illustrated in FIG. 27 are shared by the second method and the nearest neighbor method, thus increasing the overall processing speed.

Figures 28, 28A, 28B:
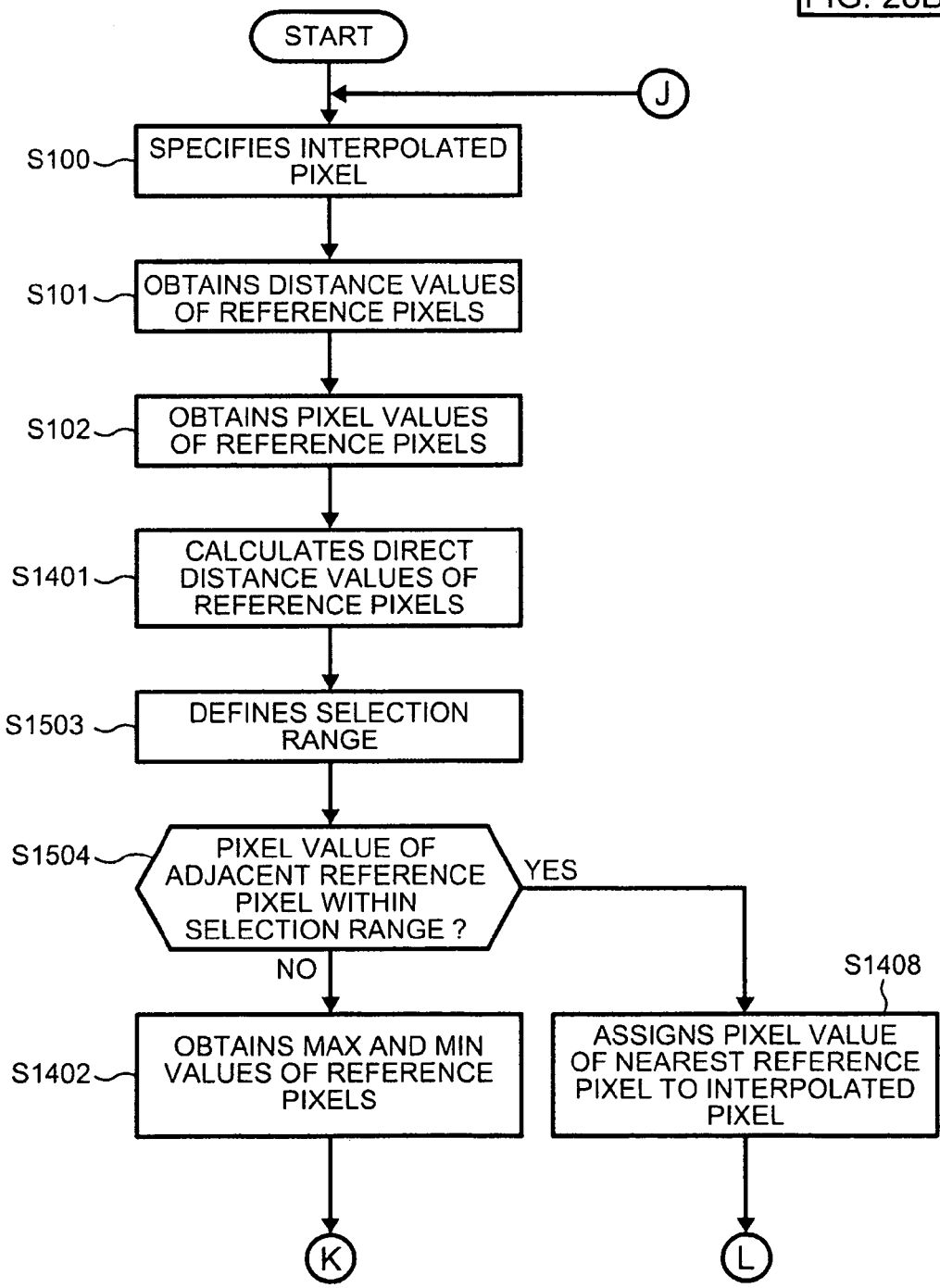
FIG. 28 is a flowchart illustrating an operation for determining a pixel value of an interpolated pixel using a twenty-third method according to an exemplary embodiment of the present invention.
Figure 28B:
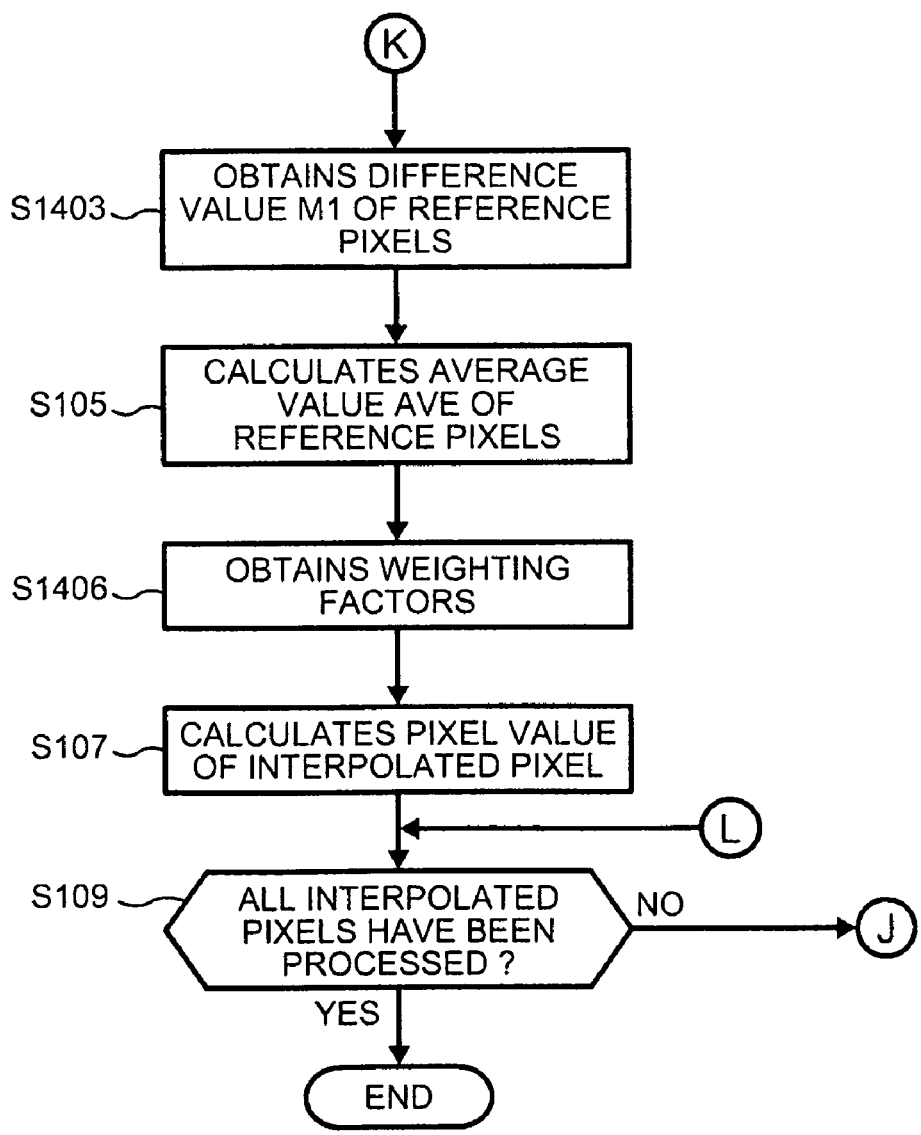

Referring now to FIGS. 2 and 28, an operation for determining a pixel value of an interpolated pixel using a twenty-third method is explained according to an exemplary embodiment of the present invention.

The operation using the twenty-third method shown in FIG. 28 is substantially similar to the operation using the twenty-second method shown in FIG. 27. The differences include the addition of Step S1503, and replacement of Step S1404 with Step S1504.

Step S1503 defines a selection range, which may be used for selecting an interpolation method suitable for processing the specified interpolated pixel. The selection range may be defined based on the pixel value of the nearest reference pixel. For example, referring to FIG. 2, if the fourth pixel value $a11$ corresponds to the nearest pixel value, the selection range may be defined as a range between $(a11+\beta)$ and $(a11-\gamma)$. The value β is any value larger than the pixel value $a11$. The value γ is any value smaller than the pixel value $a11$. Preferably, the sum of values β and γ is smaller than 50% of the maximum value of the reference pixels.

Step S1504 determines whether a pixel value of any one of the adjacent reference pixels is within the selection range defined in Step S1503. In the example shown in FIG. 2, the second and third reference pixels A01 and A10 correspond to the adjacent reference pixels of the interpolated pixel B. The resolution converter 5 determines whether each of the pixel values a01 and a10 is within the selection range. If the pixel value of the adjacent pixel is within the selection range ("YES" in Step S1504), the operation proceeds to Step S1408. Otherwise ("NO" in Step S1504), the operation proceeds to Step S1402.

Using the twenty-third method, smoothness and information regarding pixel values of an original image may be controlled according to local image characteristics, as shown in FIGS. 31A, 31B, and 31D. By combining the nearest neighbor method (FIG. 31A) and the second method (FIG. 31B), the twenty-third method can generate the image having an upper portion that is smooth, and a bottom portion that is sharp, as illustrated in FIG. 31D.

The twenty-third method can enhance sharpness of an image, especially when the image has gradation, as illustrated in FIGS. 32A, 32B, and 32C. If an original gradation image of FIG. 32A is interpolated using the twenty-second method as illustrated in FIG. 32B, sharpness of the image may not be greatly enhanced. If the original gradation image of FIG. 32A is interpolated using the twenty-third method as illustrated in FIG. 32C, sharpness of the image may be enhanced, at least when compared to the image of FIG. 32B.

Further, in this exemplary embodiment, most of the steps illustrated in FIG. 28 are shared by the second method and the nearest neighbor method, thus increasing the overall processing speed.

Figure 29A:
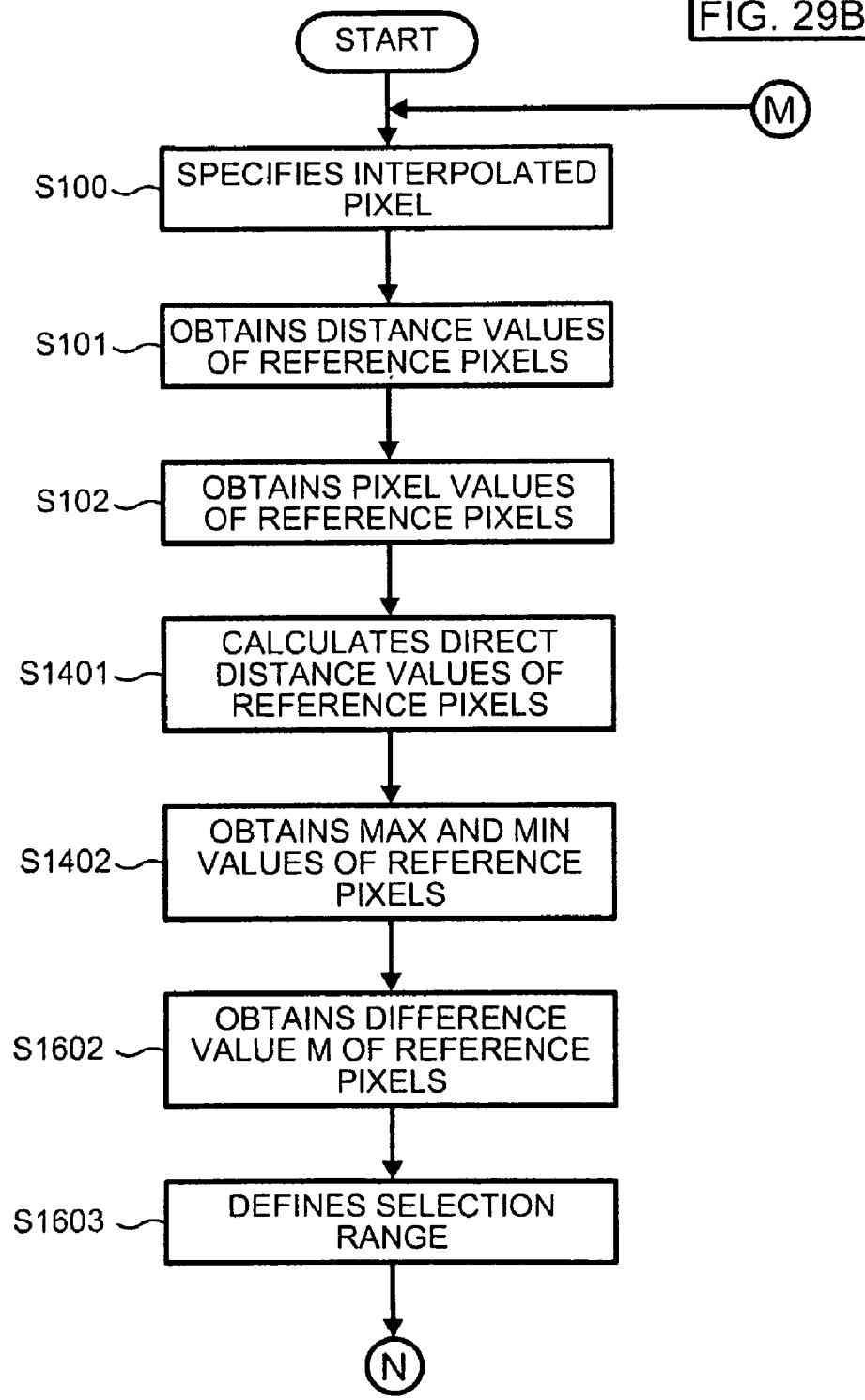
FIG. 29 is a flowchart illustrating an operation for determining a pixel value of an interpolated pixel using a twenty-fourth method according to an exemplary embodiment of the present invention.
Figure 29B:
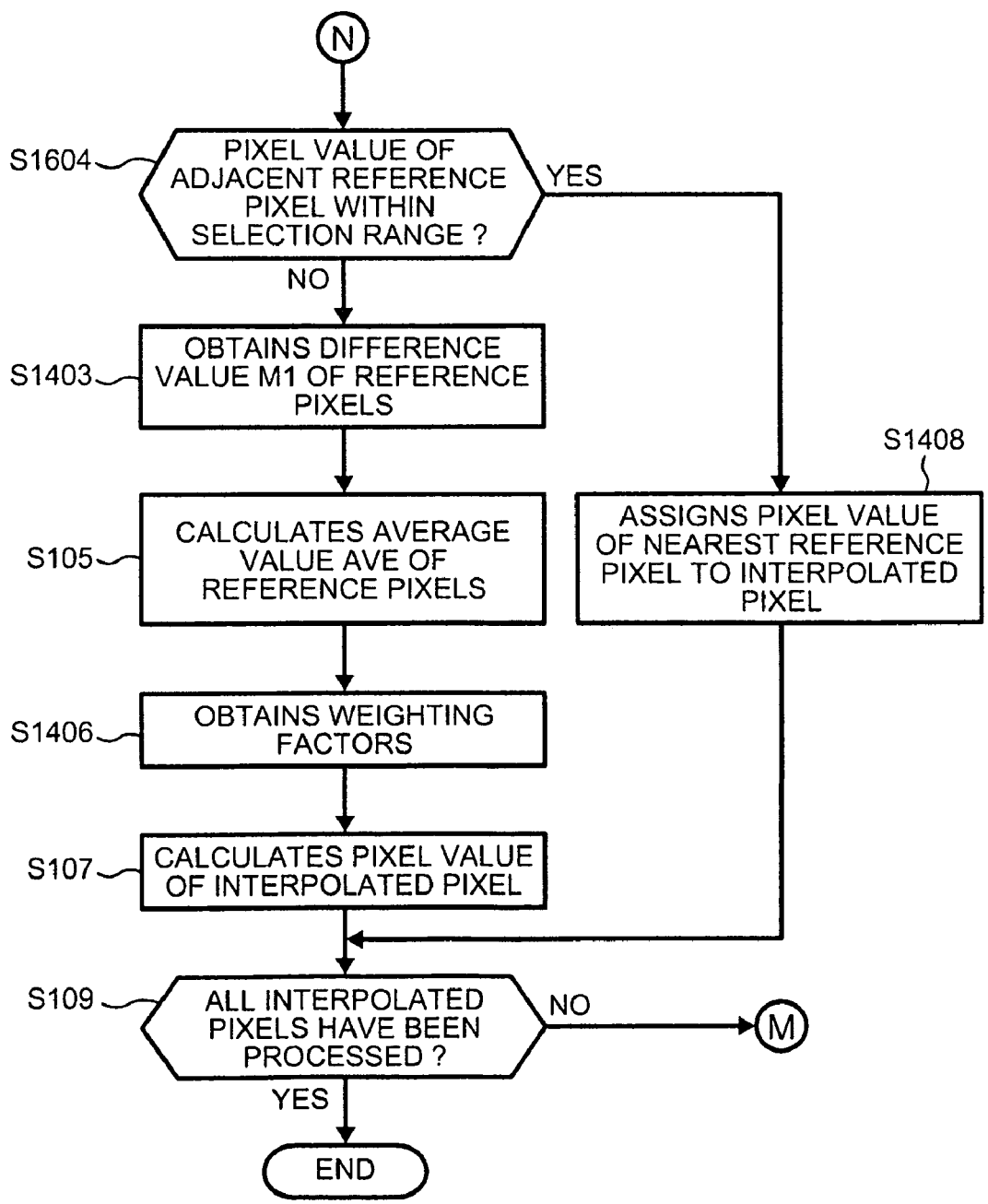

Referring now to FIGS. 2 and 29, an operation for determining a pixel value of an interpolated pixel using a twenty-fourth method is explained according to an exemplary embodiment of the present invention.

The operation using the twenty-fourth method shown in FIG. 29 is substantially similar to the operation using the twenty-third method shown in FIG. 28. The differences include the addition of Step S1602, replacement of Step S1503 with S1063, and replacement of Step S1504 with Step S1604. Further, the order of the steps illustrated in FIG. 29 may differ from the order of the steps illustrated in FIG. 28.

Step S1602 obtains a difference value M using a maximum value MAX and a minimum value MIN of the reference pixels. Alternatively, Step S1602 may obtain a difference value M, by comparing the pixel value of the nearest reference pixel with the pixel value of the reference pixels other than the nearest reference pixel. For example, in the example shown in FIG. 2, the difference between the pixel value a11 and the pixel value a10 (|a11−a10|), the difference between the pixel value a11 and the pixel value a10 (|a11−a10|), and the difference between the pixel value a11 and the pixel value a00 (|a11−a00|) may be obtained, respectively. The maximum value of the obtained differences is used as the difference value M.

Step 1603 defines a selection range. The selection range may be defined by a first constant M3 and a second constant M4. The first constant M3 may be any value, however, in this exemplary embodiment, the first constant M3 is determined based on the difference value M as illustrated in the following equation: M3=M/E, wherein E is any value equal to or larger than 2. The second constant M4 may be any value, however, in this exemplary embodiment, the second constant M4 is determined based on the difference value M as illustrated in the following equation: M4=M/F, wherein F is any value equal to or larger than 2. Based on the first constant M3 and the second constant M4, the selection range may be defined as a range that is equal to or larger than (a1+M3) or equal to or smaller than (a1−M4). The value a1 corresponds to the pixel value of the nearest reference pixel.

Step S1604 determines whether the pixel value of any one of the adjacent reference pixels is within the selection range defined in Step S1603. If the pixel value of the adjacent reference pixel is within the selection range ("YES" in Step S1604), the operation proceeds to Step S1408. If the pixel value of the adjacent reference pixel is out of the selection range ("NO" in Step S1604), the operation proceeds to Step S1403.

In this exemplary embodiment, if the pixel value of any one of the adjacent reference pixels is within the selection range, the resolution converter 5 assumes that the original image, or at least the portion having the reference pixels, is an image having small variations in pixel values such as a gradation image. Based on this characteristic, the nearest neighbor method is selected, which is suitable for keeping information regarding pixel values of an original image.

In this exemplary embodiment, if the pixel value of any one of the adjacent reference pixels is out of the selection range, the resolution converter 5 assumes that the original image, or at least the portion having the reference pixels, is a multivalue image, or an image having large variations in pixel values. Based on this characteristic, the second method or any other method is selected, which is suitable for enhancing smoothness of the image.

Using the twenty-fourth method, smoothness and information regarding pixel values of an original image may be controlled according to local image characteristics.

Further, in this exemplary embodiment, most of the steps illustrated in FIG. 29 are shared by the second method and the nearest neighbor method, thus increasing the overall processing speed.

Figure 30A:
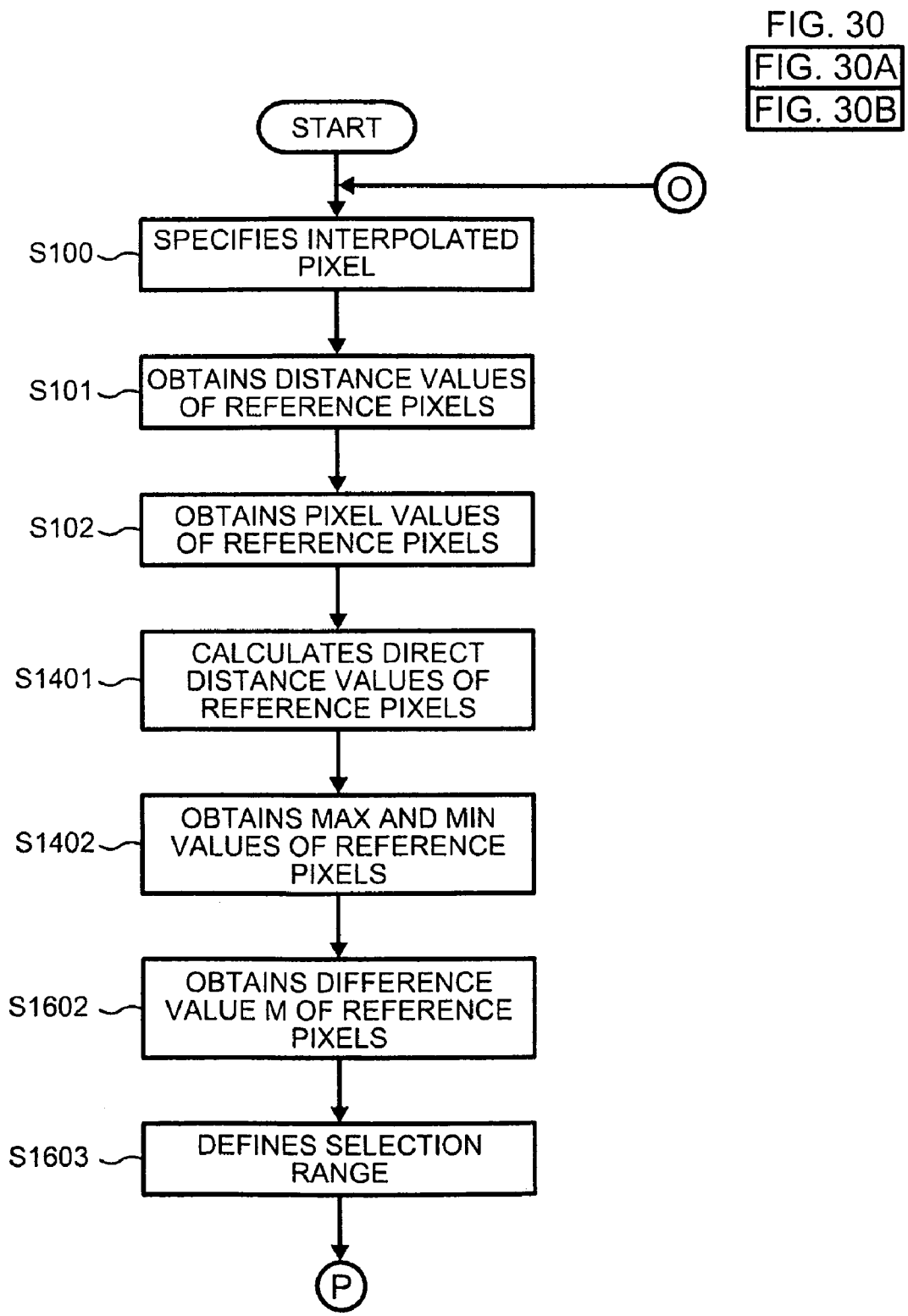
FIG. 30 is a flowchart illustrating an operation for determining a pixel value of an interpolated pixel using a twenty-fifth method according to an exemplary embodiment of the present invention.
Figure 30B:
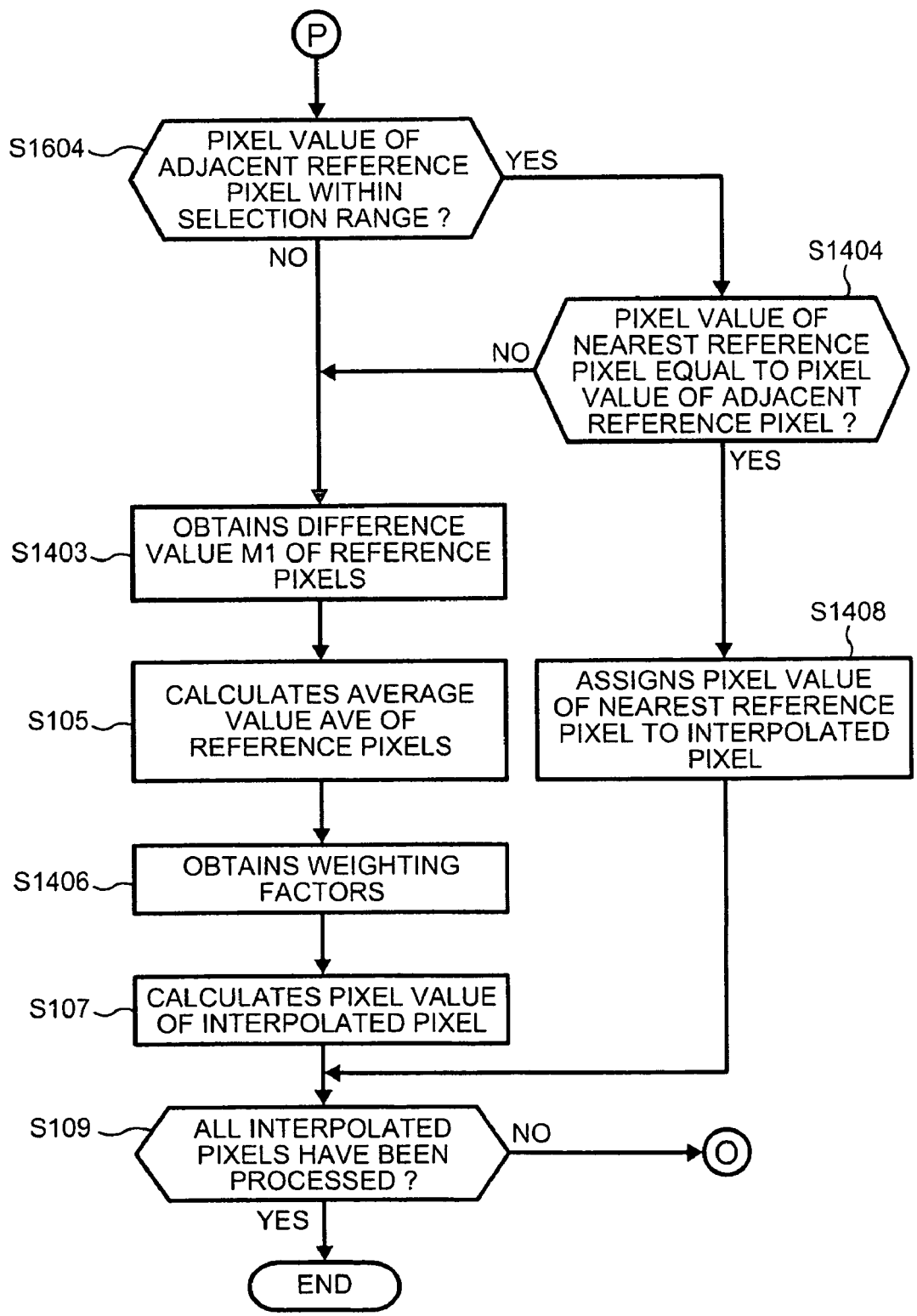

Referring now to FIGS. 2 and 30, an operation for determining a pixel value of an interpolated pixel using a twenty-fifth method is explained according to an exemplary embodiment of the present invention.

The operation using the twenty-fifth method shown in FIG. 30 is substantially similar to the operation using the twenty-fourth method shown in FIG. 29. The differences include the addition of Step S1404.

Using the twenty-fifth method, smoothness and information regarding pixel values of an original image may be controlled according to local image characteristics.

Further, in this exemplary embodiment, most of the steps illustrated in FIG. 30 are shared by the second method and the nearest neighbor method, thus increasing an overall processing speed.

In addition to the above-described methods including the sixteenth to twenty-fifth methods, the resolution converter 5 may perform any other interpolation method according to the scope of this disclosure and appended claims. For example, elements, features, or functions of the above-described methods may be combined with each other and/or substituted for each other within the scope of this disclosure and appended claims.

Numerous additional modifications and variations are possible in light of the above teachings. It is therefore to be understood that within the scope of the appended claims, the disclosure of this patent specification may be practiced in ways other than those specifically described herein.

For example, any one of the above-described and other methods of the present invention may be embodied in the form of a computer program. In one example, the image processing device 9 may be implemented as one or more conventional general purpose microprocessors and/or signal processors capable of performing at least one of the above-described and other methods of the present invention, according to one or more instructions obtained from any kind of storage medium. Examples of storage mediums include, but are not limited to, flexible disk, hard disk, optical discs, magneto-optical discs, magnetic tapes, involatile memory cards, ROM (read-only-memory), etc.

Alternatively, the present invention may be implemented by ASIC, prepared by interconnecting an appropriate network of conventional component circuits or by a combination thereof with one or more conventional general purpose microprocessors and/or signal processors programmed accordingly.

What is claimed as new and desired to be protected by Letters Patent of the United States is:

1. A method of converting resolution of an image, comprising using a processor to perform the steps of:
   specifying an interpolated pixel to be added to the image;
   selecting a plurality of reference pixels from a vicinity of the interpolated pixel;
   obtaining a distance value for each of the reference pixels;
   extracting a pixel value for each of the reference pixels;
   generating a weighting factor for a target reference pixel selected from the plurality of reference pixels, using the distance value and the pixel value of the target reference pixel; and
   adding, to the image, the interpolated pixel having a pixel value determined by the weighting factor of the target reference pixel,
   wherein the generating step comprises the step of:
      calculating, for the target reference pixel, a pixel value difference between the pixel value of the target reference pixel and a first predetermined value; and
      normalizing the pixel value difference with a normalization factor.

2. The method of claim 1, wherein the first predetermined value includes an average of the pixel values of the reference pixels.

3. The method of claim 1, wherein the first predetermined value includes an average of the pixel value of the target reference pixel and the pixel value of the reference pixel opposing to the target reference pixel.

4. The method of claim 1, wherein the first predetermined value includes the pixel value of the reference pixel diagonally opposing to the target reference pixel.

5. The method of claim 1, wherein the normalization factor is equal to or larger than a maximum pixel value of the image.

6. The method of claim 1, wherein the normalization factor is determined by the pixel values of the reference pixels.

7. The method of claim 1, wherein the normalization factor is determined by a difference value of the reference pixels, indicating a difference between a maximum value and a minimum value of the reference pixels.

8. The method of claim 1, wherein the normalization factor is determined by at least one of a maximum value and a minimum value of the reference pixels.

9. The method of claim 1, wherein the generating step comprises the step of:
   obtaining a multiplied weighting factor by raising at least one of the distance value and the pixel value to the power of a multiplication value,
   wherein the obtained multiplied weighting factor is used as the weighting factor in the adding step.

10. The method of claim 1, wherein the target reference pixel corresponds to all of the reference pixels selected by the selected step.

11. The method of claim 1, wherein the target reference pixel corresponds to all of the reference pixels, other than a nearest reference pixel, selected by the selected step.

12. The method of claim 11, further comprising the step of:
   generating a weighting factor for the nearest reference pixel, using the distance value of the nearest reference pixel,
   wherein the pixel value of the interpolated pixel is determined further by the weighting factor of the nearest reference pixel.

13. An image processing device, comprising:
   means for detecting an input resolution and an output resolution of an image;
   means for comparing the input resolution with the output resolution to generate a comparison result;
   means for converting the input resolution to the output resolution based on the comparison result, using at least one of a plurality of interpolation methods including a first interpolation method, the first interpolation method comprising the steps of:
   specifying an interpolated pixel to be added to the image;
   selecting a plurality of reference pixels from a vicinity of the interpolated pixel;
   obtaining a distance value for each of the reference pixels;
   extracting a pixel value for each of the reference pixels;
   generating a weighting factor for a target reference pixel selected from the plurality of reference pixels, using the distance value and the pixel value of the target reference pixel; and
   adding, to the image, the interpolated pixel having a pixel value determined by the weighting factor of the target reference pixel;
   wherein the generating step of the first interpolation method comprises the steps of:
      calculating, for the target reference pixel, a pixel value difference between the pixel value of the target reference pixel and a first predetermined value; and
      normalizing the pixel value difference with a normalization factor.

14. The device of claim 13, wherein the generating step of the first interpolation method further comprises the step of:
   obtaining a multiplied weighting factor by raising at least one of the distance value and the normalized pixel value difference to the power of a multiplication value,
   wherein the obtained multiplied weighting factor is used as the weighting factor in the adding step of the first interpolation method.

15. The device of claim 13, wherein at least one the first predetermined value and the normalization factor is determined based on characteristics of the image.

16. The device of claim 13, wherein at least one the first predetermined value and the normalization factor is determined based on a user's preference.

17. The device of claim 14, wherein at least one the first predetermined value, the normalization factor, and the multiplication value is determined based on characteristics of the image.

18. The device of claim 14, wherein at least one the first predetermined value, the normalization factor, and the multiplication value is determined based on a user's preference.

19. The device of claim 15, wherein the characteristics of the image is determined based on the pixel values of the reference pixels.

20. The device of claim 15, wherein the characteristics of the image is determined based on a difference value of the reference pixels.

21. The device of claim 15, wherein the characteristics of the image is determined based on a maximum value and a minimum value of the reference pixels.

22. The device of claim 17, wherein the characteristics of the image is determined based on the pixel values of the reference pixels.

23. The device of claim 17, wherein the characteristics of the image is determined based on a difference value of the reference pixels.

24. The device of claim 17, wherein the characteristics of the image is determined based on a maximum value and a minimum value of the reference pixels.

25. The device of claim 13, further comprising:
means for obtaining coordinate systems corresponding to the input resolution and the output resolution, respectively, to be used by the converting means.

26. The device of claim 13, further comprising:
means for storing at least one of the distance value and the pixel value.

27. The device of claim 14, further comprising:
means for storing data used by the converting means to obtain the multiplied weighting factor.

28. The device of claim 13, further comprising:
means for selecting an interpolation method according to characteristics of the image, from the plurality of interpolation methods.

29. The device of claim 28, wherein the characteristics of the image is determined based on the pixel values of the reference pixels.

30. The device of claim 28, wherein the characteristics of the image is determined based on at least one of a maximum value and a minimum value of the reference pixels.

31. The device of claim 28, wherein the characteristics of the image is determines based on a difference value of the reference pixels.

32. The device of claim 28, wherein the characteristics of the image is determined based on a pixel value of a nearest reference pixel selected from the reference pixels.

33. The device of claim 28, wherein the characteristics of the image is determined based on a pixel value of a reference pixel diagonally opposing to a nearest reference pixel, selected from the reference pixels.

34. The device of claim 31, wherein the selected interpolation method when the difference value equals to 0 comprises the steps of:
adding the interpolated pixel having a pixel value equal to the pixel value of any one of the reference pixels.

35. The device of claim 28, wherein the plurality of interpolation methods further includes a linear interpolation method.

36. The device of claim 28, wherein the plurality of interpolation methods further includes a nearest neighbor method.

37. An image display apparatus, comprising:
an image processing device configured to detect an input resolution of an image, compare the input resolution with an output resolution to generate a comparison result, and convert the input resolution to the output resolution based on the comparison result, using at least one of a plurality of interpolation methods including a first interpolation method; and
a display device configured to display the converted image,
the first interpolation method comprising the step of:
specifying an interpolated pixel to be added to the image;
selecting a plurality of reference pixels from a vicinity of the interpolated pixel;
obtaining a distance value for each of the reference pixels;
extracting a pixel value for each of the reference pixels;
generating a weighting factor for a target reference pixel selected from the plurality of reference pixels, using the distance value and the pixel value of the target reference pixel; and
adding, to the image, the interpolated pixel having a pixel value determined by the weighting factor of the target reference pixel to generate the converted image,
wherein the generating step comprises the steps of:
calculating, for the target reference pixel, a pixel value difference between the pixel value of the target reference pixel and a first predetermined value; and
normalizing the pixel value difference with a normalization factor.

38. A computer program product stored on a computer readable storage medium for carrying out a method, when run on an apparatus, the method comprising the steps of:
specifying an interpolated pixel to be added to the image;
selecting a plurality of reference pixels from a vicinity of the interpolated pixel;
obtaining a distance value for each of the reference pixels;
extracting a pixel value for each of the reference pixels;
generating a weighting factor for a target reference pixel selected from the plurality of reference pixels, using the distance value and the pixel value of the target reference pixel; and
adding, to the image, the interpolated pixel having a pixel value determined by the weighting factor of the target reference pixel,
wherein the generating step comprises the step of:
calculating, for the target reference pixel, a pixel value difference between the pixel value of the target reference pixel and a first predetermined value; and
normalizing the pixel value difference with a normalization factor.

39. A computer readable medium storing computer instructions for performing a method, the method comprising the steps of:
specifying an interpolated pixel to be added to the image;
selecting a plurality of reference pixels from a vicinity of the interpolated pixel;
obtaining a distance value for each of the reference pixels;
extracting a pixel value for each of the reference pixels;
generating a weighting factor for a target reference pixel selected from the plurality of reference pixels, using the distance value and the pixel value of the target reference pixel; and
adding, to the image, the interpolated pixel having a pixel value determined by the weighting factor of the target reference pixels,
wherein the generating step comprises the step of:
calculating, for the target reference pixel, a pixel value difference between the pixel value of the target reference pixel and a first predetermined value; and
normalizing the pixel value difference with a normalization factor.

40. A method of converting resolution of an image, comprising using a processor to perform the steps of:
specifying an interpolated pixel to be added to the image;
selecting a plurality of reference pixels from a vicinity of the interpolated pixel;
obtaining a distance value for each of the reference pixels;
extracting a pixel value for each of the reference pixels;

generating a weighting factor for a target reference pixel selected from the plurality of reference pixels, using the distance value and the pixel value of the target reference pixel; and adding, to the image, the interpolated pixel having a pixel value determined by the weighting factor of the target reference pixel, wherein the generating step comprises the step of:

obtaining a multiplied weighting factor by raising at least one of the distance value and the pixel value to the power of a multiplication value, wherein the obtained multiplied weighting factor is used as the weighting factor in the adding step.

41. An image processing device, comprising:

means for detecting an input resolution and an output resolution of an image;

means for comparing the input resolution with the output resolution to generate a comparison result; and means for converting the input resolution in the output resolution based on the comparison result, using at least one of a plurality of interpolation methods including a first interpolation method, the first interpolation method comprising the steps of:

specifying an interpolated pixel to be added to the image;

selecting a plurality of reference pixels from a vicinity of the interpolated pixel;

obtaining a distance value for each of the reference pixels;

extracting a pixel value for each of the reference pixels;

generating a weighting factor for a target reference pixel selected from the adding plurality of reference pixels, using the distance value and the pixel value of the target reference pixel; and adding, to the image, the interpolated pixel having a pixel value determined by the weighting factor of the target reference pixel, wherein the generating step comprises the step of:

obtaining a multiplied weighting factor by raising at least one of the distance value and the pixel value to the power of a multiplication value, wherein the obtained multiplied weighting factor is used as the weighting factor in the adding step.

42. An image processing device, comprising:

means for detecting an input resolution and an output resolution of an image;

means for comparing the input resolution with the output resolution to generate a comparison result;

means for converting the input resolution to the output resolution based on the comparison result, using at least one of a plurality of interpolation methods including a first interpolation method, the first interpolation method comprising the steps of:

specifying an interpolated pixel to be added to the image;

selecting a plurality of reference pixels from a vicinity of the interpolated pixel;

obtaining a distance value for each of the reference pixels;

extracting a pixel value for each of the reference pixels;

generating a weighting factor for a target reference pixel selected from the plurality of reference pixels, using the distance value and the pixel value of the target reference pixel;

adding, to the image, the interpolated pixel having a pixel value determined by the weighting factor of the target reference pixel; and means for selecting an interpolation method according to characteristics of the image from the plurality of interpolation methods, wherein the characteristics of the image are determined based on a pixel value of a reference pixel diagonally opposing a nearest reference pixel, selected from a plurality of reference pixels located in a vicinity of an interpolated pixel to be added to the image.

* * * * *